(12) United States Patent
O'Hare et al.

(10) Patent No.: US 11,242,460 B2
(45) Date of Patent: Feb. 8, 2022

(54) SURFACE MODIFIED LAYERED DOUBLE HYDROXIDE

(71) Applicant: SCG Chemicals Co., Ltd., Bangkok (TH)

(72) Inventors: Dermot O'Hare, Oxford (GB);
Jean-Charles Buffet, Oxford (GB);
Chunping Chen, Oxford (GB);
Kanittika Ruengkajorn, Oxford (GB);
Anchalee Wongariyakawee, Bangkok (TH)

( * ) Notice: Subject to any disclaimer, the term of this patent is extended or adjusted under 35 U.S.C. 154(b) by 282 days.

(21) Appl. No.: 16/461,246

(22) PCT Filed: Nov. 15, 2017

(86) PCT No.: PCT/GB2017/053445
§ 371 (c)(1),
(2) Date: May 15, 2019

(87) PCT Pub. No.: WO2018/091894
PCT Pub. Date: May 24, 2018

(65) Prior Publication Data
US 2019/0270891 A1     Sep. 5, 2019

(30) Foreign Application Priority Data

Nov. 15, 2016 (GB) ................................ 1619320

(51) Int. Cl.
| | | |
|---|---|---|
| C08K 9/04 | (2006.01) |
| C09C 1/40 | (2006.01) |
| C08K 3/26 | (2006.01) |
| C08K 9/06 | (2006.01) |
| C01F 7/00 | (2006.01) |
| B01J 20/08 | (2006.01) |
| B01J 20/04 | (2006.01) |

(52) U.S. Cl.
CPC ............ *C09C 1/407* (2013.01); *B01J 20/041* (2013.01); *B01J 20/08* (2013.01); *C01F 7/002* (2013.01); *C01F 7/004* (2013.01); *C01F 7/005* (2013.01); *C08K 3/26* (2013.01); *C08K 9/04* (2013.01); *C08K 9/06* (2013.01); *C09C 1/40* (2013.01); *C01P 2002/22* (2013.01); *C01P 2002/72* (2013.01); *C01P 2002/82* (2013.01); *C01P 2002/86* (2013.01); *C01P 2002/88* (2013.01); *C01P 2004/04* (2013.01); *C01P 2006/10* (2013.01); *C01P 2006/11* (2013.01); *C01P 2006/12* (2013.01); *C01P 2006/14* (2013.01); *C01P 2006/16* (2013.01); *C01P 2006/19* (2013.01); *C08K 2003/267* (2013.01); *C08K 2201/006* (2013.01)

(58) Field of Classification Search
CPC . C09C 1/407; C09C 1/40; C01F 7/004; C01F 7/002; C01F 7/005; C08K 9/04; C08K 3/26; C08K 9/06; C01P 2002/22; C01P 2006/12; C01P 2003/267; C01P 2201/006; B01J 20/08; B01J 20/041
USPC .......................................................... 523/212
See application file for complete search history.

(56) References Cited

U.S. PATENT DOCUMENTS

| | | | |
|---|---|---|---|
| 5,539,135 A | 7/1996 | Breuer et al. | |
| 6,287,532 B1 * | 9/2001 | Okada ..................... | C01F 7/005 423/420.2 |
| 8,247,475 B2 * | 8/2012 | Kobayashi .............. | C01F 7/005 523/200 |
| 2008/0070139 A1 | 3/2008 | Michel | |
| 2015/0166355 A1 | 6/2015 | O'Hare et al. | |
| 2019/0300692 A1 * | 10/2019 | Teansawang .......... | H01B 3/443 |

FOREIGN PATENT DOCUMENTS

| | | |
|---|---|---|
| CN | 101321692 A | 12/2008 |
| CN | 101321697 A | 12/2008 |
| CN | 102302926 A | 1/2012 |
| CN | 103965661 A | 8/2014 |
| CN | 104703918 A | 6/2015 |
| CN | 106084290 A | 11/2016 |
| EP | 0989095 A1 | 3/2000 |
| JP | 2005345448 A | 12/2005 |
| JP | 2007022881 A | 2/2007 |
| KR | 20140039906 A | 4/2014 |
| WO | WO-2007065877 A1 * | 6/2007 ........... C01B 13/363 |
| WO | WO-2015/144778 A1 | 10/2015 |
| WO | WO-2016/096626 A1 | 6/2016 |
| WO | WO-2016/110698 A1 | 7/2016 |

OTHER PUBLICATIONS

Chen et al., "Core-shell zeollte@aqueous miscible organiclayered double hydroxides," Chem. Sci., 7: 1457-1461 (2016).
Erastova et al., "Understanding surface interactions in aqueous miscible organic solvent treated layered double hydroxides," RSC Adv., 7: 5076-5083 (2017).
Suo et al., "Dendritic silica@aqueous miscible organic-layered double hydroxide hybrids," Dalton Trans., 47:16413-16417 (2018).
Tao et al., "Silylation of layered double hydroxides via an induced hydrolysis method," J. Mater. Chem., 21:10711 (2011).
Wang et al., "Large-scale synthesis of highly dispersed layered double hydroxide powders containing delaminated single layer nanosheets," Chem. Commun., 49: 6301-6303 (2013).

(Continued)

*Primary Examiner* — Hannah J Pak
(74) *Attorney, Agent, or Firm* — Foley Hoag LLP; David P. Halstead; Lawrence P. Tardibono

(57) ABSTRACT

Surface-modified layered double hydroxides (LDHs) are disclosed, as well as processes by which they are made, and uses of the LDHs in composite materials. The surface-modified LDHs of the invention are more organophilic than their unmodified analogues, which allows the LDHs to be incorporated in a wide variety of materials, wherein the interesting functionality of LDHs may be exploited.

23 Claims, 63 Drawing Sheets

(56) References Cited

OTHER PUBLICATIONS

Wang et al., "Preparation of stable dispersions of layered double hydroxides (LDHs) in nonpolar hydrocarbons: new routes to polyolefin/LDH nanocomposites," Chem. Commun., 48: 7450-7452 (2012).
Yu et al., "Preparation of two dimensional layered double hydroxide nanosheets and their applications," Chem. Soc. Rev., 46: 5950-5974 (2017).
International Search Report and Written Opinion for International Application No. PCT/GB2017_053445 dated Jan. 30, 2018.
United Kingdom Search Report for International Application No. GB1619320.3 dated Jun. 27, 2017.
Tao et al., "Tailoring surface properties and structure of layered double hydroxides using silanes with different number of functional groups," Journal of Solid State Chemistry, 213: 176-181 (2014).

\* cited by examiner

SURFACE MODIFIED LAYERED DOUBLE HYDROXIDE

RELATED APPLICATIONS

This application is a National-Stage Entry under 35 U.S.C. § 371 of International Application PCT/GB2017/053445, filed Nov. 15, 2017, which claims the benefit of priority to GB Application No. 1619320.3, filed Nov. 15, 2016. The contents of the International Application PCT/GB2017/053445 are incorporated herein by reference in their entirety.

INTRODUCTION

The present invention relates to surface modified layered double hydroxides, as well as to processes for making the surface modified layered double hydroxides, and their uses in composite materials.

BACKGROUND OF THE INVENTION

Layered double hydroxides (LDHs) are a class of compounds which comprise two metal cations and have a layered structure. A review of LDHs is provided in *Structure and Bonding*; Vol 119, 2005 *Layered Double Hydroxides* ed. X Duan and D. G. Evans. The hydrotalcites, perhaps the most well-known examples of LDHs, have been studied for many years. LDHs can intercalate anions between the layers of the structure. WO 99/24139 discloses the use of LDHs to separate anions including aromatic and aliphatic anions.

Owing to the concentration of hydroxyl groups on their surface, conventionally-prepared LDHs are highly hydrophilic. As a consequence, conventionally-prepared LDHs often retain a considerable amount of water from the manufacturing process by which they were made.

The hydrophilicity of conventionally-prepared LDHs limits the extent to which they can be dispersed in organic solvents, thereby precluding their incorporation into a variety of materials wherein the interesting properties of LDH would be desirable. Attempts to address this by thermal treatment of the LDH to remove surface complexed water results in the undesirable formation highly aggregated, "stone-like", non-porous bodies.

The present invention was devised with the foregoing in mind.

SUMMARY OF THE INVENTION

According to a first aspect of the present invention there is provided a layered double hydroxide of formula (I) shown below:

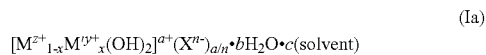
$$[M^{2+}_{1-x}M'^{y+}_x(OH)_2]^{a+}(X^{n-})_{a/n} \cdot bH_2O \cdot c(\text{solvent}) \cdot d(\text{modifier}) \quad (I)$$

wherein
M is at least one charged metal cation;
M' is at least one charged metal cation different from M;
z is 1 or 2;
y is 3 or 4;
$0 < x < 0.9$;
$0 < b \leq 10$;
$0 < c \leq 10$;
$0 < d \leq 10$ X is at least one anion;
n is the charge on anion(s) X;
a is equal to $z(1-x)+xy-2$; and
the solvent is an organic solvent capable of hydrogen-bonding to water; and the modifier is an organic moiety capable of covalent or ionic association with at least one surface of the layered double hydroxide, and which modifies the surface properties of the layered double hydroxide.

According to a further aspect of the present invention there is provided process for the preparation of a layered double hydroxide of formula (I), the process comprising the steps of:
a) providing a layered double hydroxide of formula (Ia):

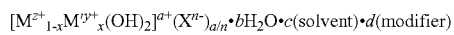
$$[M^{2+}_{1-x}M'^{y+}_x(OH)_2]^{a+}(X^{n-})_{a/n} \cdot bH_2O \cdot c(\text{solvent}) \quad (Ia)$$

wherein M, M', z, y, x, b, c, X, n, a, and the solvent are as specified in formula (I);
b) providing a modifier being an organic moiety capable of covalent or ionic association with at least one surface of the layered double hydroxide, and which is capable of modifying the surface properties of the layered double hydroxide; and
c) contacting the layered double hydroxide of formula (Ia) provided in step a) with the modifier provided in step b).

According to a further aspect of the present invention there is provided a layered double hydroxide obtainable, obtained or directly obtained by a process defined herein.

According to a further aspect of the present invention there is provided a composite material comprising a layered double hydroxide as defined herein dispersed throughout a polymer.

DETAILED DESCRIPTION OF THE INVENTION

Definitions

The term "(m-nC)" or "(m-nC) group" used alone or as a prefix, refers to any group having m to n carbon atoms.

The term "alkyl" as used herein includes reference to a straight or branched chain alkyl moieties, typically having 1, 2, 3, 4, 5 or 6 carbon atoms. This term includes reference to groups such as methyl, ethyl, propyl (n-propyl or isopropyl), butyl (n-butyl, sec-butyl or tert-butyl), pentyl (including neopentyl), hexyl and the like. In particular, an alkyl may have 1, 2, 3 or 4 carbon atoms.

The term "alkenyl" as used herein include reference to straight or branched chain alkenyl moieties, typically having 2, 3, 4, 5 or 6 carbon atoms. The term includes reference to alkenyl moieties containing 1, 2 or 3 carbon-carbon double bonds (C=C). This term includes reference to groups such as ethenyl (vinyl), propenyl (allyl), butenyl, pentenyl and hexenyl, as well as both the cis and trans isomers thereof.

The term "alkynyl" as used herein include reference to straight or branched chain alkynyl moieties, typically having 2, 3, 4, 5 or 6 carbon atoms. The term includes reference to alkynyl moieties containing 1, 2 or 3 carbon-carbon triple bonds (C≡C). This term includes reference to groups such as ethynyl, propynyl, butynyl, pentynyl and hexynyl.

The term "alkoxy" as used herein include reference to —O-alkyl, wherein alkyl is straight or branched chain and comprises 1, 2, 3, 4, 5 or 6 carbon atoms. In one class of embodiments, alkoxy has 1, 2, 3 or 4 carbon atoms. This term includes reference to groups such as methoxy, ethoxy, propoxy, isopropoxy, butoxy, tert-butoxy, pentoxy, hexoxy and the like.

The term "(m-cC)alkoxyl(m-nC)alkyl" means a (m-nC) alkoxyl group covalently attached to a (m-nC)alkylene group, both of which are defined herein.

The term "aryl" as used herein includes reference to an aromatic ring system comprising 6, 7, 8, 9 or 10 ring carbon atoms. Aryl is often phenyl but may be a polycyclic ring system, having two or more rings, at least one of which is aromatic. This term includes reference to groups such as phenyl, naphthyl and the like.

The term "aryl(m-nC)alkyl" means an aryl group covalently attached to a (m-nC)alkylene group, both of which are defined herein.

The term "carbocyclyl" as used herein includes reference to an alicyclic moiety having 3, 4, 5, 6, 7 or 8 carbon atoms. The group may be a bridged or polycyclic ring system. More often cycloalkyl groups are monocyclic. This term includes reference to groups such as cyclopropyl, cyclobutyl, cyclopentyl, cyclohexyl, norbornyl, bicyclo[2.2.2]octyl and the like.

The term "carbocyclyl(m-nC)alkyl" means a carbocyclyl group covalently attached to a (m-nC)alkylene group, both of which are defined herein.

The term "heterocyclyl", "heterocyclic" or "heterocycle" means a non-aromatic saturated or partially saturated monocyclic, fused, bridged, or spiro bicyclic heterocyclic ring system(s). Monocyclic heterocyclic rings contain from about 3 to 12 (suitably from 3 to 7) ring atoms, with from 1 to 5 (suitably 1, 2 or 3) heteroatoms selected from nitrogen, oxygen or sulfur in the ring. Bicyclic heterocycles contain from 7 to 17 member atoms, suitably 7 to 12 member atoms, in the ring. Bicyclic heterocyclic(s) rings may be fused, spiro, or bridged ring systems.

Examples of heterocyclic groups include cyclic ethers such as oxiranyl, oxetanyl, tetrahydrofuranyl, dioxanyl, and substituted cyclic ethers. Heterocycles containing nitrogen include, for example, azetidinyl, pyrrolidinyl, piperidinyl, piperazinyl, tetrahydrotriazinyl, tetrahydropyrazolyl, and the like. Typical sulfur containing heterocycles include tetrahydrothienyl, dihydro-1,3-dithiol, tetrahydro-2H-thiopyran, and hexahydrothiepine. Other heterocycles include dihydro-oxathiolyl, tetrahydro-oxazolyl, tetrahydro-oxadiazolyl, tetrahydrodioxazolyl, tetrahydro-oxathiazolyl, hexahydrotriazinyl, tetrahydro-oxazinyl, morpholinyl, thiomorpholinyl, tetrahydropyrimidinyl, dioxolinyl, octahydrobenzofuranyl, octahydrobenzimidazolyl, and octahydrobenzothiazolyl. For heterocycles containing sulfur, the oxidized sulfur heterocycles containing SO or $SO_2$ groups are also included. Examples include the sulfoxide and sulfone forms of tetrahydrothienyl and thiomorpholinyl such as tetrahydrothiene 1,1-dioxide and thiomorpholinyl 1,1-dioxide. A suitable value for a heterocyclyl group which bears 1 or 2 oxo (=O) or thioxo (=S) substituents is, for example, 2-oxopyrrolidinyl, 2-thioxopyrrolidinyl, 2-oxoimidazolidinyl, 2-thioxoimidazolidinyl, 2-oxopiperidinyl, 2,5-dioxopyrrolidinyl, 2,5-dioxoimidazolidinyl or 2,6-dioxopiperidinyl. Particular heterocyclyl groups are saturated monocyclic 3 to 7 membered heterocyclyls containing 1, 2 or 3 heteroatoms selected from nitrogen, oxygen or sulfur, for example azetidinyl, tetrahydrofuranyl, tetrahydropyranyl, pyrrolidinyl, morpholinyl, tetrahydrothienyl, tetrahydrothienyl 1,1-dioxide, thiomorpholinyl, thiomorpholinyl 1,1-dioxide, piperidinyl, homopiperidinyl, piperazinyl or homopiperazinyl. As the skilled person would appreciate, any heterocycle may be linked to another group via any suitable atom, such as via a carbon or nitrogen atom.

The term "heterocyclyl(m-nC)alkyl" means a heterocyclyl group covalently attached to a (m-nC)alkylene group, both of which are defined herein.

The term "heteroaryl" as used herein includes reference to an aromatic heterocyclic ring system having 5, 6, 7, 8, 9 or 10 ring atoms, at least one of which is selected from nitrogen, oxygen and sulphur. The group may be a polycyclic ring system, having two or more rings, at least one of which is aromatic, but is more often monocyclic. This term includes reference to groups such as pyrimidinyl, furanyl, benzo[b]thiophenyl, thiophenyl, pyrrolyl, imidazolyl, pyrrolidinyl, pyridinyl, benzo[b]furanyl, pyrazinyl, purinyl, indolyl, benzimidazolyl, quinolinyl, phenothiazinyl, triazinyl, phthalazinyl, 2H-chromenyl, oxazolyl, isoxazolyl, thiazolyl, isoindolyl, indazolyl, purinyl, isoquinolinyl, quinazolinyl, pteridinyl and the like.

The term "heteroaryl(m-nC)alkyl" means a heteroaryl group covalently attached to a (m-nC)alkylene group, both of which are defined herein.

The term "halogen" or "halo" as used herein includes reference to F, Cl, Br or I. In a particular, halogen may be F or Cl, of which Cl is more common.

The term "fluoroalkyl" is used herein to refer to an alkyl group in which one or more hydrogen atoms have been replaced by fluorine atoms. Examples of fluoroalkyl groups include —$CHF_2$, —$CH_2CF_3$, or perfluoroalkyl groups such as —$CF_3$ or —$CF_2CF_3$.

The term "substituted" as used herein in reference to a moiety means that one or more, especially up to 5, more especially 1, 2 or 3, of the hydrogen atoms in said moiety are replaced independently of each other by the corresponding number of the described substituents. The term "optionally substituted" as used herein means substituted or unsubstituted.

It will, of course, be understood that substituents are only at positions where they are chemically possible, the person skilled in the art being able to decide (either experimentally or theoretically) without inappropriate effort whether a particular substitution is possible. For example, amino or hydroxy groups with free hydrogen may be unstable if bound to carbon atoms with unsaturated (e.g. olefinic) bonds. Additionally, it will of course be understood that the substituents described herein may themselves be substituted by any substituent, subject to the aforementioned restriction to appropriate substitutions as recognised by the skilled person.

LDHs of the Invention

As discussed hereinbefore, the present invention provides a layered double hydroxide of formula (I) shown below:

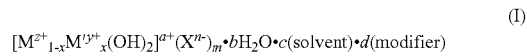

$$[M^{z+}_{1-x}M'^{y+}_{x}(OH)_2]^{a+}(X^{n-})_m \cdot bH_2O \cdot c(\text{solvent}) \cdot d(\text{modifier})\tag{I}$$

wherein

M is at least one charged metal cation;

M' is at least one charged metal cation different from M;

z is 1 or 2;

y is 3 or 4;

0<x<0.9;

0<b≤10;

0<c≤10;

0<d≤10;

X is at least one anion;

n is the charge on anion(s) X;

a is equal to z(1−x)+xy−2;

m ≥ a/n; and the solvent is an organic solvent capable of hydrogen-bonding to water; and the modifier is an organic moiety capable of covalent or ionic association with at least one surface of the layered double hydroxide, and which modifies the surface properties of the layered double hydroxide.

Through extensive studies, the inventors have determined that the surface modification of conventionally-prepared LDHs is hindered by a number of factors. Principally, the presence of large amounts of water in the conventionally-prepared LDH significantly reduces the efficiency of the reaction between the surface modifying agent and the hydroxyl functional groups located on the surface of the LDH. In particular, rather than reacting with the available hydroxyl groups on the LDH, the surface modifying agent may react preferentially with the complexed water. Moreover, the presence of water is likely to give rise to an increased number of unwanted side-reactions, thus generating undesirable by-products which results in the generation of impure materials. Attempts to address this by thermal treatment of the conventionally-prepared LDH to remove complexed water results in the undesirable formation of highly aggregated, "stone-like", non-porous bodies having low specific surface area of generally 5 to 15 m²/g, but even as low as 1 m²/g. The significantly reduced surface area translates to fewer available sites for surface modification, meaning that the ratio of LDH to surface modifying agent is undesirably low.

The inventors have now devised a means of successfully and flexibly modifying the surface properties of LDHs, thereby extending their interesting functionality to a wide array of applications. In particular, the inventors have determined that the basic synthetic steps for preparing LDH can be modified so as to reduce the amount of complexed water present in the finished material, without the need for thermal treatment. Without wishing to be bound by theory, the inventors believe that the use of a solvent dispersion process using a hydrogen bonding solvent (donor or acceptor) allows residual water present between the layers of the LDH or on its surface to be efficiently removed. In contrast to thermally-treated conventionally-prepared LDHs, the resulting LDH is a high surface area, free-flowing powder having a high concentration of available hydroxyl groups on its surface, which can be cleanly and flexibly modified with a variety of surface modifying agents.

The surface modified LDHs of the invention can be used in a variety of applications, wherein conventionally-prepared hydrophilic LDHs would be unsuitable.

The solvent used in formula (I) may have any suitable hydrogen bond donor and/or acceptor groups. Hydrogen bond donor groups include R—OH, R—NH$_2$, R$_2$NH, whereas hydrogen bond acceptor groups include ROR, R$_2$C=O RNO$_2$, R$_2$NO, R$_3$N, ROH, RCF$_3$.

In an embodiment, the solvent is selected from acetone, acetonitrile, dimethylformamide, dimethyl sulphoxide, dioxane, ethanol, methanol, n-propanol, isopropanol, tetrahydrofuran, ethyl acetate, n-butanol, sec-butanol, n-pentanol, n-hexanol, cyclohexanol, diethyl ether, diisopropyl ether, di-n-butyl ether, methyl tert-butyl ether (MTBE), tert-amyl methyl ether, cyclopentyl methyl ether, cyclohexanone, methyl ethyl ketone (MEK), methyl isobutyl ketone (MIBK), methyl isoamyl ketone, methyl n-amyl ketone, furfural, methyl formate, methyl acetate, isopropyl acetate, n-propyl acetate, isobutyl acetate, n-butyl acetate, n-amyl acetate, n-hexyl acetate, methyl amyl acetate, methoxypropyl acetate, 2-ethoxyethyl acetate, nitromethane, and a mixture of two or more thereof.

Suitably, the solvent is selected from acetone, ethanol, ethyl acetate, and a mixture of two or more thereof.

The modifier is an organic moiety capable of covalent or ionic association with at least one surface of the layered double hydroxide, and which modifies the surface properties of the layered double hydroxide. It will be appreciated that the at least one surface of the LDH may be external or internal (i.e. the modifier may be intercalated between the cationic layers). The modifier may be ionically associated with the surface of the LDH via a polar or charged group located on the modifier. Alternatively, the modifier may be covalently bonded to the surface of the LDH, for example to one or more hydroxyl groups located on the LDH's surface.

Suitably, the modifier is covalently or ionically associated with at least one surface of the layered double hydroxide.

It will be understood that residues of the reaction or interaction between modifiers recited herein and the surface of the LDH are within the scope of the invention. For example, it will be understood that the present invention encompasses the reaction product of modifiers recited herein and the surface of the LDH. Similarly, it will be appreciated that when the modifier is such that there is a covalent interaction between the surface hydroxyls of the LDH and the modifier (e.g. in the case of an organosilane modifier), the surface hydroxyls of the LDH may undergo one or more transformation (e.g. loss of a proton) during interaction with modifier. Such transformed hydroxyl groups will be understood to constitute an OH group in the context of formula (I).

The modifier may increase the lipophilicity (or organophilicity) of the LDH with respect to the unmodified LDH. Alternatively, the modifier may provide a reaction site to which a separate lipophilic moiety may be subsequently coupled.

In an embodiment, the modifier is an organic moiety comprising at least 5 carbon atoms and at least one functional group that is capable of covalent or ionic association with at least one surface of the layered double hydroxide.

In an embodiment, the modifier is an organosilane compound or a surfactant. Alternatively, the modifier may be citric acid, or a salt thereof (e.g. sodium citrate).

The organosilane modifier may be a hydroxysilane, an alkoxysilane or a siloxane. Siloxane modifiers include polysiloxanes (e.g. polydimethylsiloxane).

Certain organosilane modifiers may have a structure according to formula (II) shown below:

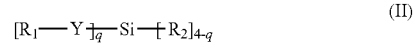

(II)

wherein q is 1, 2 or 3;

each R$_1$ is independently hydrogen or an organofunctional group;

each Y is independently absent, or is a straight or branched organic linker; and each R$_2$ is independently hydrogen, halo, hydroxy, carboxy, (1-4C)alkyl or a group —OR$_3$, wherein R$_3$ is selected from (1-6C)alkyl, aryl(1-6C)alkyl, heteroaryl(1-6C)alkyl, cycloalkyl(1-6C)alkyl, heterocyclyl(1-6C)alkyl and (1-6C)alkoxy(1-4C)alkyl.

Suitably, at least one R$_2$ is not hydrogen or (1-4C)alkyl.

It will be understood that when $R_2$ is hydroxyl, the hydroxyl group may hydrogen-bond to the free hydroxyl groups located on the surface of the LDH. Alternatively, when $R_2$ is hydroxyl, the hydroxyl group may condense with free hydroxyl groups located on the surface of the LDH, such that the organosilane modifier is covalently bonded to the LDH via at least one —Si—O-linkage. Both possibilities are illustrated in FIG. 1

It will be understood that both types of interaction illustrated in FIG. 1 are encompassed by formula (I). In particular, it will be understood that the covalently bound organosilane modifier constitutes a modifier within the context of formula (I), and that the —O— moiety is an example of a transformed surface hydroxyl as discussed hereinbefore and therefore constitutes an OH group in the context of formula (I).

When $R_2$ is carboxy or a group —$OR_3$, such groups may be hydrolysed to hydroxyl groups in the presence of residual water in the LDH. When $R_2$ is halo (e.g. Cl), a protonolysis reaction may unfold, resulting in the formation of a —Si—O— bond and the elimination of hydrogen halide (e.g. HCl).

In an embodiment, q is 1.

Suitably, the organofunctional group is selected from acrylate, methacrylate, mercapto, aldehyde, amino, azido, carboxylate, phosphonate, sulfonate, epoxy, glycidyloxy, ester, halogen, hydroxyl, isocyanate, phosphine, phosphonate, alkenyl (e.g. vinyl), aryl (e.g. phenyl), cycloalkyl, heteroaryl and heterocyclyl(e.g. morpholinyl).

More suitably, the organofunctional group is selected from halo, epoxy, glycidyloxy, mercapto, alkenyl and aryl. Yet more suitably, the organofunctional group is selected from epoxy, glycidyloxy, mercapto, alkenyl and aryl Suitably, Y is a hydrocarbylene linker group containing 1 or more carbon atoms, wherein the linker optionally contains one or more atoms selected from O, N, S and Si within the linker, and wherein the linker is optionally substituted with one or more groups selected from hydroxyl, halo, haloalkyl, (1-6C)alkyl, (2-6C)alkenyl, (2-6C)alkynyl, (1-6C)alkoxy, aryl, aryl(1-4C)alkyl, heteroaryl, heteroaryl (1-4C)alkyl, cycloalkyl, heterocyclyl, —Si($R_2$)$_3$ and $NR_xR_y$, wherein $R_2$ is as defined hereinbefore, and $R_x$ and $R_y$ are each independently hydrogen or (1-4C)alkyl.

More suitably, Y is a hydrocarbylene linker group containing 1-10 carbon atoms, wherein the linker optionally contains one or more atoms selected from O, N and S within the linker, and wherein the linker is optionally substituted with one or more groups selected from hydroxyl, halo, haloalkyl, (1-6C)alkyl, (2-6C)alkenyl, (1-6C)alkoxy, aryl, aryl(1-4C)alkyl, heteroaryl, heteroaryl(1-4C)alkyl and $NR_xR_y$, wherein $R_x$ and $R_y$ are each independently hydrogen or (1-4C)alkyl.

Alternatively, Y is absent.

In an embodiment, the organosilane modifier is selected from the group consisting of 3-aminopropyltriethoxysilane, (3-glycidyloxypropyl)triethoxysilane (3-mercaptopropyl) triethoxysilane, triethoxyvinylsilane, triethoxyphenylsilane, trimethoxy(octadecyl)silane, vinyl-tris(2-methoxy-ethoxy) silane, g-methacryloxypropyltrimethoxysilane, g-aminopropyltrimethoxysilane, b(3,4-epxycryclohexyl)ethyltrimethoxysilane, g-glycidoxypropyltrimethoxysilane, g-mercaptopropyltrimethoxysilane, (3-aminopropyl)triethoxysilane, N-(3-triethoxysilylpropyl)ethylenediamine, 3-aminopropyl-methyl-diethoxysilane, vinyltrimethoxysilane, chlorotrimethylsilane, tert-butyldimethylsilyl chloride, trichlorovinylsilane, methyltrichlorosilane, 3-chloropropyl trimethoxysilane, chloromethyltrimethylsilane, diethoxydimethyl silane, propyltrimethoxysilane, triethoxyoctylsilane, trichloro(octadecyl)silane and γ-piperazinylpropylmethyldimethoxysilane Suitably, the organosilane modifier is selected from the group consisting of 3-aminopropyltriethoxysilane, (3-glycidyloxypropyl)triethoxysilane (3-mercaptopropyl)triethoxysilane, triethoxyvinylsilane, trimethoxymethylsilane, triethoxyoctylsilane, trichloro(octadecyl)silane and triethoxyphenylsilane.

When used herein in relation to the modifier, it will be understood that the term surfactant means any compound having a hydrophilic portion capable of ionic or covalent association with the surface of the LDH, and a lipophilic portion.

In an embodiment, the surfactant is a cationic, anionic, non-ionic or amphoteric surfactant. Exemplary surfactants include sodium dodecyl sulphate and sodium dodecylbenzenesulfonate.

In an embodiment, the surfactant is a (4-22C)fatty acid, or a salt thereof. Exemplary surfactants include butyric acid, caproic acid, lauric acid, myristic acid, palmitic acid stearic acid, arachidic acid, oleic acid, linoleic acid, maleic acid, and salts thereof. Suitably, the surfactant is selected from stearic acid, lauric acid, or a salt thereof (e.g. sodium salts).

In an embodiment, when z is 2, M is Mg, Zn, Fe, Ca, Sn, Ni, Cu, Co, Mn or Cd or a mixture of two or more of these, or when z is 1, M is Li. Suitably, z is 2 and M is Ca, Mg, Zn or Fe. More suitably, z is 2 and M is Ca, Mg or Zn.

In an embodiment, when y is 3, M' is Al, Ga, Y, In, Fe, Co, Ni, Mn, Cr, Ti, V, La or a mixture thereof, or when y is 4, M' is Sn, Ti or Zr or a mixture thereof. Suitably, y is 3. More suitably, y is 3 and M' is Al.

Suitably, M' is Al.

In an embodiment, x has a value according to the expression $0.18<x<0.9$. Suitably, x has a value according to the expression $0.18<x<0.5$. More suitably, x has a value according to the expression $0.18<x<0.4$.

In an embodiment, the layered double hydroxide of formula (I) is a Zn/Al, Mg/Al, ZnMg/Al, Ni/Ti, Mg/Fe, Ca/Al, Ni/Al or Cu/Al layered double hydroxide.

The anion(s) X in the LDH may be any appropriate organic or inorganic anion, for example halide (e.g., chloride), inorganic oxyanions (e.g. $X'_mOn(OH)_p^{q-}$; m=1-5; n=2-10; p=0-4, q=1-5; X'=B, C, N, S, P: e.g. carbonate, bicarbonate, hydrogenphosphate, dihydrogenphosphate, nitrite, borate, nitrate, phosphate, sulphate), anionic surfactants (such as sodium dodecyl sulfate, fatty acid salts or sodium stearate), anionic chromophores, and/or anionic UV absorbers, for example 4-hydroxy-3-10 methoxybenzoic acid, 2-hydroxy-4 methoxybenzophenone-5-sulfonic acid (HMBA), 4-hydroxy-3-methoxy-cinnamic acid, p-aminobenzoic acid and/or urocanic acid. In an embodiment, the anion X is an inorganic oxyanion selected from carbonate, bicarbonate, hydrogenphosphate, dihydrogenphosphate, nitrite, borate, nitrate, sulphate or phosphate or a mixture of two or more thereof. More suitably, the anion X is an inorganic oxyanion selected from carbonate, bicarbonate, nitrate or nitrite.

Most suitably, the anion X is carbonate.

In a particularly suitable embodiment, M is Ca, Mg, Zn or Fe, M' is Al, and X is carbonate, bicarbonate, nitrate or nitrite. Suitably, M is Ca, Mg or Zn, M' is Al, and X is carbonate, bicarbonate, nitrate or nitrite. More suitably, M is Ca, Mg or Zn, M' is Al, and X is carbonate.

In an embodiment, M is Mg, M' is Al and X is carbonate.

In an embodiment, the layered double hydroxide of formula (I) is a $Mg_3Al$—$CO_3$ layered double hydroxide.

In an embodiment, the layered double hydroxide of formula (I) is a $Mg_4Al$—$CO_3$ layered double hydroxide.

In an embodiment, the layered double hydroxide of formula (I) is a $Mg_5Al$—$CO_3$ layered double hydroxide.

In an embodiment, the layered double hydroxide of formula (I) is a $Mg_2ZnAl$—$CO_3$ layered double hydroxide.

In an embodiment, M is Mg, M' is Al, X is carbonate and the solvent is ethanol or acetone.

In an embodiment, M is Mg, M' is Al, X is carbonate and the modifier is a (4-22C)fatty acid, or a salt thereof.

In an embodiment, M is Mg, M' is Al, X is carbonate, the solvent is ethanol or acetone and the modifier is a (4-22C) fatty acid, or a salt thereof.

In an embodiment, M is Mg, M' is Al, X is carbonate and the modifier is an organosilane compound.

In an embodiment, M is Mg, M' is Al, X is carbonate, the solvent is ethanol or acetone and the modifier is an organosilane compound.

In an embodiment, b has a value according to the expression $0<b\leq7.5$. Suitably, b has a value according to the expression $0<b\leq5$. More suitably, b has a value according to the expression $0<b\leq3$. Even more suitably, b has a value according to the expression $0<b\leq1$ (e.g. $0.2<b\leq0.95$).

In an embodiment, c has a value according to the expression $0<c\leq7.5$. Suitably, c has a value according to the expression $0<c\leq5$. More suitably, c has a value according to the expression $0<c\leq1$. Most suitably, c has a value according to the expression $0<c\leq0.5$.

In an embodiment, d has a value according to the expression $0.01<d\leq5$. Suitably, d has a value according to the expression $0.01<d\leq3$. d may also have a value according to the expression $0.1<d\leq3$ or $1<d\leq3$. In an embodiment, d has a value according to the expression $1\leq d\leq2$. In an embodiment, d has a value according to the expression $1.55\leq d\leq2$. In an embodiment, the value of d is not greater than the value of a.

In an embodiment, the LDH has a BET surface area (as determined by $N_2$ adsorption) of at least 40 $m^2/g$. Suitably, the LDH has a BET surface area of at least 70 $m^2/g$. More suitably, the LDH has a BET surface area of at least 125 $m^2/g$. Even more suitably, the LDH has a BET surface area of at least 180 $m^2/g$. Yet more suitably, the LDH has a BET surface area of at least 240 $m^2/g$. Yet more suitably, the LDH has a BET surface area of at least 275 $m^2/g$. Most suitably, the LDH has a BET surface area of at least 300 $m^2/g$.

In an embodiment, the layered double hydroxide has a BET ($N_2$) pore volume of at least 0.3 $cm^3/g$. Suitably, the layered double hydroxide has a BET pore volume of at least 0.4 $cm^3/g$. More suitably, the layered double hydroxide has a BET pore volume of at least 0.5 $cm^3/g$. Yet more suitably, the layered double hydroxide has a BET pore volume of at least 0.75 $cm^3/g$. Most suitably, the layered double hydroxide has a BET pore volume of at least 0.9 $cm^3/g$.

In an embodiment, the LDH has a loose bulk density of less than 0.5 g/mL. Suitably, the LDH has a loose bulk density of less than 0.35 g/mL. More suitably, the LDH has a loose bulk density of less than 0.25 g/mL. In an embodiment, the LDH has a tap density of less than 0.5 g/mL. Tap densities are calculated by standard testing method (ASTM D7481-09) using a graduated cylinder. The powder was filled into a cylinder and a precise weight of sample (m) was measured. The volume was measured before ($V_0$) and after 1000 taps ($V_t$). The loose bulk and tap densities were calculated by: Loose bulk density=$m/V_0$; Tap density=$m/V_t$. Suitably, the LDH has a tap density of less than 0.4 g/mL. More suitably, the LDH has a tap density of less than 0.35 g/mL.

In an embodiment, the LDH has a moisture uptake level of less than 20 wt % of dry LDH, when measured at RH99 at 20° C. for 120 hours. Suitably, the LDH has a moisture uptake level of less than 15 wt % of dry LDH, when measured at RH99 at 20° C. for 120 hours. More suitably, the LDH has a moisture uptake level of less than 10 wt % of dry LDH, when measured at RH99 at 20° C. for 120 hours.

In an embodiment, the LDH has a modifier/M' molar ratio of greater than 0.32. Suitably, the LDH has a modifier/Al molar ratio of greater than 0.32. In an embodiment, the LDH has been modified with an organosilane modifier and the LDH has a Si/M' molar ratio of greater than 0.32. In an embodiment, the LDH has been modified with an organosilane modifier and the LDH has a Si/Al molar ratio of greater than 0.32. In an embodiment, the LDH has a BET surface area of at least 40 $m^2/g$ and a modifier/M' molar ratio of greater than 0.32. In an embodiment, the LDH has a BET surface area of at least 100 $m^2/g$ and a modifier/M' molar ratio of greater than 0.32.

In another aspect, the present invention provides a layered double hydroxide obtainable, obtained or directly obtained by a process defined herein.

Preparation of LDHs

As described hereinbefore, the present invention also provides a process for the preparation of a layered double hydroxide of formula (I), the process comprising the steps of:

a) providing a layered double hydroxide of formula (Ia):

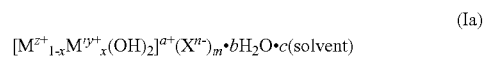

(Ia)

wherein M, M', z, y, x, b, c, X, m, and the solvent are as specified for formula (I);

b) providing a modifier being an organic moiety capable of covalent or ionic association with at least one surface of the layered double hydroxide, and which is capable of modifying the surface properties of the layered double hydroxide; and c) contacting the layered double hydroxide of formula (Ia) provided in step a) with the modifier provided in step b).

In an embodiment, the layered double hydroxide provided in step a) is prepared by a process comprising the steps of I. providing a water-washed, wet precipitate of formula (II) shown below, said precipitate having been formed by contacting aqueous solutions containing cations of the metals M and M', the anion(s) $X^{n-}$, and optionally an ammonia-releasing agent, and then ageing the reaction mixture:

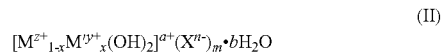

(II)

wherein M, M', z, y, x, m, b and X are as defined for formula (I);

II. dispersing the water-washed, wet precipitate of step I) in a solvent as defined for formula (I) to produce a slurry; and III. maintaining the slurry resulting from step II).

Having deduced that the surface modification of LDHs is hindered by the presence of residual water in the LDH and/or the agglomeration of LDH crystals as a result of the thermal treatment of conventionally prepared LDHs, the inventors have devised a process whereby a high surface area LDH having low residual water content is modified with a variety of surface modifiers. Without wishing to be bound by theory, the inventors have hypothesised that by preparing an LDH by a process that comprises a step of treating the LDH with an organic solvent having hydrogen bonding characteristics (e.g. as donor or acceptor), residual water present between the layers of the LDH or on its surface can be efficiently removed. The removal of this residual water greatly reduces the extent to which individual LDH particulates or crystallites aggregate through hydrogen-bonding of residual water present on their surfaces, thereby resulting in a finer, free-flowing LDH powder having high surface area and a higher concentration of surface hydroxyl groups available for modification.

In an embodiment, the LDH of formula (Ia) has a BET (as determined by $N_2$ adsorption) surface area of at least 40 $m^2/g$. Suitably, the LDH of formula (Ia) has a BET surface area of at least 70 $m^2/g$. More suitably, the LDH of formula (Ia) has a BET surface area of at least 125 $m^2/g$. Even more suitably, the LDH of formula (Ia) has a BET surface area of at least 180 $m^2/g$. Yet more suitably, the LDH of formula (Ia) has a BET surface area of at least 240 $m^2/g$. Yet more suitably, the LDH of formula (Ia) has a BET surface area of at least 275 $m^2/g$. Most suitably, the LDH of formula (Ia) has a BET surface area of at least 300 $m^2/g$.

In an embodiment, the layered double hydroxide of formula (Ia) has a BET ($N_2$) pore volume of at least 0.3 $cm^3/g$. Suitably, the layered double hydroxide of formula (Ia) has a BET pore volume of at least 0.4 $cm^3/g$. More suitably, the layered double hydroxide of formula (Ia) has a BET pore volume of at least 0.5 $cm^3/g$. Yet more suitably, the layered double hydroxide of formula (Ia) has a BET pore volume of at least 0.75 $cm^3/g$. Most suitably, the layered double hydroxide of formula (Ia) has a BET pore volume of at least 0.9 $cm^3/g$.

In an embodiment, the LDH of formula (Ia) has a loose bulk density of less than 0.5 g/mL. Suitably, the LDH of formula (Ia) has a loose bulk density of less than 0.35 g/mL. More suitably, the LDH of formula (Ia) has a loose bulk density of less than 0.25 g/mL. In an embodiment, the LDH of formula (Ia) has a tap density of less than 0.5 g/mL. Tap densities are calculated by standard testing method (ASTM D7481-09) using a graduated cylinder. The powder was filled into a cylinder and a precise weight of sample (m) was measured. The volume was measured before ($V_0$) and after 1000 taps ($V_t$). The loose bulk and tap densities were calculated by: Loose bulk density=m/$V_0$; Tap density=m/$V_t$. Suitably, the LDH of formula (Ia) has a tap density of less than 0.4 g/mL. More suitably, the LDH of formula (Ia) has a tap density of less than 0.35 g/mL. Yet more suitably, the LDH of formula (Ia) has a tap density of less than 0.27 g/mL.

The term "water-washed wet precipitate of formula (II)" used in step (I) will be understood to define a material having a composition defined by formula (II) which has been precipitated out of a solution of reactants and has subsequently been washed with water and then dried and/or filtered to the point that it is still damp. Crucially, the water-washed wet precipitate is not allowed to dry prior to it being dispersed in the solvent according to step (II), since to do so results in the formation of highly agglomerated, stone-like particles of LDH, whose low surface area renders them inferior for surface modification using the types of modifiers described herein. The wet precipitate may have a moisture content of 15 to 60% relative to the total weight of the wet precipitate.

It will be understood that the water-washed wet precipitate of step (I) may be pre-formed. Alternatively, the water-washed wet precipitate of step I) may be prepared as part of step (I), in which case step (I) comprises the following steps:
(i) precipitating a layered double hydroxide having the formula (II) from an aqueous solution containing cations of the metals M and M', the anion(s) $X^{n-}$, and optionally an ammonia-releasing agent;
(ii) ageing the layered double hydroxide precipitate obtained in step (i) in the reaction mixture of step (i);
(iii) collecting the aged precipitate resulting from step (ii), then washing it with water and optionally a 'solvent' as defined hereinbefore for formula (I); and
(iv) drying and/or filtering the washed precipitate to the point that it is still damp.

The ammonia-releasing agent used in step i) may increase the aspect ratio of the resulting LDH platelets. Suitable ammonia-releasing agents include hexamethylene tetraamine (HMT) and urea. Suitably, the ammonia-releasing agent is urea. The amount of ammonia-releasing agent used in step i) may be such that the molar ratio of ammonia-releasing agent to metal cations (M+M') is 0.5:1 to 10:1 (e.g. 1:1 to 6:1 or 4:1 to 6:1).

In an embodiment, in step (i), the precipitate is formed by contacting aqueous solutions containing cations of the metals M and M', the anion $X^{n-}$, and optionally an ammonia-releasing agent, in the presence of a base being a source of $OH^-$ (e.g. NaOH, $NH_4OH$, or a precursor for $OH^-$ formation). Suitably the base is NaOH. In an embodiment, the quantity of base used is sufficient to control the pH of the solution above 6.5. Suitably, the quantity of base used is sufficient to control the pH of the solution at 6.5-13. More suitably, the quantity of base used is sufficient to control the pH of the solution at 7.5-13. Yet more suitably, the quantity of base used is sufficient to control the pH of the solution at 9-11.

In an embodiment, in step (ii), the layered double hydroxide precipitate obtained in step i) is aged in the reaction mixture of step (i) for a period of 5 minutes to 72 hours at a temperature of 15-180° C. (e.g. 18-40° C.).

Suitably, in step (ii), the layered double hydroxide precipitate obtained in step (i) is aged in the reaction mixture of step (i) for a period of 1 to 72 hours. More suitably, in step (ii), the layered double hydroxide precipitate obtained in step (i) is aged in the reaction mixture of step (i) for a period of 5 to 48 hours. Most suitably, in step (ii), the layered double hydroxide precipitate obtained in step (i) is aged in the reaction mixture of step (i) for a period of 12 to 36 hours.

Suitably, in step (ii), the layered double hydroxide precipitate obtained in step (i) is aged in the reaction mixture of step (i) at a temperature of 80-150° C. More suitably, in step (ii), the layered double hydroxide precipitate obtained in step (i) is aged in the reaction mixture of step (i) at a temperature of 90-140° C.

Step (ii) may be performed in an autoclave.

In an embodiment, in step (iii), the aged precipitate resulting from step (ii) is collected, then washed with water and optionally a solvent as defined hereinbefore for formula (I) until the filtrate has a pH in the range of 6.5-7.5. Suitably, step (iii) comprises washing the aged precipitate resulting from step (ii) with a mixture of water and solvent at a temperature of 15-100° C. (e.g. 18-40° 0). More suitably, the solvent is selected from ethyl acetate, ethanol and acetone. More suitably, the quantity of solvent in the washing mixture is 5-95% (v/v), preferably 30-70% (v/v).

In an embodiment, the slurry produced in step II) and then maintained in step III) contains 1-100 g of water-washed wet precipitate per 1 L of solvent. Suitably, the slurry produced in step II) and maintained in step III) contains 1-75 g of water-washed wet precipitate per 1 L of solvent. More suitably, the slurry produced in step II) and maintained in step III) contains 1-50 g of water-washed wet precipitate per 1 L of solvent. Most suitably, the slurry produced in step II) and maintained in step III) contains 1-30 g of water-washed wet precipitate per 1 L of solvent.

In step III), the slurry produced in step II) is maintained for a period of time. Suitably, the slurry is stirred during step III).

In an embodiment, in step III), the slurry is maintained for a period of 0.5 to 120 hours (e.g. 0.5 to 96 hours). Suitably, in step III), the slurry is maintained for a period of 0.5 to 72 hours. More suitably, in step III), the slurry is maintained for a period of 0.5 to 48 hours. Even more suitably, in step III), the slurry is maintained for a period of 0.5 to 24 hours. Yet more suitably, in step III), the slurry is maintained for a period of 0.5 to 24 hours. Most suitably, in step III), the slurry is maintained for a period of 1 to 8 hours. Alternatively, in step III), the slurry is maintained for a period of 16 to 20 hours).

The LDH resulting from step III) may be isolated by any suitable means, including filtering, filter pressing, spray drying, cycloning and centrifuging. The isolated layered double hydroxide may then be dried to give a free-flowing powder. The drying may be performed under ambient conditions, in a vacuum, or by heating to a temperature below 60° C. (e.g. 20 to 60° C.).

Suitably, the layered double hydroxide resulting from step III) is isolated and then heated to a temperature of 10-40° C. in a vacuum until a constant mass is reached. In an embodiment, the LDH may be dried by heating at 50° C.-200° C., such as 100° C.-200° C., for example 150° C.-200° C.

In an embodiment, the slurry maintained in step (III) may be used directly in step c) (i.e. the LDH is not isolated from the slurry prior to conducting step c)). In such embodiments, the modifier of step b) may be added directly to the slurry of step III), with mixing.

The LDH isolated after step III) may be used directly in step c). Alternatively, the LDH may be treated with at least one solvent as defined herein for formula (I). In certain embodiments, it may be advantageous to perform one or more additional solvent treatment steps on the isolated LDH. In an embodiment, the isolated layered double hydroxide is washed with at least one solvent (e.g. using Buchner apparatus). Alternatively, the isolated LDH is subjected to a step IV) comprising the steps of:
i. dispersing the isolated layered double hydroxide in a solvent as defined hereinbefore for formula (I) to form a slurry;
ii. maintaining the slurry for a period of 0.5 to 72 hours;
iii. isolating the layered double hydroxide resulting from step ii; and
iv. optionally repeating steps i. to iii. a further 1-10 times (e.g. once or twice).

Hence, step IV) may comprise performing additional dispersion-maintaining-isolation cycles in order to remove more residual water from the layered double hydroxide.

In an embodiment, the LDH provided in step a) (i.e. the LDH of formula (Ia)) may be prepared by providing a water-washed, wet precipitate of formula (II) described herein, and then contacting the water-washed, wet precipitate of formula (II) with a solvent as defined herein for formula (I). For example, the water-washed, wet precipitate of formula (II) described herein may be rinsed or washed with a solvent as defined herein for formula (I).

The LDH provided in step a) may be referred to herein (e.g. in the Examples) as an "AMO-LDH" or an "AIM-LDH". These refer to LDHs which have been treated with solvents that are capable of hydrogen-bonding to water and include aqueous miscible organic solvents (e.g. ethanol or acetone) and aqueous immiscible organic solvents (e.g. ethyl acetate).

In an embodiment, the layered double hydroxide is provided in step a) as a slurry comprising a solvent, wherein the solvent is as defined for formula (I).

The modifier provided in step b) may be provided in a solvent.

Step c) may be conducted by a variety of means. In its simplest form, step c) comprises mixing the LDH provided in step a) with the modifier provided in step b). Step c) may be conducted in air or under an inert atmosphere (e.g. under a $N_2$ blanket).

When the LDH provided in step a) is in the form of a slurry, step c) may comprise adding the modifier of step b) into the slurry with mixing.

The product resulting from step c) may be isolated by a variety of means. In an embodiment, the product resulting from step c) is thermally treated, optionally under vacuum.

The product resulting from step c) may also be thermally treated in a spray dryer.

It will be appreciated that any one or more of M, M', z, y, x, a, b, m, c, n and X may, as appropriately, have any of the definitions appearing hereinbefore for formula (I).

It will be appreciated that the modifier used discussed in steps b) and c) may have any of the definitions appearing hereinbefore in relation to the LDHs of the invention.

Applications of the LDHs

As described hereinbefore, the present invention also provides a composite material comprising a layered double hydroxide as defined herein dispersed throughout a polymer.

LDHs have a variety of interesting properties that make them attractive materials for use as fillers in polymeric composites. However, given that conventionally-prepared LDHs are only dispersible in aqueous solvents, the preparation of polymer-LDH composite materials using polymers that are soluble in organic solvents has been restricted.

Owing to their increased organophilicty, the LDHs of the invention have increased dispersibility in a range of organic solvents. This allows the preparation of a homogenous mixture of LDH, polymer and solvent, which can be processed into a LDH-polymer composite material wherein the LDH is uniformly dispersed throughout the polymeric matrix.

In an embodiment, the polymer is selected from polypropylene, polyethylene, polyvinyl chloride, polyvinylidene chloride, polylactic acid, polyvinyl acetate, ethylene vinyl alcohol, ethylene vinyl acetate, acrylonitrile butadiene styrene, polymethyl methacrylate, polycarbonate, polyamide, an elastomer, or mixtures of two or more of the aforementioned.

In an embodiment, the polymer is a biopolymer.

EXAMPLES

Embodiments of the invention will now be described, for the purpose of illustration only, with reference to the accompanying figures, in which FIG. 1 shows possible interactions between organosilane modifiers and the LDH surface.

EXAMPLE 1—PREPARATION OF LDHS

AMO-LDH-1

Figure 1:
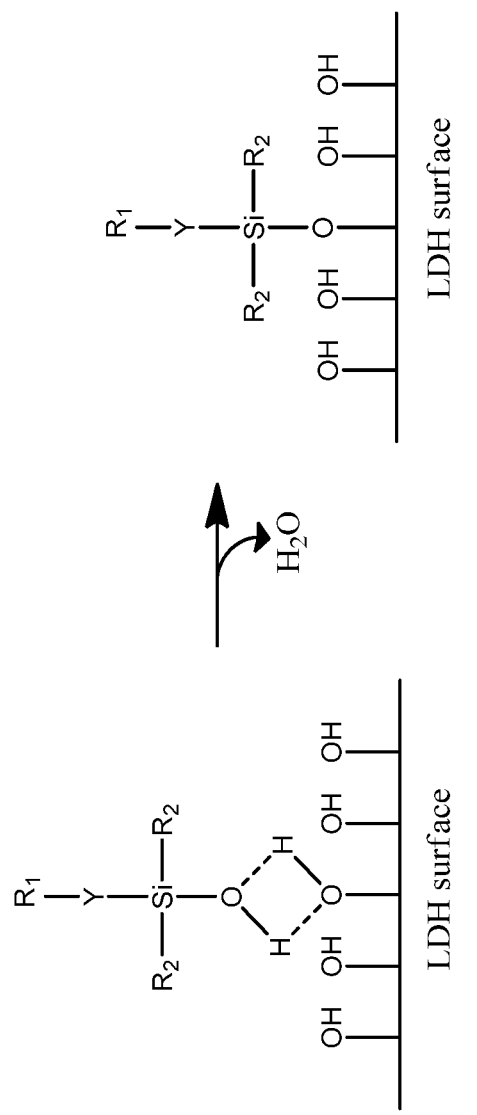

Mg(NO$_3$)$_2$.6H$_2$O (9.60 g, 37.4 mmol) and Al(NO$_3$)$_3$.9H$_2$O (4.68 g, 12.5 mmol) were dissolved in 50 mL of distilled water (Solution A). A second solution was made containing Na$_2$CO$_3$ (2.65 g, 25.0 mmol) and NaOH (4 g, 100 mmol) dissolved in 200 mL distilled water (Solution B). Solution A was added quickly to Solution B and stirred for 30 minutes. The LDH was washed twice with water and once with acetone by centrifuge-washing cycles. Six centrifuge tubes were used at 9000 rpm for five minutes. The resulting LDH slurry was dispersed in 200 mL acetone for 17 hours. The LDH slurry was then filtered, washed with 100 mL acetone and dispersed in 100 mL acetone for one hour. This procedure was repeated three times. The resulting LDH was dried overnight in a vacuum oven.

AMO-LDH-2

The mixed metal solution was prepared from 9.6 g of Mg(NO$_3$)$_2$.6H$_2$O, 4.7 g of Al(NO$_3$)$_3$.9H$_2$O (4.68 g, 12.5 mmol) in 50 mL of de-carbonated water (Solution A). A second solution contained 2.65 g of Na$_2$CO$_3$ in 50 mL of deionised water. (Solution B). The solution A was added drop-wise (58 mL/min) to the Solution B. The system was kept at constant pH 10 by using 4 M NaOH and aged for 16 hours at room temperature. Then, the slurry was washed by de-carbonated water until the pH was close to 7 and followed by washing by using ethanol. The slurry was washed with 1000 ml of ethanol and then re-dispersed in 600 ml of this solvent for 1 hour. Then the obtained LDH solid was filtered, rinsed with 400 mL of ethanol, and dried in a vacuum oven for 24 hours.

EXAMPLE 2—MODIFICATION OF LDHS 2.1—Synthesis of Orqanosilane-Modified LDHs

For organosilane modification, different silicon reagents were used; 3-aminotriethoxysilane (APTES), (3-glycidyloxypropyl)trimethoxysilane (GLYMO) and triethoxymethylsilane (TEMS). 1 g of MgAlCO$_3$-LDH (AMO-LDH-1, Example 1) was added to 50 mL of ethanol with stirring. A solution of 14 mmol of silicon reagent in 3 mL solvent (organic or aqueous) was added dropwise to the LDH solution. The resulting solution was stirred at room temperature for six hours. The LDH slurry was then washed three times with ethanol by centrifuge-washing cycles. Four centrifuge tubes were used at 4000 rpm for ten minutes. The resulting LDH was then dried overnight in a vacuum oven.

2.2—Synthesis of Stearate-Modified LDH

Zn stearate (80 mg) was dissolved in 20 mL of xylene at 70° C. 200 mg of AMO-LDH-2 (Example 1) in 10 mL of xylene was added into Zn stearate solution. The mixture was stirred at 70° C. for 5 min. After cooling to room temperature, the solid was filtered and dried in the vacuum oven at room temperature.

2.3—Synthesis of Laurate-Modified LDH 200 mg of the obtained AMO-LDH-2 (Example 1) was dispersed in 10 mL of ethanol. 36 mg of sodium laurate was dissolved in ethanol at 70° C. Then the LDH slurry was quickly added to the laurate solution and kept stirring at 70° C. for 5 minutes. The final product was collected by filtration and dried in a vacuum oven overnight.

2.4—Alternative Modification Routes

Aside from those protocols outlined in Examples 2.1-2.3, the LDHs of the invention can be prepared by a variety of other synthetic routes.

Exemplary synthetic routes include:

Route 7—Air sensitive technique: AMO-LDH (e.g. 1 g) is calcined at 150° C. for 6 h in the tube furnace under vacuum (or under $N_2$). The calcined AMO-LDH is transferred into a glovebox. The AMO-LDH and the modifier (e.g. 1.8 mL) are introduced into an ampoule and a Schlenck respectively. Toluene (e.g. 10 mL) is added in both containers. The modifier/toluene solution is added onto the AMO-LDH/toluene slurry. The ampoule is heated at 100° C. overnight (16 h). The toluene is filtered away and the solid dried.

Route 8—RB flask under $N_2$: AMO-LDH (e.g. 1 g) is calcined at 150° C. for 6 h under $N_2$ in a RB flask. The calcined AMO-LDH is cooled to 25° C. Toluene (e.g. 10 mL) is added into the RB flask. Modifier (e.g. 1.8 mL) mixed with toluene (e.g. 10 mL) is added onto AMO-LDH slurry. The RB flask is heated at 100° C. overnight (16 h). The toluene is filtered away and the solid dried.

EXAMPLE 3—ORGANOSILANE MODIFIED LDHS 3.1—APTES-, GLYMO- and TEMS-Modified LDHs

THREE MODIFIED LDHS WERE PREPARED ACCORDING TO THE PROTOCOL DESCRIBED IN EXAMPLE 2.1. THE STRUCTURE OF THE 3 ORGANOSILANE MODIFIERS USED IS PROVIDED IN SCHEME 1 BELOW

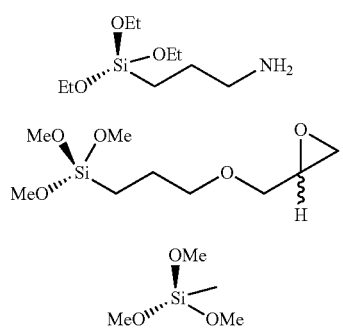

Scheme 1—Structures of (a) (3-aminopropyl)triethoxysilane (APTES); (b) (3-glycidyloxypropyl)trimethoxysilane (GLYMO); and (c) trimethoxylmethylsilane (TEMS)

Powder X-ray Diffraction (PXRD)

Figure 2:
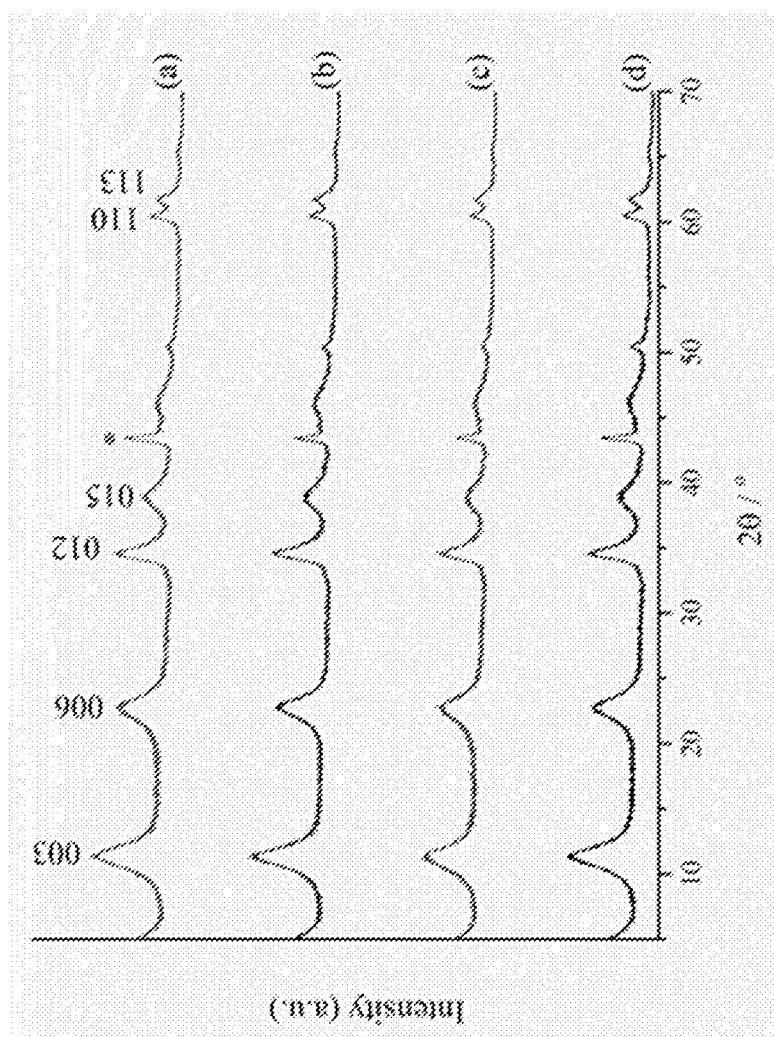
FIG. 2 shows PXRD patterns for (a) acetone-washed AMO-MgAlCO$_3$ (b) APTES, (c) GLYMO and (d) TEMS modified MgAlCO$_3$-AMO-LDH. * is an aluminium peak from the sample holder.

Structural changes can be observed from PXRD data. If the d-spacing of the 001 peaks is increased from the standard values for $MgAlCO_3$-LDH, this will suggest that the silicon reagent has been inserted into the interlayer space. The PXRD patterns for all the organosilane-modified LDHs are shown in FIG. 2.

The $d_{003}$ values for all the organosilane-modified $MgAlCO_3$-LDH are unchanged from the literature value of 7.9 Å for $MgAlCO_3$-LDH. Relative to the PXRD patterns for unmodified acetone washed $MgAlCO_3$-LDH, the LDH patterns for APTES- and TEMS-modified LDH are almost identical, with broad, weak reflections. This indicates that the products remain composed of just a few stacked layers of LDH nanosheets and the rigid stacking of LDHs prepared without acetone treatment has not been restored. The reflections for GLYMO-modified LDH appear slightly broader, indicating a reduction in crystallinity.

Table 1 gives the average crystallite domain length (CDL) and average crystallite size for each of the samples.

TABLE 1

Average crystallite sizes for the different organosilane-modified LDHs

| Sample | CDL (Å) (along c-axis) | CDL (Å) (along a- and b-axes) | Average size (Å) (Pielaszek method) | Size standard deviation (Å) |
|---|---|---|---|---|
| Unmodified $MgAlCO_3$-LDH | 127.3 | 636.4 | 68 | 21 |
| $MgAlCO_3$-LDH-APTES | 157.6 | 623.8 | 70 | 28 |
| $MgAlCO_3$-LDH-GLYMO | 134.8 | 734.2 | 97 | 27 |
| $MgAlCO_3$-LDH-TEMS | 164.9 | 632.6 | 76 | 23 |

Both sets of data show that when the LDH is modified with APTES and TEMS, the average crystallite size is not significantly changed, with a moderate increase along the c-axis. However, modification with GLYMO leads to a much larger crystallite size and an increase in the CDL along the a- and b-axes, whilst the CDL along the c-axis is similar to that of unmodified $MgAlCO_3$-LDH. This shows that this modification leads to a change in how the LDH plates are arranged, with aggregation along the a- and b-axes rather than the c-axis.

Fourier Transform Infrared Spectroscopy (FTIR)

Figure 3:
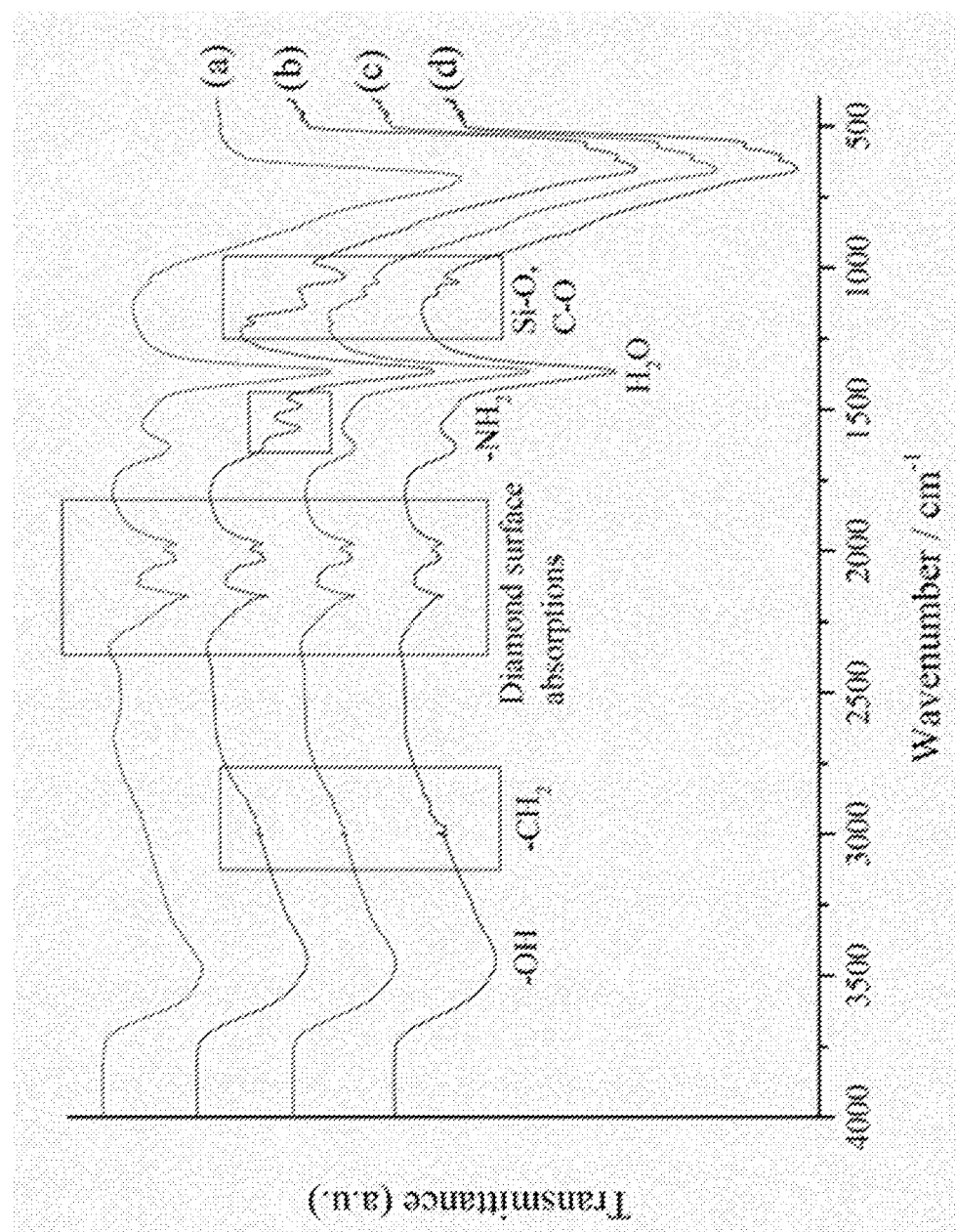
FIG. 3 shows FTIR spectrum of (a) acetone-washed AMO-MgAlCO$_3$ (b) APTES-, (c) GLYMO- and (d) TEMS-modified MgAlCO$_3$-AMO-LDH.

FIG. 3 shows the FTIR spectra for the LDH before and after modification with organosilane reagents.

The characteristic absorptions of acetone treated $MgAlCO_3$-LDH are visible for all four samples. These are the broad absorption at around 3400 $cm^{-1}$ caused by —OH bonds, the band at around 1630 $cm^{-1}$ corresponding to the bending mode of water, the absorption at 1366 $cm^{-1}$ due to carbonate and the bands below 1000 $cm^{-1}$ which are due to M-O vibrational modes.

The series of bands around 2950 $cm^{-1}$ in APTES-, GLYMO- and TEMS-modified LDH correspond to the asymmetric and symmetric stretching vibrations of —$CH_2$ and the bands around 1040 $cm^{-1}$ relate to the Si—O vibrations. For APTES-modified LDH, the band at 1568 $cm^{-1}$ indicates the presence of —$NH_2$. For GLYMO-modified LDH, the vibrations around 1200 $cm^{-1}$ are due to the presence of C—O bonds in GLYMO. In the spectrum for TEMS-grafted LDH there are the correct absorptions relating to —$CH_2$ and Si—O vibrations. Together with information from the XRD patterns, this suggests that the silicon reagents have grafted only on the outer surfaces of the LDH and are not present in the interlayer space, as the basal spacing was unchanged on modification.

Figure 4:
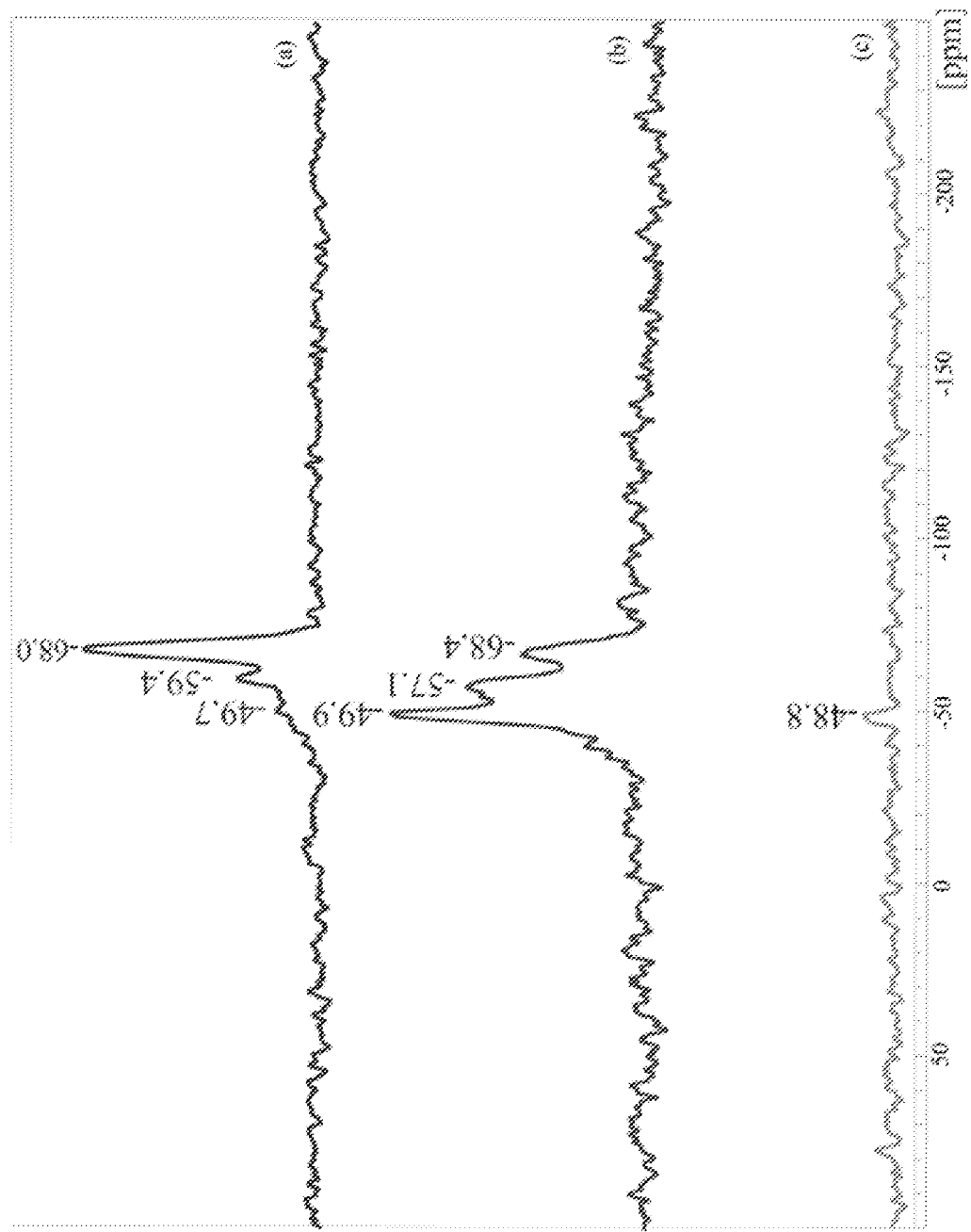
FIG. 4 shows NMR spectra for (a) APTES-modified AMO-LDH, (b) GLYMO-modified AMO-LDH and (c) TEMS-modified AMO-LDH.

NMR Spectroscopy $^{29}$Si-NMR spectroscopy can indicate how the organosilane reagents have been grafted onto the LDH. FIG. 4 shows the NMR spectra for the three different reagents.

Transmission Electron Microscopy (TEM)

Figure 5:
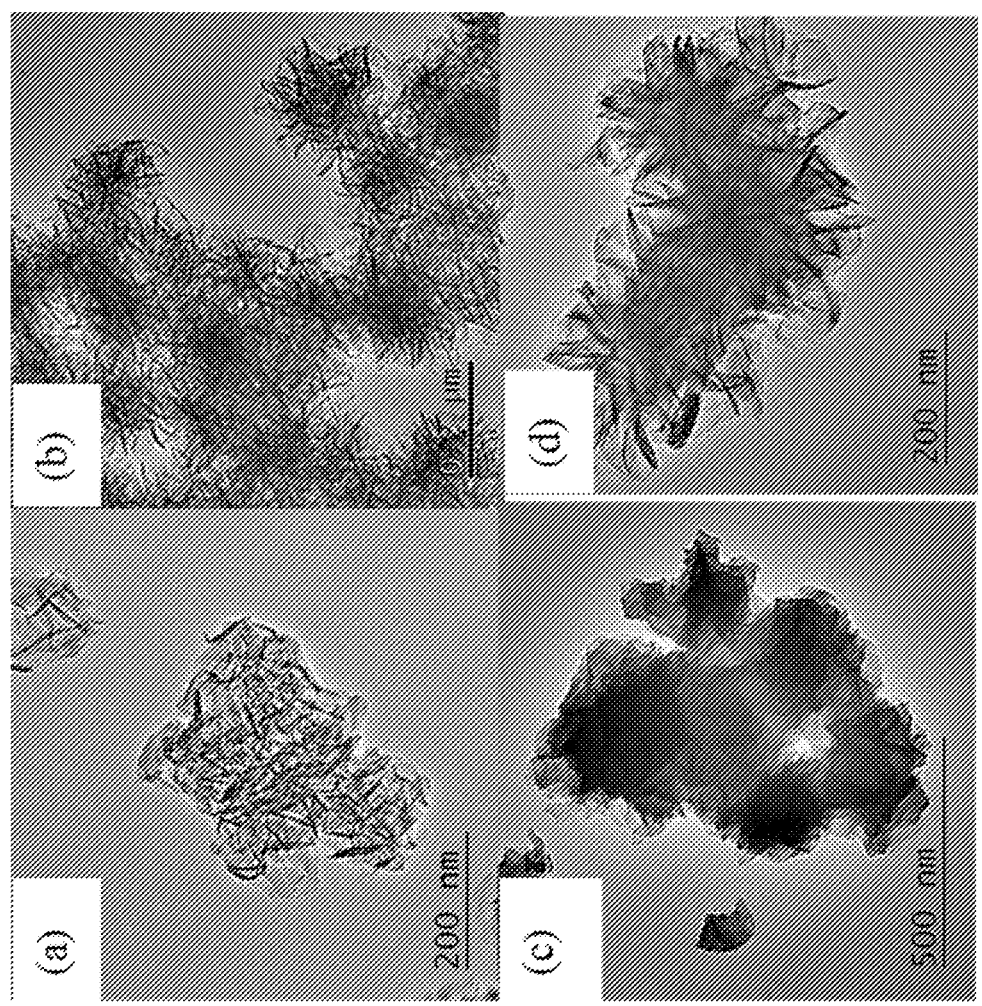
FIG. 5 shows TEM images of (a) Acetone-washed MgAlCO$_3$-LDH, (b) APTES-, (c) GLYMO- and (d) TEMS-modified MgAlCO$_3$-LDH.

FIG. 5 shows the TEM images for LDHs synthesised. For the APTES-modified sample, the sand-flower morphology has been maintained, but the darker patches on the TEM image indicate some degree of stacking perpedicular to the sample stage and the aggregates form much larger networks. This supports the suggestion that the $T^3$ bonding mode increases aggreation of the LDH nanosheets.

The TEMS-modified sample is comparable to the unmodified MgAlCO$_3$-LDH, with similar shape and size aggregates of nanosheets.

The GLYMO-modified sample has a very different morphology to the other samples. However, this does not agree with the NMR results of the GLYMO-modified sample, which showed the highest degree of $T^1$ bonding. It may be that GLYMO does lead to a greater increase in hydrophobicity, leading to this new morphology, which is not related to the Si—O bonding mode or that there are additional interactions which lead to a greater aggregation of the LDH nanosheets.

3.2—TEVS-Modified LDHs

A variety of triethoxyvinylsilane (TEVS)-modified LDHs were prepared according to Routes 7-8 outlined in Example 2.3.

Figure 6:
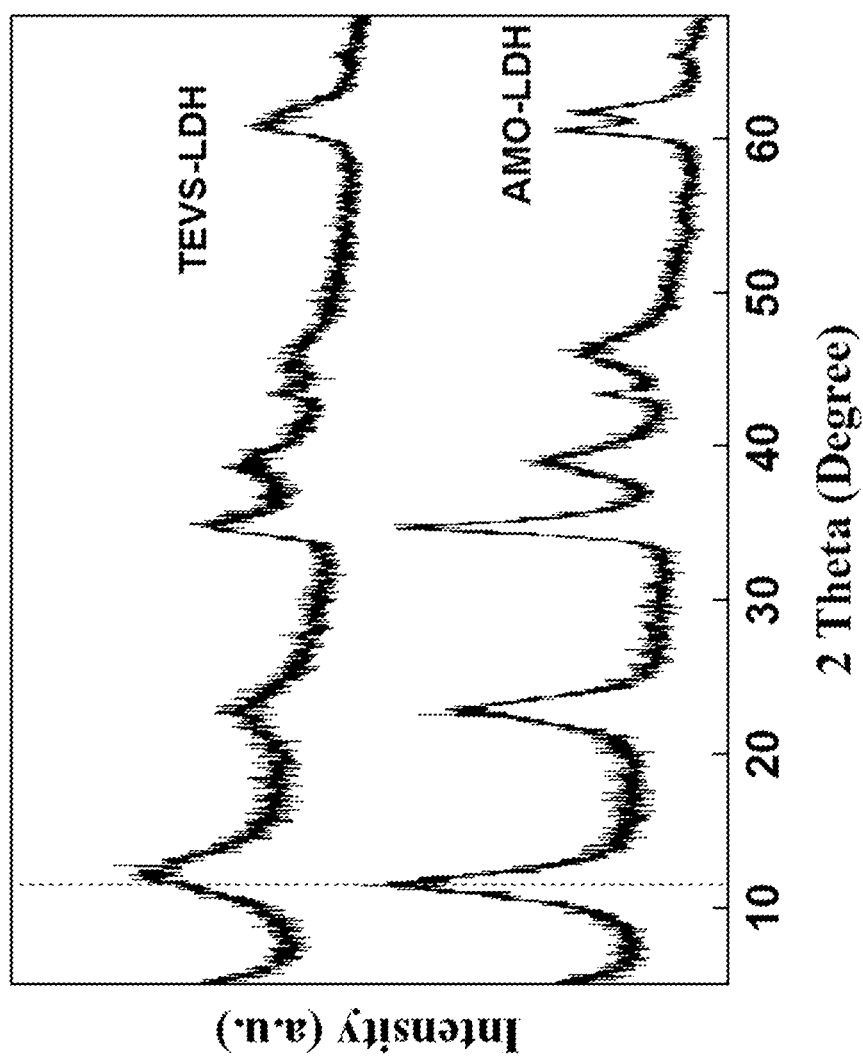
FIG. 6 shows XRD pattern of the AMO Mg$_3$Al—CO$_3$ LDH, and AMO Mg$_3$Al—CO$_3$ LDH modified with tri-ethoxyvinylsilane using Route 7.
Figure 7:
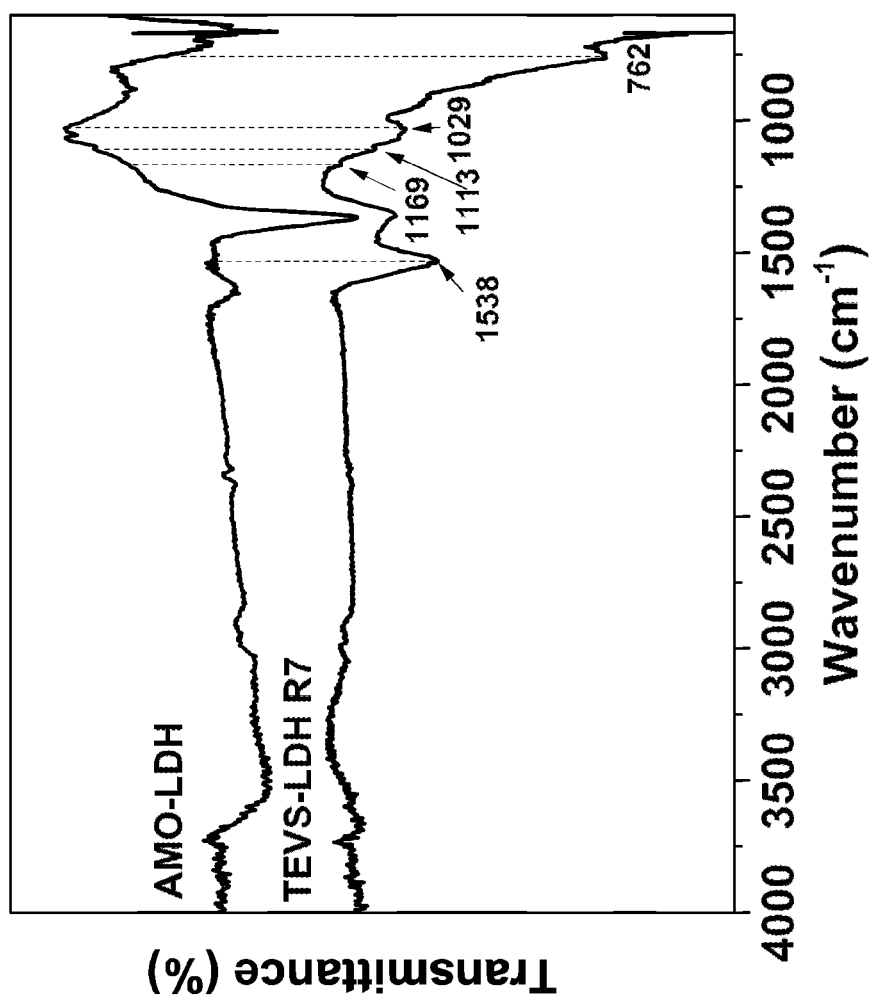
FIG. 7 shows FTIR spectra of the AMO Mg$_3$Al—CO$_3$ LDH, and AMO Mg$_3$Al—CO$_3$ LDH modified with tri-ethoxyvinylsilane using Route 7.

FIG. 6 shows the XRD pattern of the unmodified AMO Mg$_3$Al—CO$_3$ LDH, and AMO Mg$_3$Al—CO$_3$ LDH modified with triethoxyvinylsilane using Route 7. FIG. 7 shows the FTIR spectra of the unmodified AMO Mg$_3$Al—CO$_3$ LDH, and AMO Mg$_3$Al—CO$_3$ LDH modified with triethoxyvinylsilane using Route 7.

FIGS. 6 and 7 shows that the LDH (TEVS-LDH) after Route 7 treatment retains a LDH structure. However, the d(003) spacing decrease due to the loss of water in the interlayer; new peaks at 1538, 1169, 1113, 1029 and 762 cm$^{-1}$ highlight the presence of organosilane in the sample.

Figure 8:
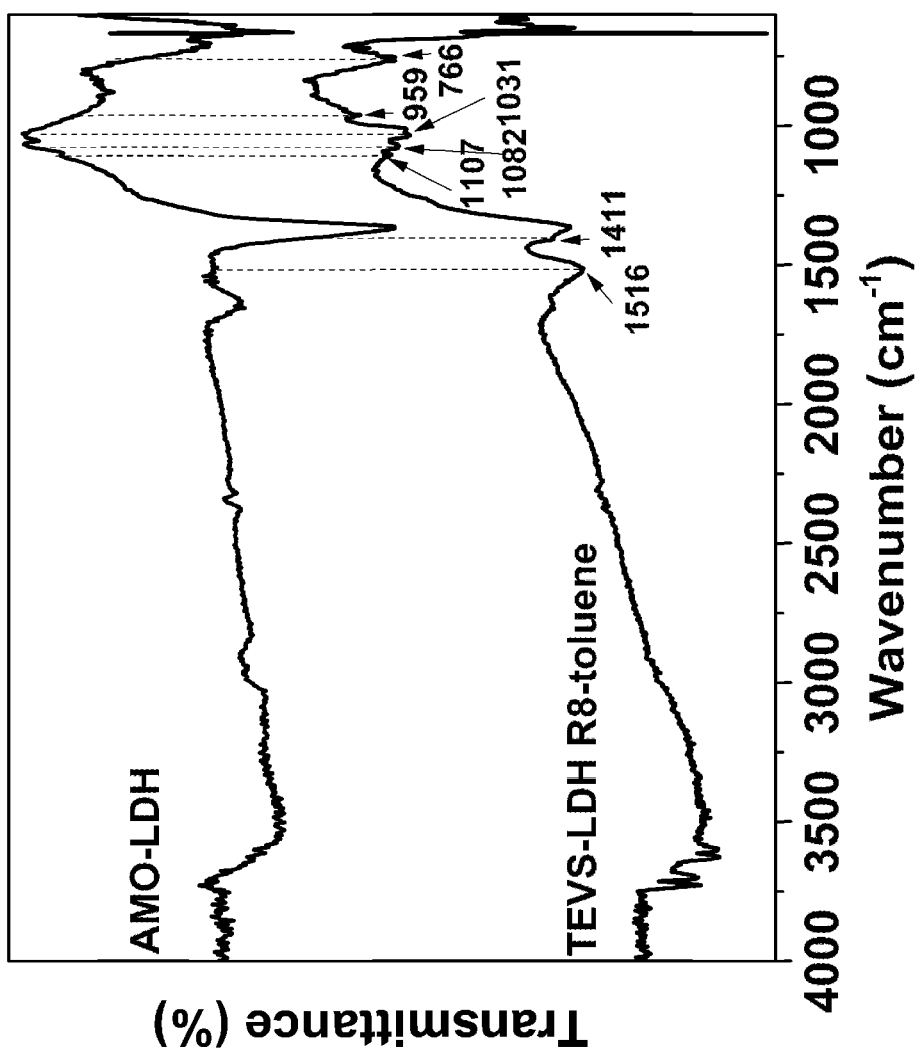
FIG. 8 shows FTIR spectra of the AMO Mg$_3$Al—CO$_3$ LDH, and AMO Mg$_3$Al—CO$_3$ LDH modified with tri-ethoxyvinylsilane using Route 8, using toluene as solvent.
Figure 9:
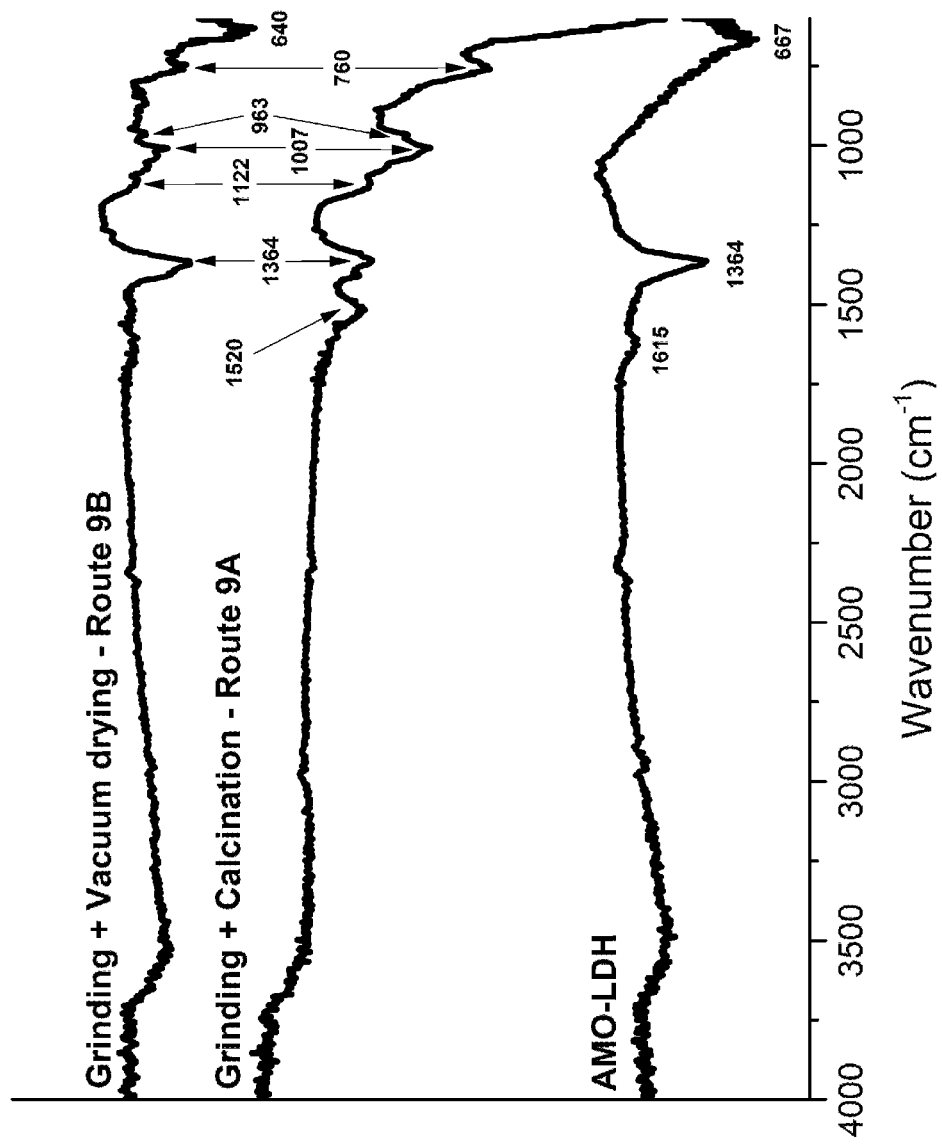
FIG. 9 shows FTIR spectra of the AMO Mg$_3$Al—CO$_3$ LDH, and AMO Mg$_3$Al—CO$_3$ LDH modified with tri-ethoxyvinylsilane.

FIG. 8 shows the FTIR spectra of the unmodified AMO Mg$_3$Al—CO$_3$ LDH, and AMO Mg$_3$Al—CO$_3$ LDH modified with triethoxyvinylsilane using Route 8 using toluene as solvent. FIG. 9 shows the FTIR spectra of the unmodified AMO Mg$_3$Al—CO$_3$ LDH, and AMO Mg$_3$Al—CO$_3$ LDH modified with triethoxyvinylsilane.

EXAMPLE 4—STEARATE-MODIFIED LDHS 4.1. Water Content Studies
Non-Calcined LDHs

A series of LDHs were successfully made via co-precipitation in 20 L container. Each sample is isolated by vacuum filtration technique and washed by water till pH at 7. Then, the sample is dispersed in EtOH and isolated again. A selection of stearate salts have been used (stearic acid, Mg stearate, Ca stearate, Zn stearate, and all types of hydroxystearate salt), which has been separately dissolved in EtOH in the range of 2-10% weight of stearate salt to volume of EtOH. The LDH series is introduced into stearate salt/EtOH solution with a ratio in the range of 0.0005-0.4 of weight LDH powder to volume of EtOH used and mixed for 15 minutes to 24 hrs. The sample is then dried at 65-180° C.

Calcined LDHs

A series of LDHs were successfully made via co-precipitation in 20 L container. Each sample is isolated by vacuum filtration technique and washed by water till pH at 7. Then, the sample is dispersed by EtOH and isolated again. The resulting LDH is then dried and calcined at 100-300° C. for 4-20 hrs. A selection of stearate salts have been used (stearic acid, Mg stearate, Ca stearate, Zn stearate, and all types of hydroxystearate salt), which has been separately dissolved in EtOH in the range of 2-10% weight of stearate salt to volume of EtOH. The LDH powder is introduced into stearate salt/EtOH solution with a ratio in the range of 0.0005-0.4 of weight LDH powder to volume of EtOH used and mixed for 15 minutes to 24 hrs. The sample is dried at 65-180° C.

Table 2 summarises the data for water content of stearate-modified Mg$_3$Al—CO$_3$ LDH.

TABLE 2

Water content studies using stearate and stearic acid modified AMO-LDH

| | Types of stearate salt | Percentage of stearate salt/volume of EtOH (% w/v) | a ratio of weight LDH powder to volume of EtOH used | Water content (% w) |
|---|---|---|---|---|
| Non-calcination | None | — | — | 13.15 |
| | Stearic acid | 3% | 0.2 | 11.48 |
| | | 4% | 0.2 | 10.21 |
| | | 5% | 0.2 | 9.95 |
| | Zn stearate | 3% | 0.2 | 9.85 |
| | | 4% | 0.2 | 6.02 |
| | | 5% | 0.2 | 5.85 |
| | Ca stearate | 3% | 0.2 | 8.75 |
| | | 4% | 0.2 | 6.58 |
| | | 5% | 0.2 | 6.34 |
| Calcination | Stearic acid | 3% | 0.2 | 8.20 |
| | | 4% | 0.2 | 7.35 |
| | | 5% | 0.2 | 7.10 |
| | Zn stearate | 3% | 0.2 | 5.67 |
| | | 4% | 0.2 | 4.65 |
| | | 5% | 0.2 | 4.43 |
| | Ca stearate | 3% | 0.2 | 6.97 |
| | | 4% | 0.2 | 5.78 |
| | | 5% | 0.2 | 4.98 |

Figure 10:
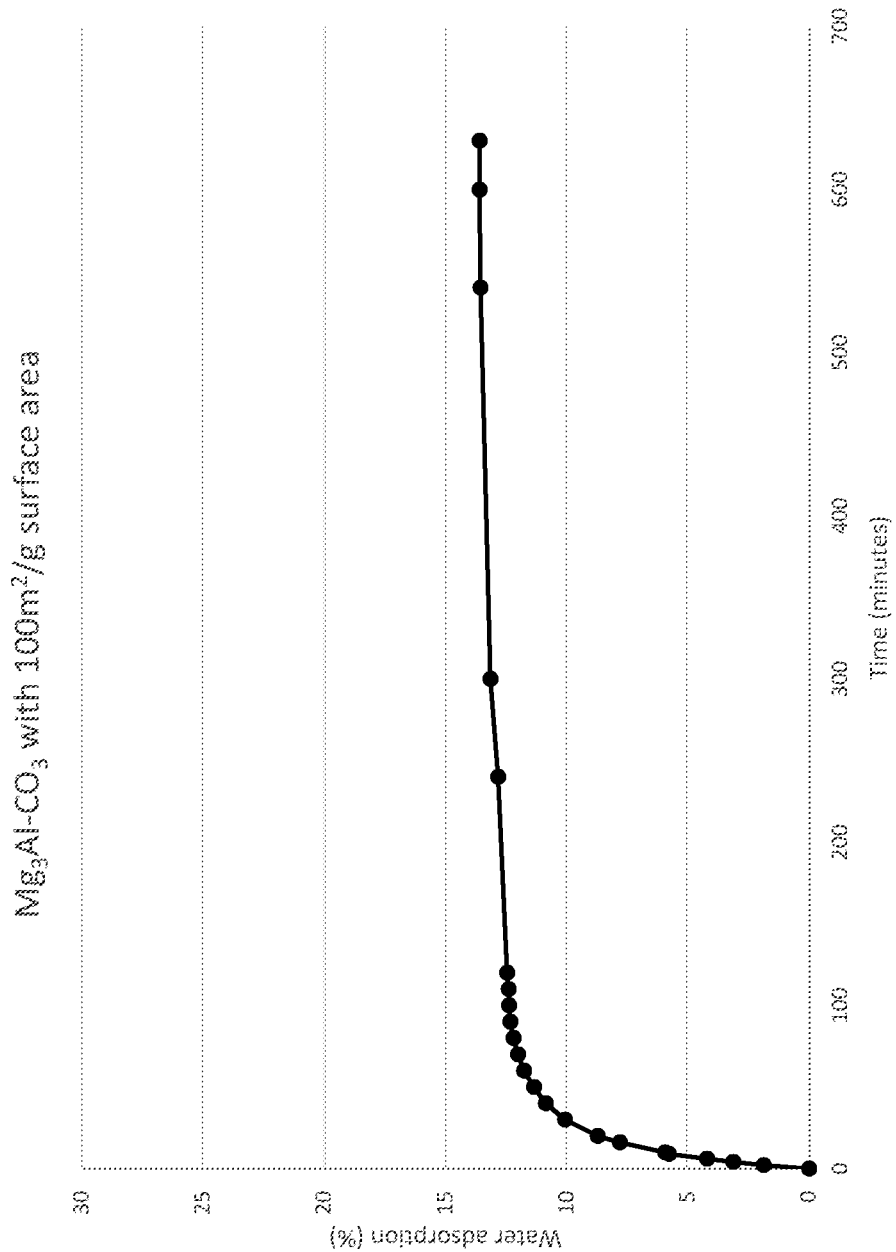
FIG. 10 shows a plot of water adsorption of Mg$_3$Al—CO$_3$ (100 m$^2$/g of surface area) without surface treatment against time.

FIG. 10 shows a plot of water adsorption of Mg$_3$Al—CO$_3$ (100 m$^2$/g of surface area) without surface treatment against time.

Figure 11:
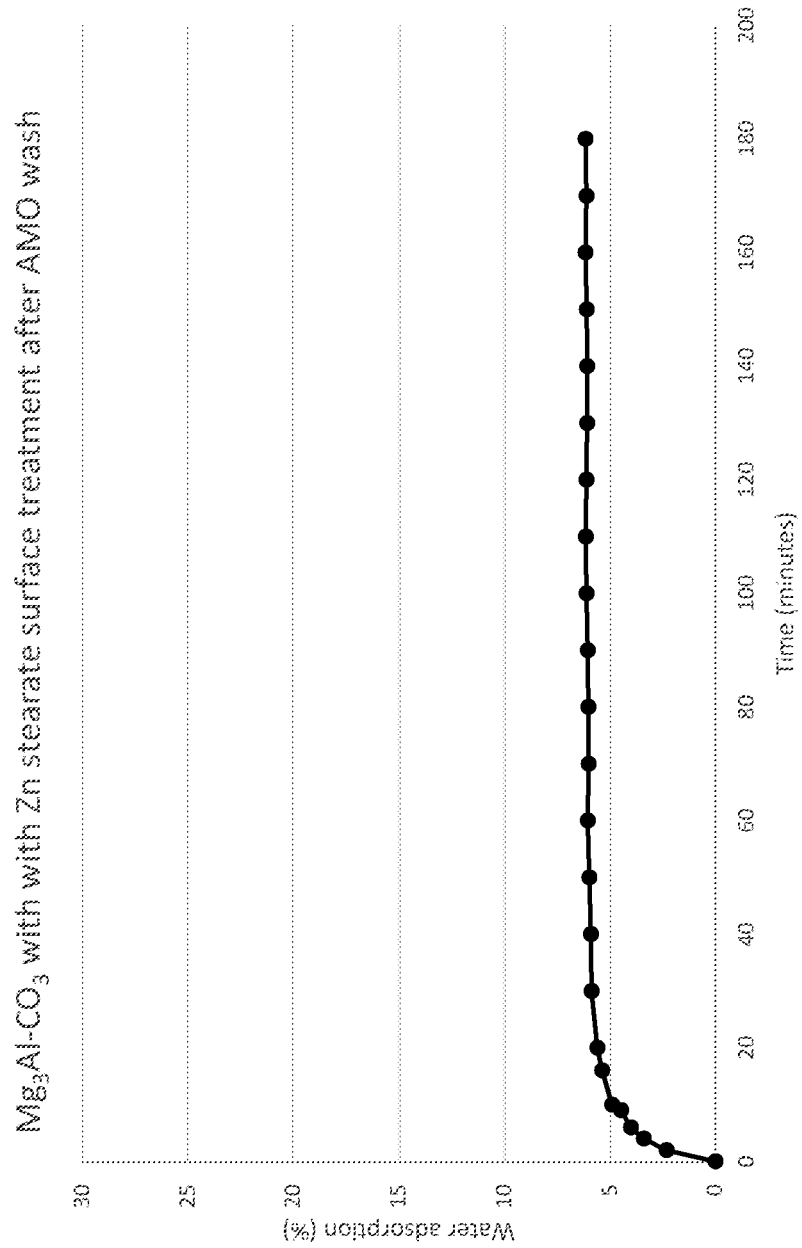
FIG. 11 shows a plot of water adsorption of Mg$_3$Al—CO$_3$ (100 m$^2$/g of surface area) with Zn stearate surface treatment after AMO wash against time.

FIG. 11 shows a plot of water adsorption of Mg$_3$Al—CO$_3$ (100 m$^2$/g of surface area) with Zn stearate surface treatment after AMO wash against time. The stearate-modified LDH was prepared following the non-calcined protocol discussed in Example 4.1.

Figure 12:
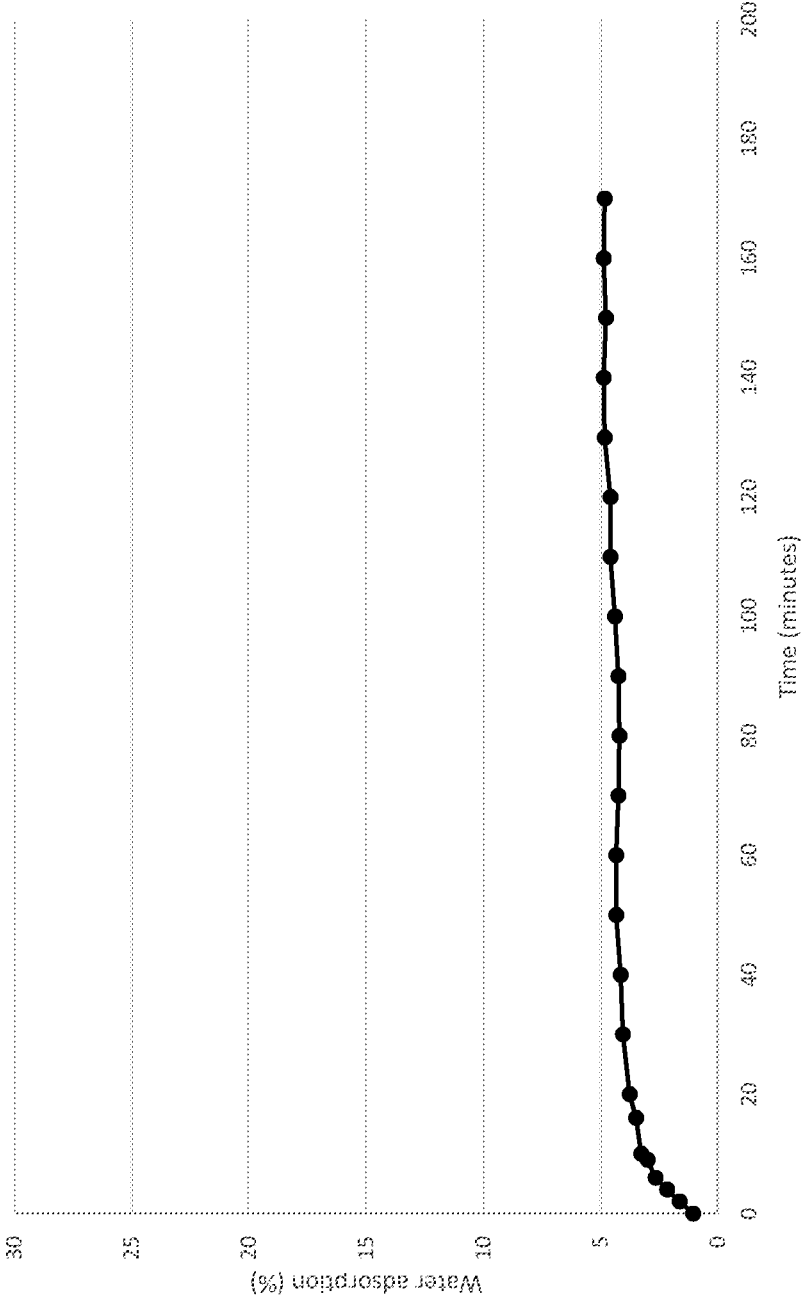
FIG. 12 shows a plot of water adsorption of Mg$_3$Al—CO$_3$ (100 m$^2$/g of surface area) with Zn stearate treatment on calcined LDH powder against time.

FIG. 12 shows a plot of water adsorption of Mg$_3$Al—CO$_3$ (100 m$^2$/g of surface area) with Zn stearate treatment on calcined LDH powder against time. The stearate-modified LDH was prepared following the calcined protocol discussed in Example 4.1.

Figure 13:
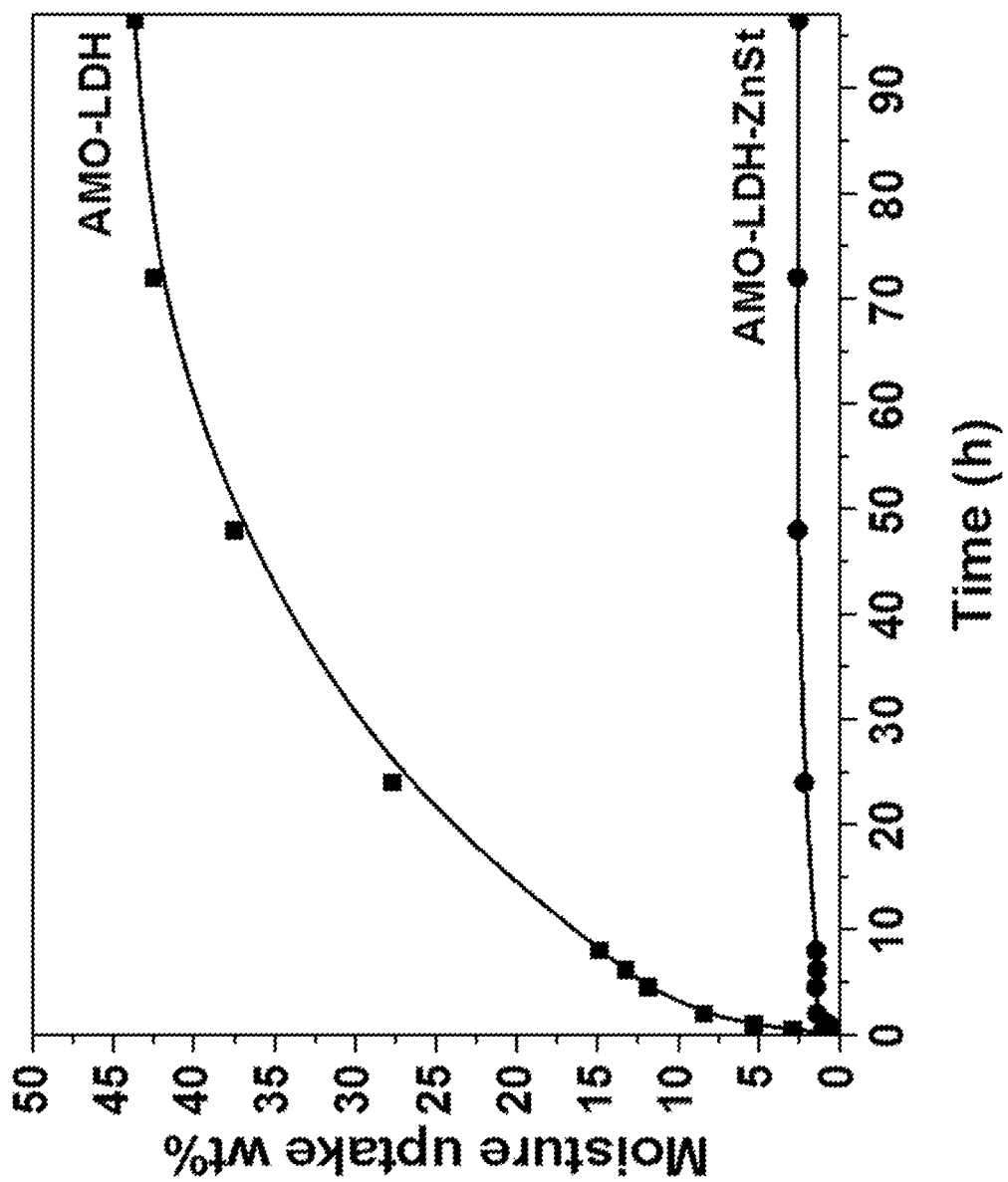
FIG. 13 shows a plot of water adsorption of Mg$_3$Al—CO$_3$ with Zn stearate surface treatment vs AMO-LDH.
Figure 14:
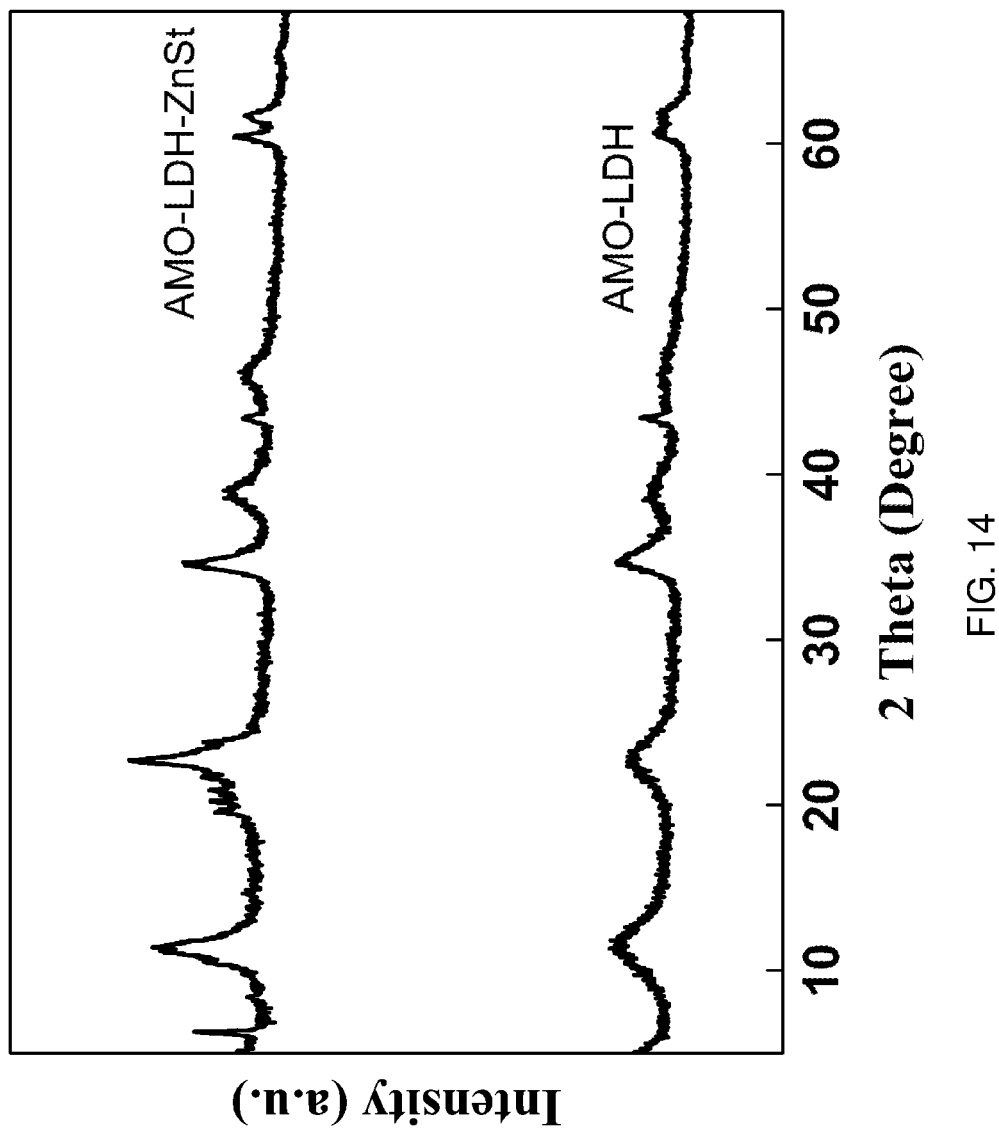
FIG. 14 shows XRD pattern of AMO-Mg$_3$Al—CO$_3$ LDH and Zinc stearate modified AMO-Mg$_3$Al-CO$_3$ LDH.
Figure 15:
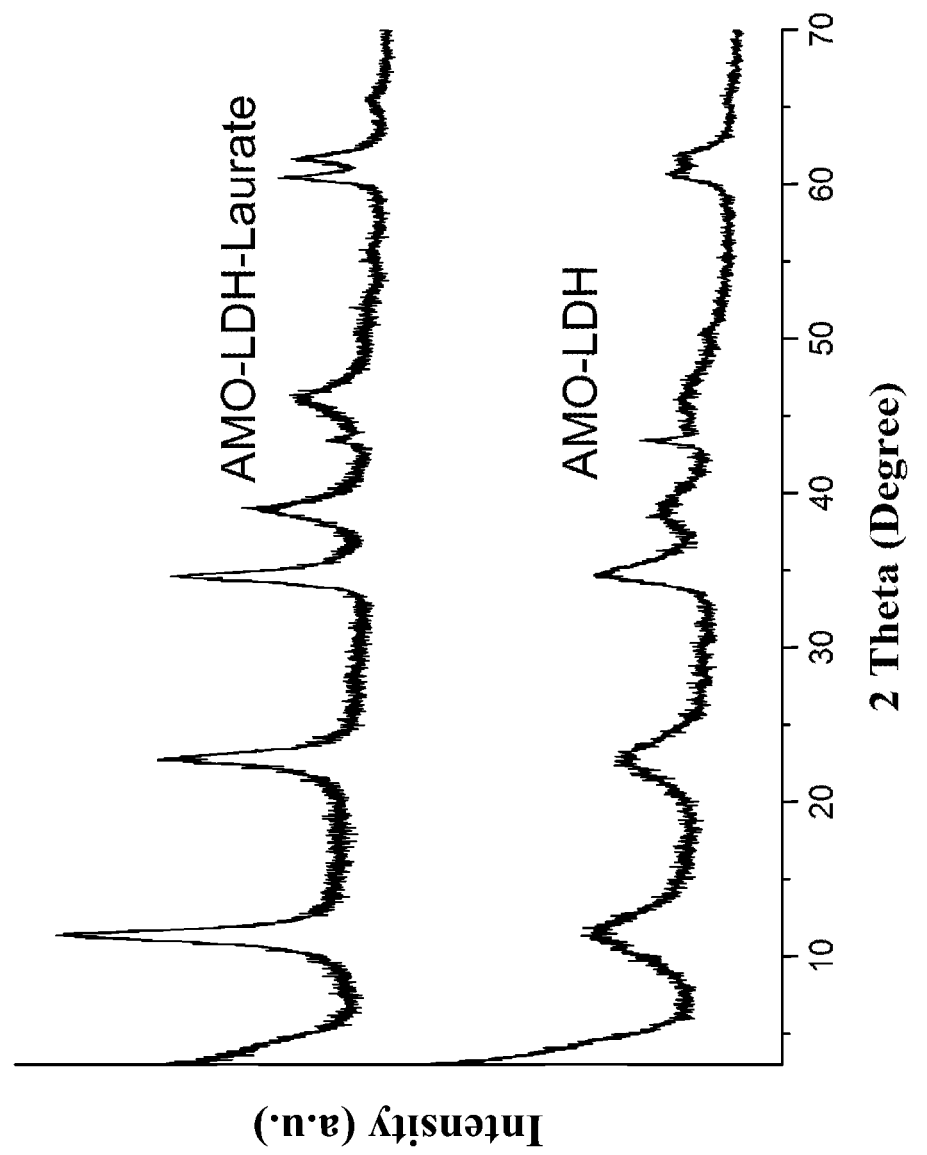
FIG. 15 shows XRD pattern of AMO-Mg$_3$Al—CO$_3$ LDH and laurate modified AMO-Mg$_3$Al—CO$_3$ LDH.
Figure 16:
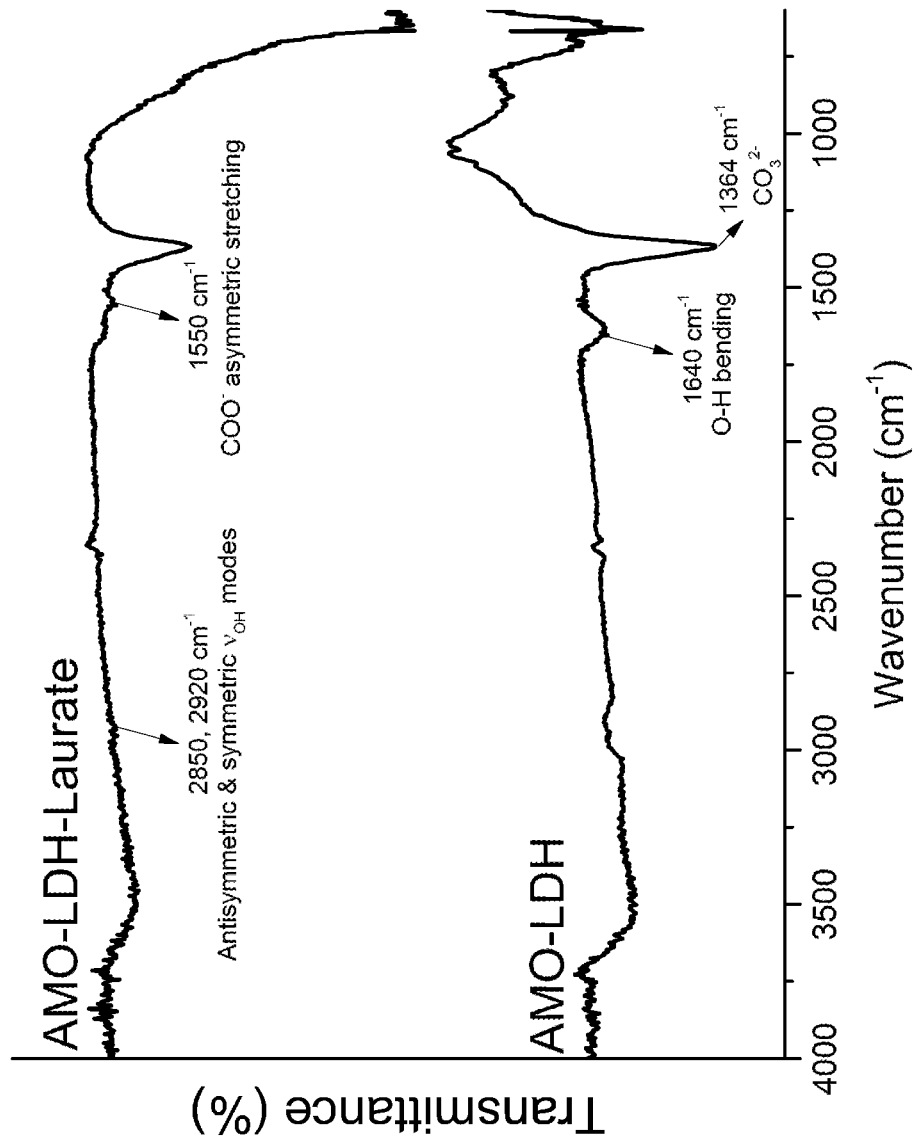
FIG. 16 shows FTIR spectrum of AMO-Mg$_3$Al—CO$_3$ LDH and laurate modified AMO-Mg$_3$Al—CO$_3$ LDH.

FIG. 13 shows a plot of water adsorption of Mg$_3$Al—CO$_3$ with Zn stearate surface treatment vs AMO-LDH. The stearate-modified LDH was prepared according to the protocol set out in Example 2.2.

EXAMPLE 5—SODIUM STEARATE/STEARIC ACID-MODIFIED AMO MG$_4$AL—CO$_3$ LDH

Preparation of AMO Mg$_4$Al—CO$_3$ LDH The mixed metal salts solution of Mg(NO$_3$)$_2$.6H$_2$O (80 mmol) and Al(NO$_3$)$_3$.9H$_2$O (20 mmol) in 50 mL deionised water was added dropwise into 50 mL of 25 mmol Na$_2$CO$_3$ solution while stirring for 1 hour. Constant pH of 10 was maintained by addition of 4 M NaOH to the reaction mixture. After stirring at room temperature for 24 hours, the product was filtered and washed with deionised water until pH 7. Then the wet cake was re-dispersed in 100 mL of deionised water and divided into four portions. Each portion was filtered and rinsed with 500 mL of ethanol then re-dispersed and stirred in 300 mL of ethanol at room temperature for 4 hours. The solvent was removed by filtration and the obtained LDH was further rinsed with 200 mL of ethanol. The product was dried at room temperature in a vacuum oven overnight.

EXAMPLE 5.1—SODIUM STEARATE-MODIFIED AMO $MG_4AL$—$CO_3$ LDH 1 g of $Mg_4Al$—$CO_3$ AMO LDH was added as a dry powder to 2.5 mmol of sodium stearate solution (0.7 g of stearic acid, 0.2 g NaOH, 100 mL EtOH, 50 mL deionised water) and stirred (750 rpm) at 80° C. for 18 hours. It was then filtered, washed with a warm (60° C.) solution of water/EtOH (1:1), and dried in vacuum overnight.

EXAMPLE 5.2—STEARIC ACID-MODIFIED AMO $MG_4AL$—$CO_3$ LDH 1 g of $Mg_4Al$—$CO_3$ AMO LDH was added as a dry powder to 2.5 mmol of stearic acid solution (0.7 g of stearic acid, 100 mL EtOH) and stirred (750 rpm) at 80° C. for 18 hours. It was then filtered, washed with a warm (60° C.) solution of water/EtOH (1:1), and dried in vacuum overnight.

EXAMPLE 5.3—STEARIC ACID-MODIFIED AMO $MG_4AL$—$CO_3$ LDH WITH ETHANOL WASH 1 g of $Mg_4Al$—$CO_3$ AMO LDH was added as a dry powder to 2.5 mmol of stearic acid solution (0.7 g of stearic acid, 100 mL EtOH) and stirred (750 rpm) at 80° C. for 18 hours. It was then filtered, washed with a warm ethanol (60° C.), and dried in vacuum overnight.

Analysis of Sodium Stearate/Stearic Acid Modified AMO $Mg_4Al$—$CO_3$ LDHs

Figure 17:
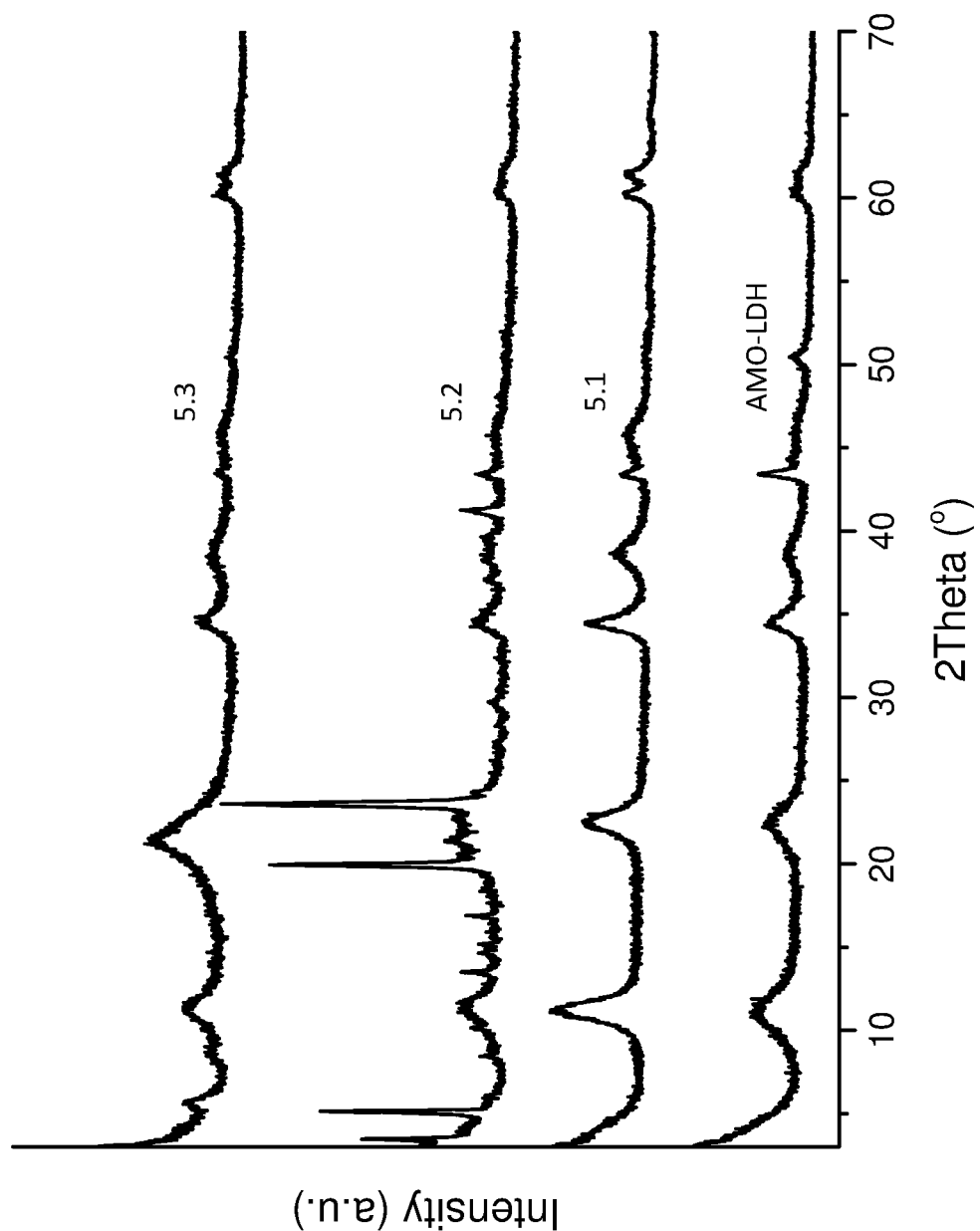
FIG. 17 shows the XRD patterns of the modified Mg$_4$Al—CO$_3$ LDHs prepared according to Example 5.

FIG. 17 shows the XRD patterns of the modified $Mg_4Al$—$CO_3$ LDHs prepared according to Examples 5.1, 5.2 and 5.3. When stearic acid treatment (Example 5.2) was used, impurity peaks from stearic acid were observed in XRD. Washing the modified LDH with warm ethanol (Example 5.3) more effectively removed excess stearic acid than washing with water/ethanol.

Figure 18:
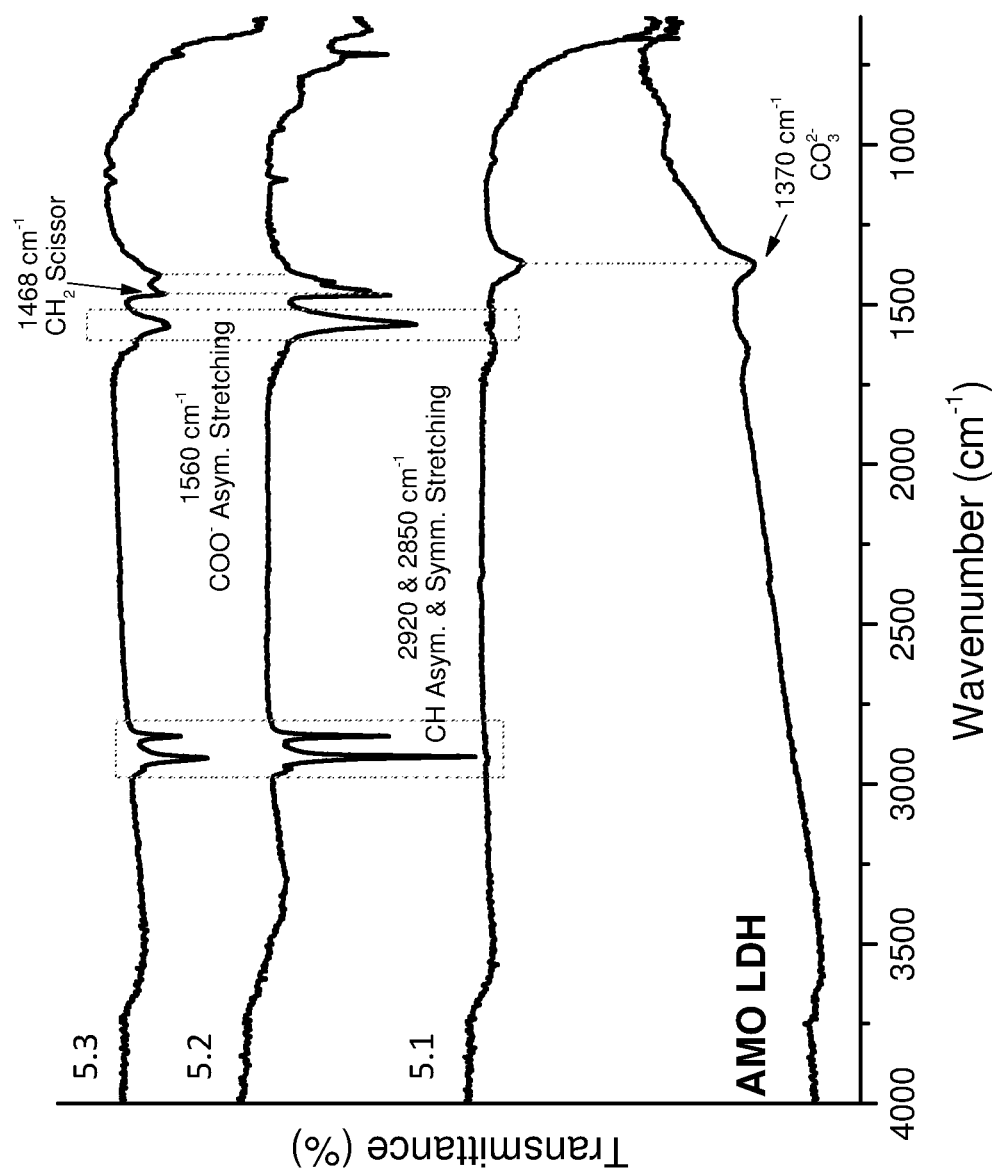
FIG. 18 shows the FTIR spectra of the modified Mg$_4$Al—CO$_3$ LDHs prepared according to Example 5.

FIG. 18 shows the FTIR spectra of the modified $Mg_4Al$—$CO_3$ LDHs prepared according to Examples 5.1, 5.2 and 5.3. Very weak peaks of stearate were observed in Example 5.1 compared to Example 5.2 and Example 5.3. This might be due to the washing removing excessive stearate anion from the LDH surface. When stearic acid treatment with water/ethanol wash (Example 5.2) was used, impurity peaks from stearic acid were observed in FTIR. Washing with warm ethanol (Example 5.3) seems to be more effective at removing the excess fatty acid than the water/ethanol wash.

Figure 19:
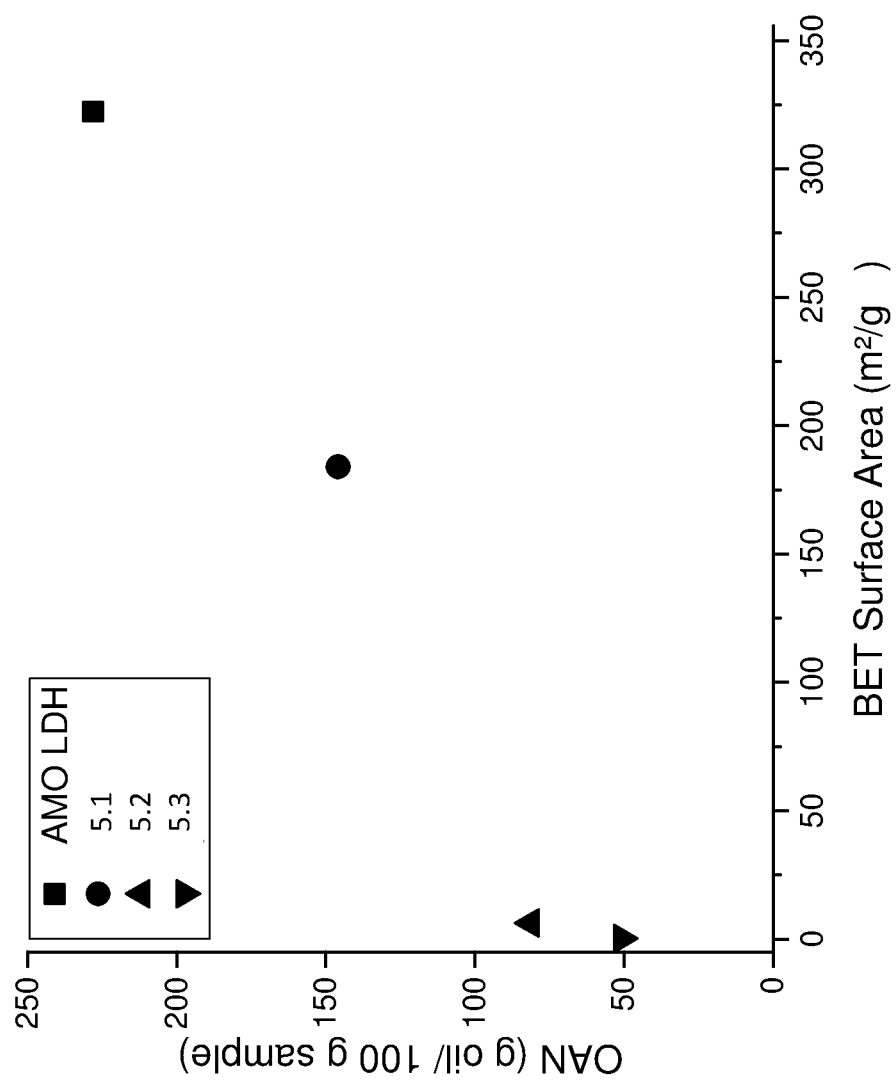
FIG. 19 shows the BET Surface Area plotted against Oil Absorption Number (OAN) of the modified Mg$_4$Al—CO$_3$ LDHs prepared according to Example 5.

FIG. 19 shows the BET Surface Area plotted against Oil Absorption Number (OAN) of the modified $Mg_4Al$—$CO_3$ LDHs prepared according to Examples 5.1, 5.2 and 5.3 as well as unmodified $Mg_4Al$—$CO_3$ LDH (AMO LDH). Surface area and oil absorption number (OAN) decreased after treatment. Both stearic acid treatments (Examples 5.2 & 5.3) significantly reduced the surface area and OAN of the AMO LDHs. This might be because of using high amounts of stearic acid so it coated and blocked the surface of LDHs, resulting in low surface area product. Example 5.3 in particular gave a slightly rigid product with a very low surface area.

Figure 20:
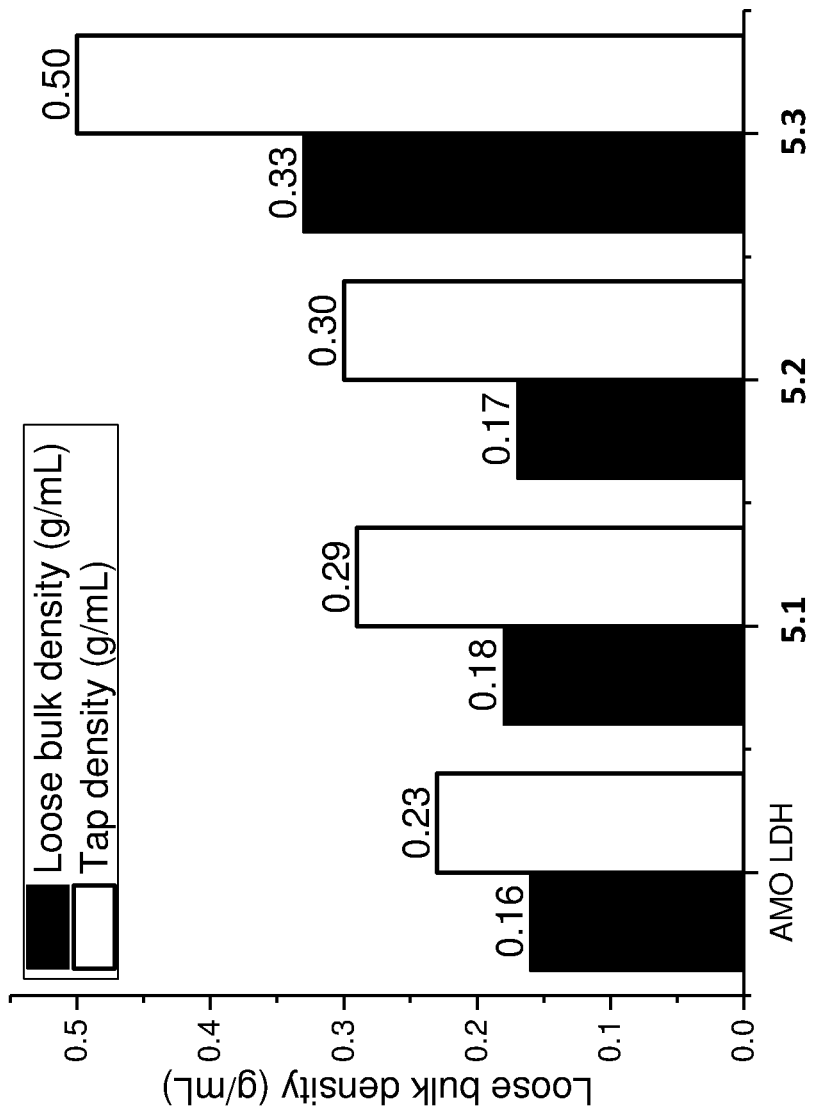
FIG. 20 shows the loose bulk densities and tap densities of the modified Mg$_4$Al—CO$_3$ LDHs prepared according to Example 5.

FIG. 20 shows the loose bulk densities and tap densities of the modified $Mg_4Al$—$CO_3$ LDHs prepared according to Examples 5.1, 5.2 and 5.3 as well as unmodified $Mg_4Al$—$CO_3$ LDH (AMO LDH). The modified products show higher density than the unmodified AMO LDH, particularly Example 5.3.

Figure 21:
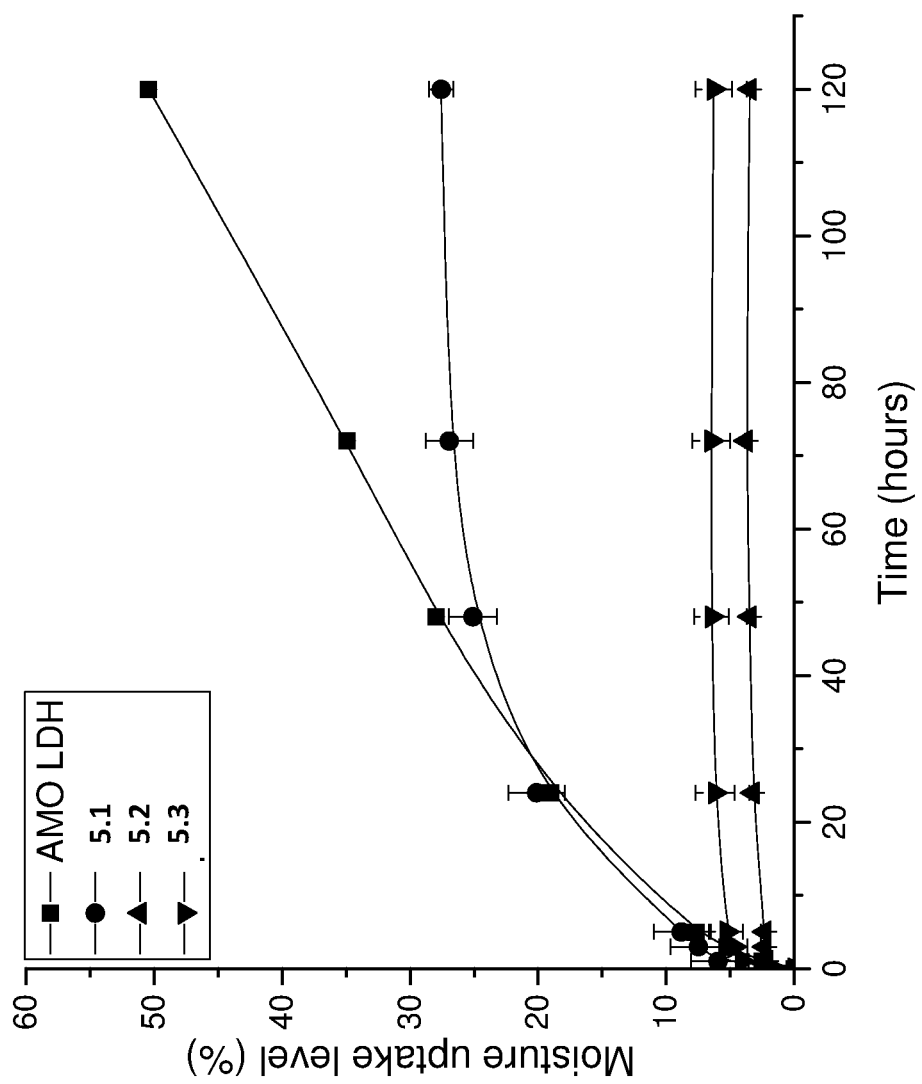
FIG. 21 shows the moisture uptake levels of the modified Mg$_4$Al—CO$_3$ LDHs prepared according to Example 5.

FIG. 21 shows the moisture uptake levels of the modified $Mg_4Al$—$CO_3$ LDHs prepared according to Examples 5.1, 5.2 and 5.3 as well as unmodified $Mg_4Al$—$CO_3$ LDH (AMO LDH) after exposure to RH99 humidity at 20° C. at various time points. The sodium stearate treatment (Example 5.1) did not help to slow down the moisture absorption rate of the LDH but it helped to decrease the maximum moisture uptake level from 50% for unmodified AMO LDH to 28%. Its uptake capacity was constant after 48 hours whereas ethanol-washed AMO LDH still continuously absorbed moisture up to 120 hours. Both stearic acid methods (5.2 and 5.3) help to retard the moisture uptake level of the LDHs.

Figure 22:
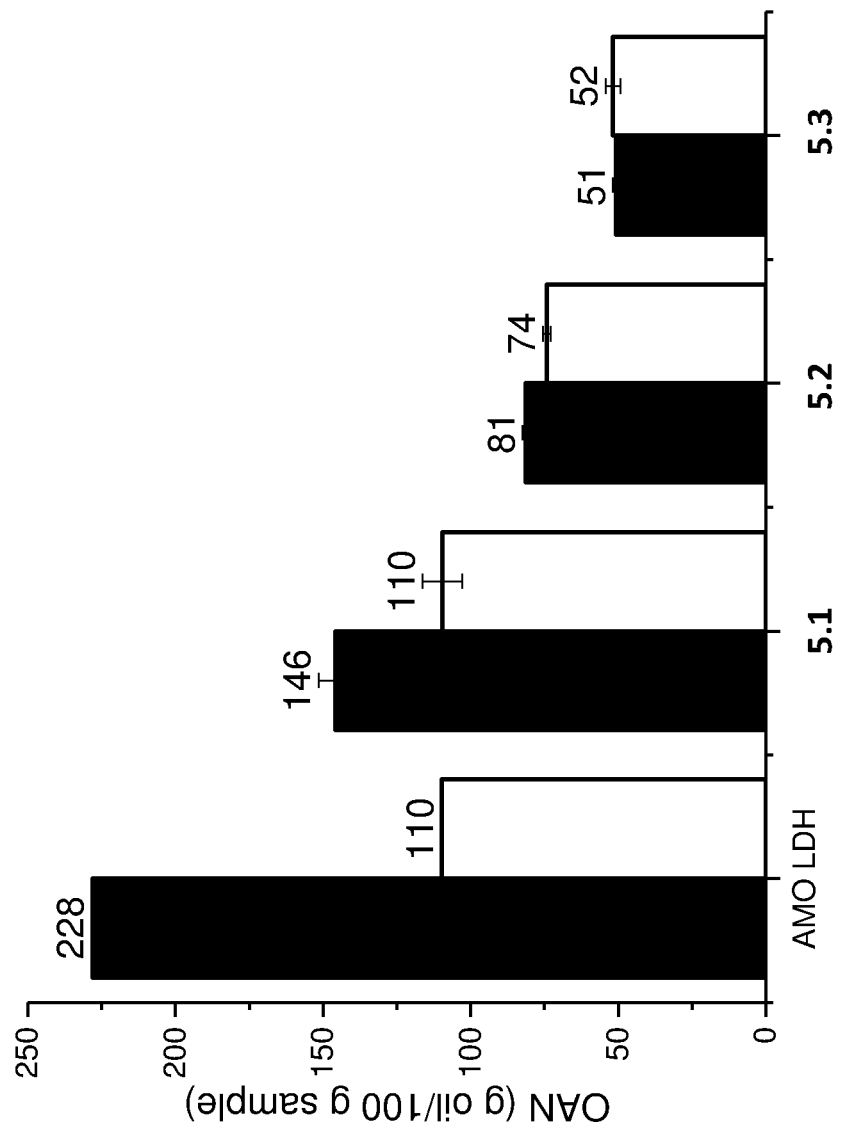
FIG. 22 shows the oil absorption number (OAN) of the modified Mg$_4$Al—CO$_3$ LDHs prepared according to Example 5.
Figure 23:
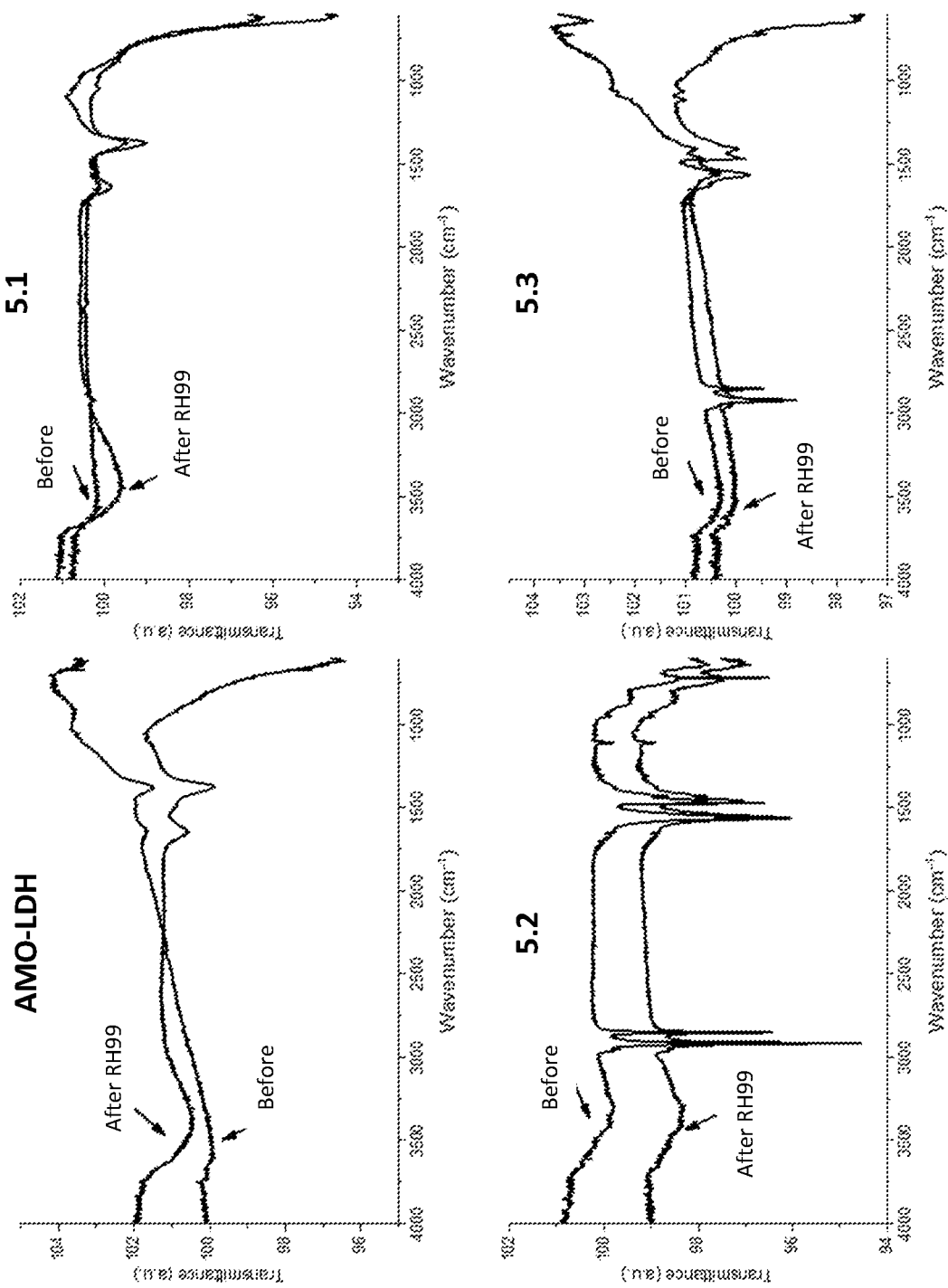
FIG. 23 shows the FTIR spectra of the modified Mg$_4$Al—CO$_3$ LDHs prepared according to Example 5.

FIG. 22 shows the oil absorption number (OAN) of the modified $Mg_4Al$—$CO_3$ LDHs prepared according to Examples 5.1, 5.2 and 5.3 as well as unmodified $Mg_4Al$—$CO_3$ LDH (AMO LDH) both before (black bars) and after (white bars) exposure to RH99 humidity at 20° C. for 120 hours. For both stearic acid methods (5.2 and 5.3), the OAN only slightly changes after exposure to moisture, indicating that stearic acid is more effective than stearate for preventing moisture uptake FIG. 23 shows the FTIR spectra of the modified $Mg_4Al$—$CO_3$ LDHs prepared according to Examples 5.1, 5.2 and 5.3 as well as unmodified $Mg_4Al$—$CO_3$ LDH (AMO LDH) both before and after exposure to RH99 humidity at 20° C. for 120 hours. The FTIR results agree with moisture uptake level data as shown in FIG. 21. For AMO LDH and Example 5.1, the OH region peaks (3000-3600 $cm^{-1}$) were broader and more intense after exposure to moisture, which indicates a higher moisture uptake level for these two LDHs compared to Examples 5.2 and 5.3.

EXAMPLE 6—STEARIC ACID MODIFIED AMO $MG_4AL$—$CO_3$ LDHS AT VARIOUS STEARIC ACID CONCENTRATIONS

EXAMPLE 6.1—STEARIC ACID-MODIFIED AMO $MG_4AL$—$CO_3$ LDH (DRY POWDER METHOD)

Various amounts of stearic acid (0.05, 0.125, 0.25, 0.50, 1.00, 1.25, 2.50, 5.00 mmol) were dissolved in 100 mL of ethanol. 1 g of $Mg_4Al$—$CO_3$ AMO LDH as a dry powder was added to each solution and the mixtures were stirred (750 rpm) at 80° C. for 18 hours. The mixtures were filtered, washed with warm EtOH (60° C.), and dried in vacuum overnight. Products were noted as P-SA-X, where X=amount of stearic acid used in mmol and P refers to dry powder method.

EXAMPLE 6.2—STEARIC ACID-MODIFIED AMO $MG_4AL$—$CO_3$ LDH (SLURRY METHOD)

Various amounts of stearic acid (0.05, 0.125, 0.25, 0.50, 1.00, 1.25, 2.50, 5.00 mmol) were dissolved in 70 mL of ethanol. 30 mL of $Mg_4Al$—$CO_3$ AMO LDH dispersed in ethanol (5% w/v; AMO LDH taken after AMO treatment process without drying; 1.5 g dry LDH) was added to each solution and the mixtures were stirred (750 rpm) at 80° C. for 18 hours. The mixtures were filtered, washed with warm EtOH (60° C.), and dried in vacuum overnight. Products were noted as S-SA-X, where X=amount of stearic acid used in mmol and S refers to slurry method.

Figure 24:
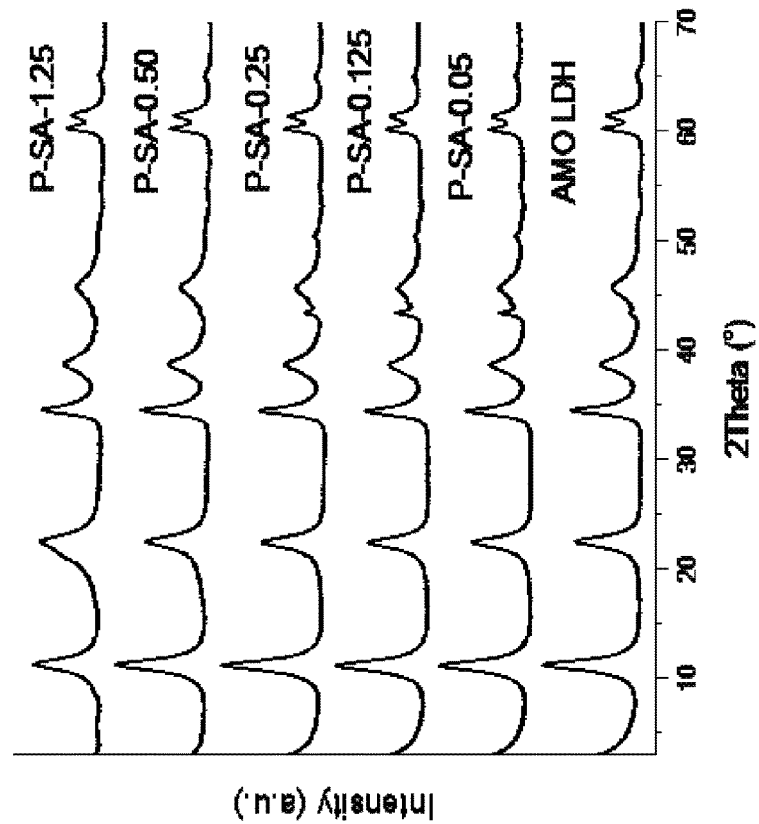
FIG. 24 shows the XRD patterns of modified Mg$_4$Al—CO$_3$ LDHs prepared according to Example 6.1.

Analysis of Stearic Acid Modified AMO $Mg_4Al$—$CO_3$ LDHs at Various Stearic Acid Concentrations FIG. 24 shows the XRD patterns of modified $Mg_4Al$—$CO_3$ LDHs prepared according to Example 6.1, as well as unmodified $Mg_4Al$—$CO_3$ LDH (AMO LDH). No impurity phase was observed from XRD.

Figure 25:
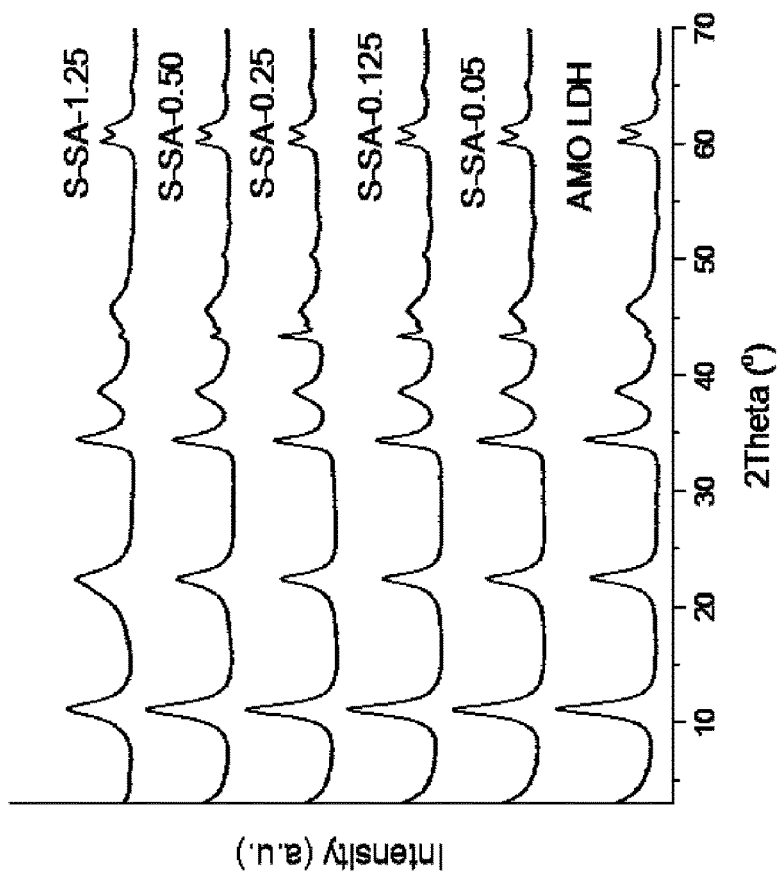
FIG. 25 shows the XRD patterns of modified Mg$_4$Al—CO$_3$ LDHs prepared according to Example 6.2.

FIG. 25 shows the XRD patterns of modified $Mg_4Al$—$CO_3$ LDHs prepared according to Example 6.2, as well as unmodified $Mg_4Al$—$CO_3$ LDH (AMO LDH). No impurity phase was observed from XRD.

Figure 26:
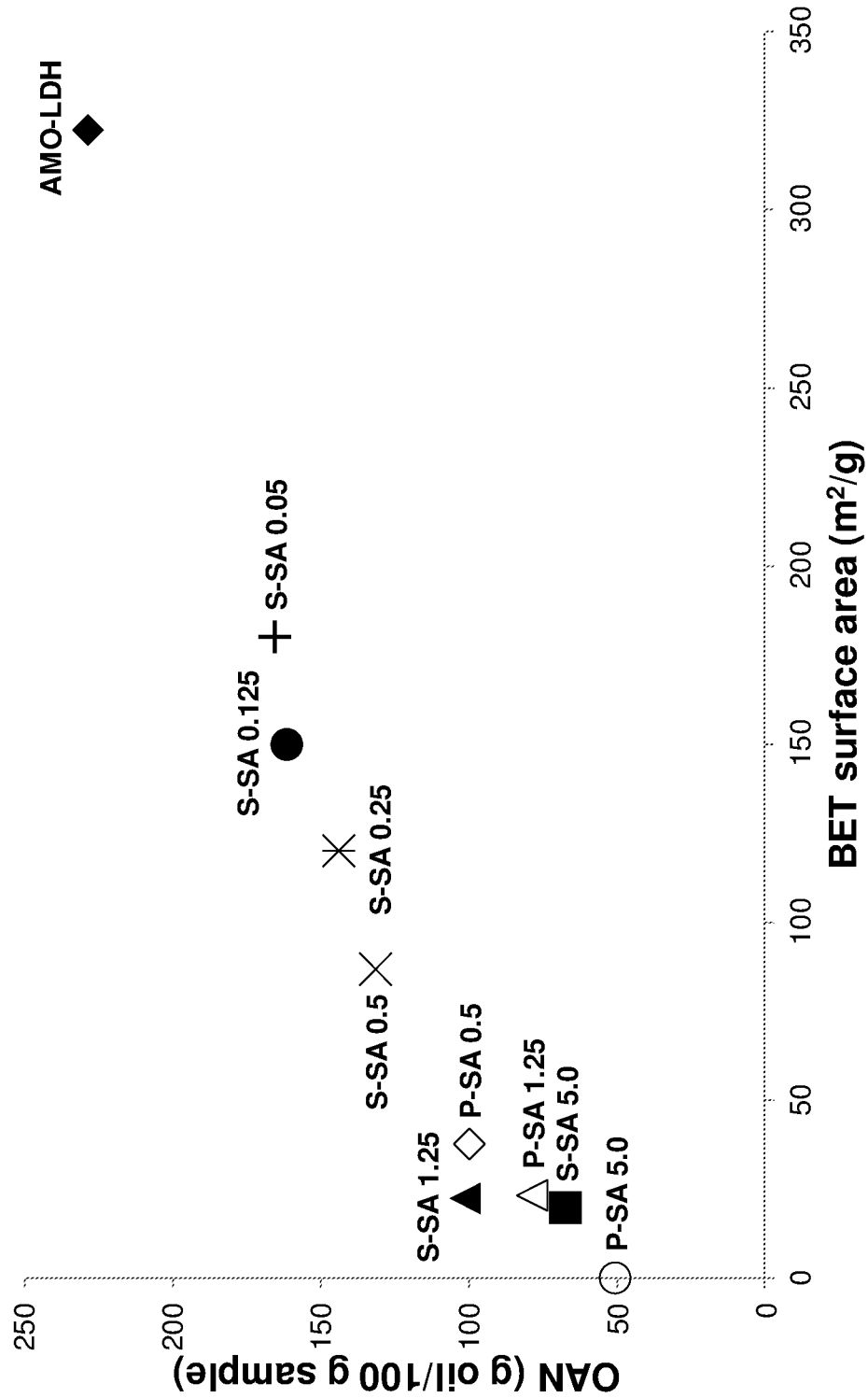
FIG. 26 shows the BET Surface Area plotted against Oil Absorption Number (OAN) of modified Mg$_4$Al—CO$_3$ LDHs prepared according to Examples 6.1 and 6.2.

FIG. 26 shows the BET Surface Area plotted against Oil Absorption Number (OAN) of modified $Mg_4Al$—$CO_3$ LDHs prepared according to Examples 6.1 and 6.2, as well as unmodified $Mg_4Al$—$CO_3$ LDH (AMO LDH). At the same loading level of stearic acid, the slurry form treatment showed higher surface area and OAN value. For both methods, lower stearic acid loading corresponded to higher OAN and higher surface area of products.

Figure 27:
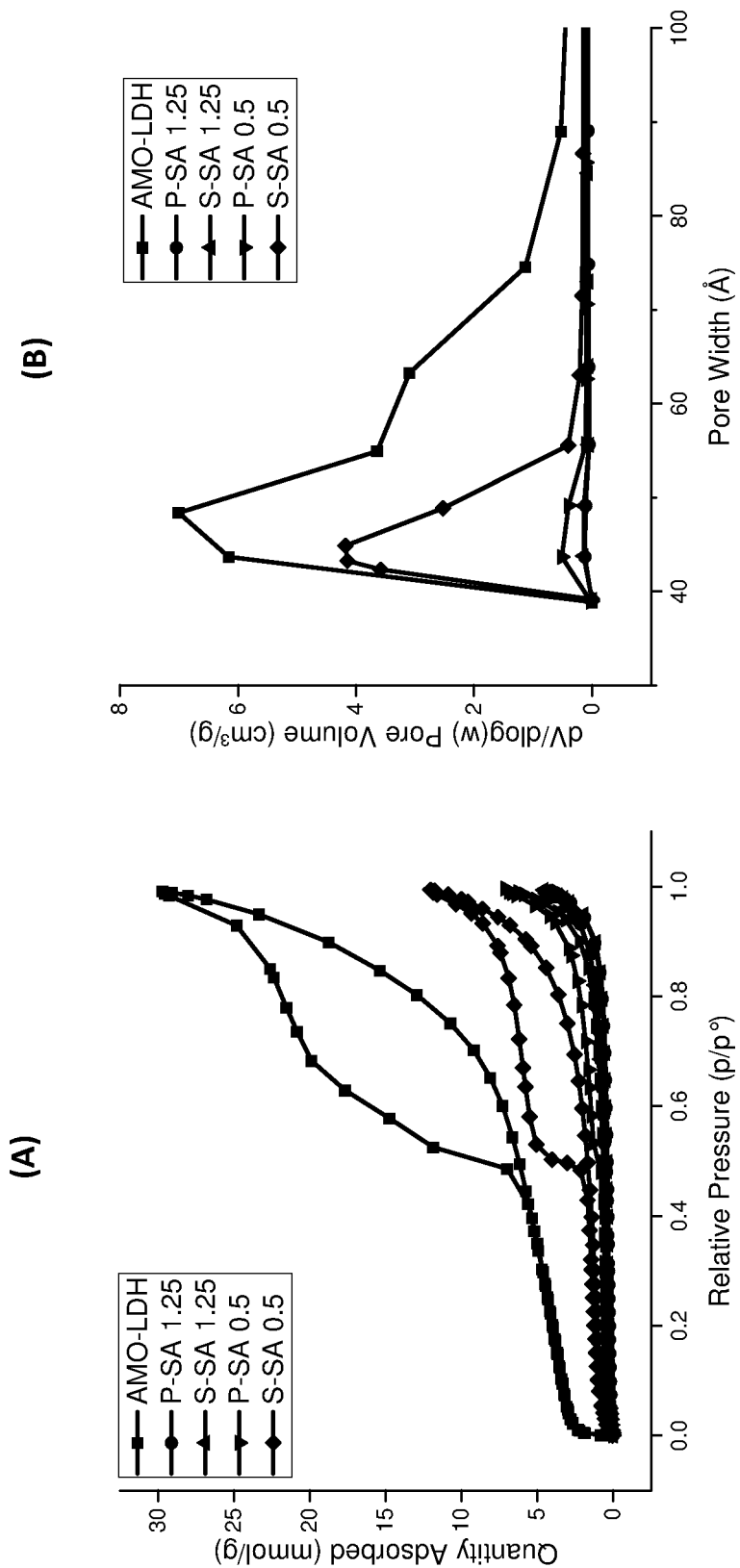
FIG. 27 shows the BET isotherm (A) and pore size distribution (B) of modified Mg$_4$Al—CO$_3$ LDHs prepared according to Examples 6.1 and 6.2.

FIG. 27 shows the BET isotherm (A) and pore size distribution (B) of modified $Mg_4Al$—$CO_3$ LDHs prepared according to Examples 6.1 and 6.2, as well as unmodified $Mg_4Al$—$CO_3$ LDH (AMO LDH). Pore size decreased following stearic acid modification and decreased more at higher stearic acid concentration.

Figure 28:
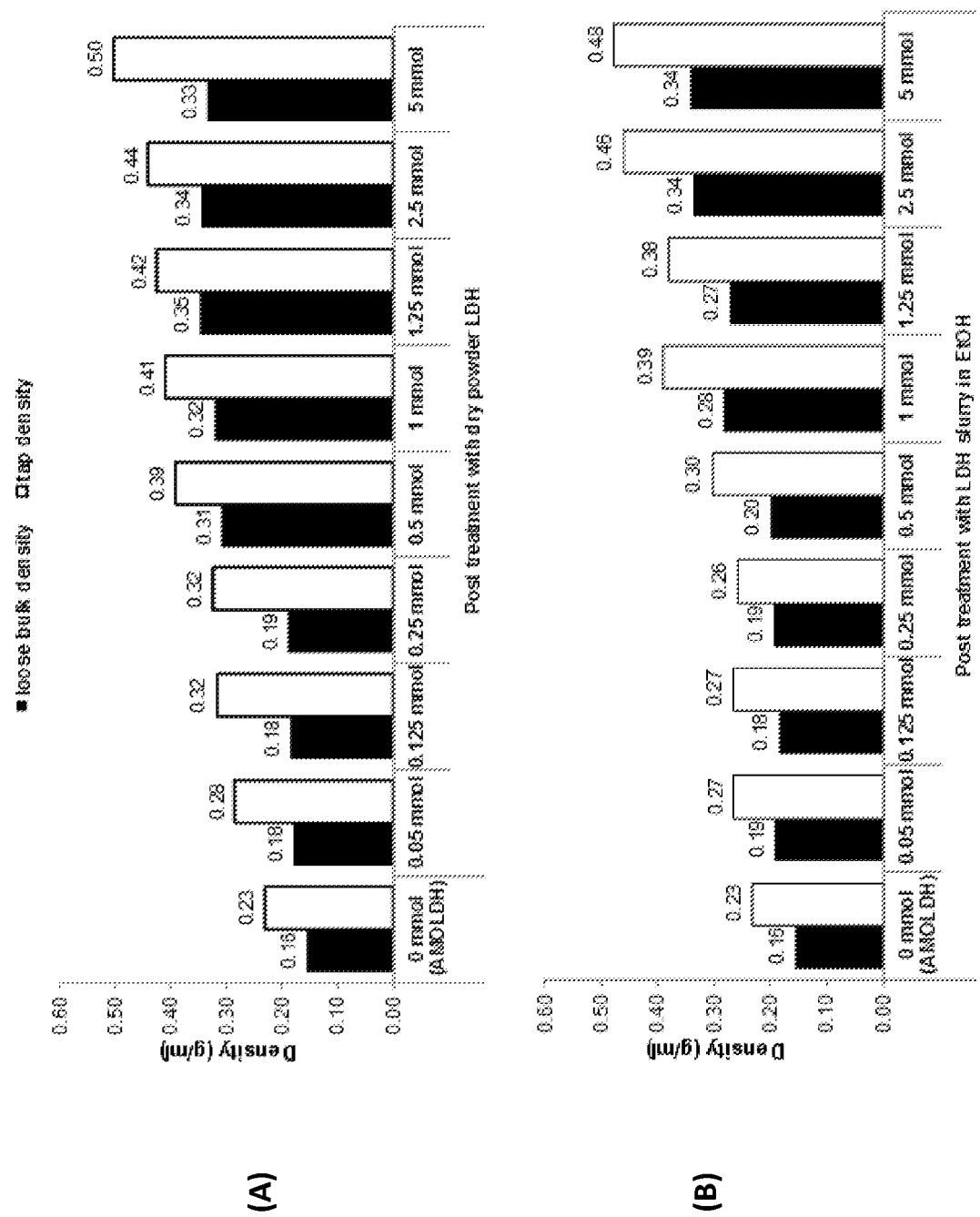
FIG. 28 shows the loose bulk densities (black bars) and tap densities (white bars) of the modified Mg$_4$Al—CO$_3$ LDHs prepared according to Example 6.1 (A) and Example 6.2 (B).

FIG. 28 shows the loose bulk densities (black bars) and tap densities (white bars) of the modified $Mg_4Al$—$CO_3$ LDHs prepared according to Example 6.1 (A) and Example 6.2 (B), as well as unmodified $Mg_4Al$—$CO_3$ LDH (AMO LDH). Lower stearic acid loading led to lower density. No significant difference in density was observed between both modification methods.

Figure 29:
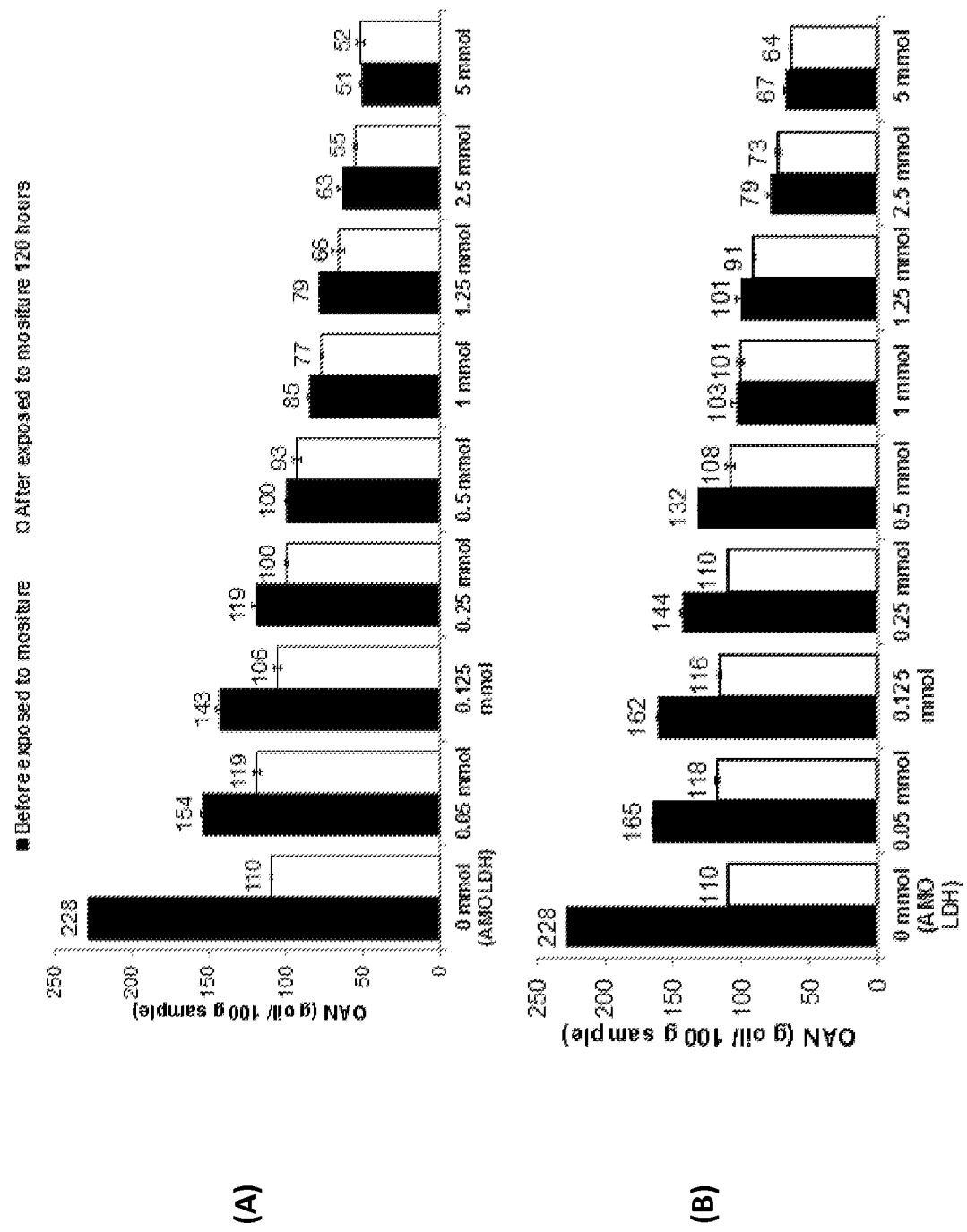
FIG. 29 shows the oil absorption number (OAN) before (black bars) and after (white bars) exposure to RH99 humidity at 20° C. for 120 hours of the modified Mg$_4$Al—CO$_3$ LDHs prepared according to Example 6.1 (A) and Example 6.2 (B).

FIG. 29 shows the oil absorption number (OAN) before (black bars) and after (white bars) exposure to RH99 humidity at 20° C. for 120 hours of the modified $Mg_4Al$—$CO_3$ LDHs prepared according to Example 6.1 (A) and Example 6.2 (B), as well as unmodified $Mg_4Al$—$CO_3$ LDH (AMO LDH). OAN generally decreased after exposure to moisture. Lower stearic acid loading gave higher OAN. At the same loading level of stearic acid, the slurry form treatment (B) showed higher OAN value than the powder form treatment (A)

Figure 30:
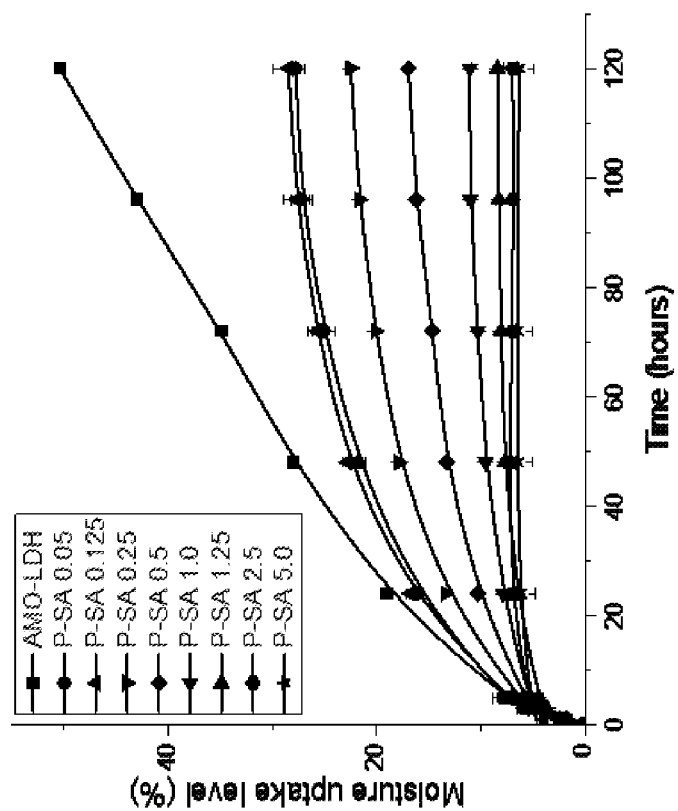
FIG. 30 shows the moisture uptake levels of the modified Mg$_4$Al—CO$_3$ LDHs prepared according to Example 6.1.

FIG. 30 shows the moisture uptake levels of the modified $Mg_4Al$—$CO_3$ LDHs prepared according to Example 6.1 as well as unmodified $Mg_4Al$—$CO_3$ LDH (AMO LDH), after exposure to RH99 humidity at 20° C. at various time points. The higher the stearic acid loading, the lower the moisture uptake of the modified LDH.

Figure 31:
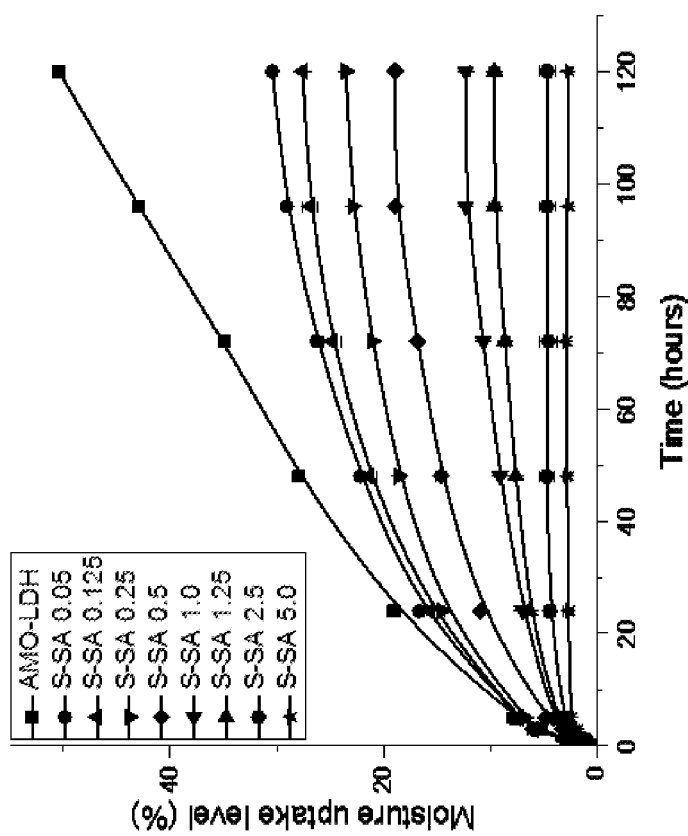
FIG. 31 shows the moisture uptake levels of the modified Mg$_4$Al—CO$_3$ LDHs prepared according to Example 6.2.

FIG. 31 shows the moisture uptake levels of the modified $Mg_4Al$—$CO_3$ LDHs prepared according to Example 6.2 as well as unmodified $Mg_4Al$—$CO_3$ LDH (AMO LDH), after exposure to RH99 humidity at 20° C. at various time points. The higher the stearic acid loading, the lower the moisture uptake of the modified LDH. At the same loading level of stearic acid, the slurry form post treatment seems to prevent LDH from moisture better than the powder form post treatment, especially at high loading level of stearic acid.

Figure 32:
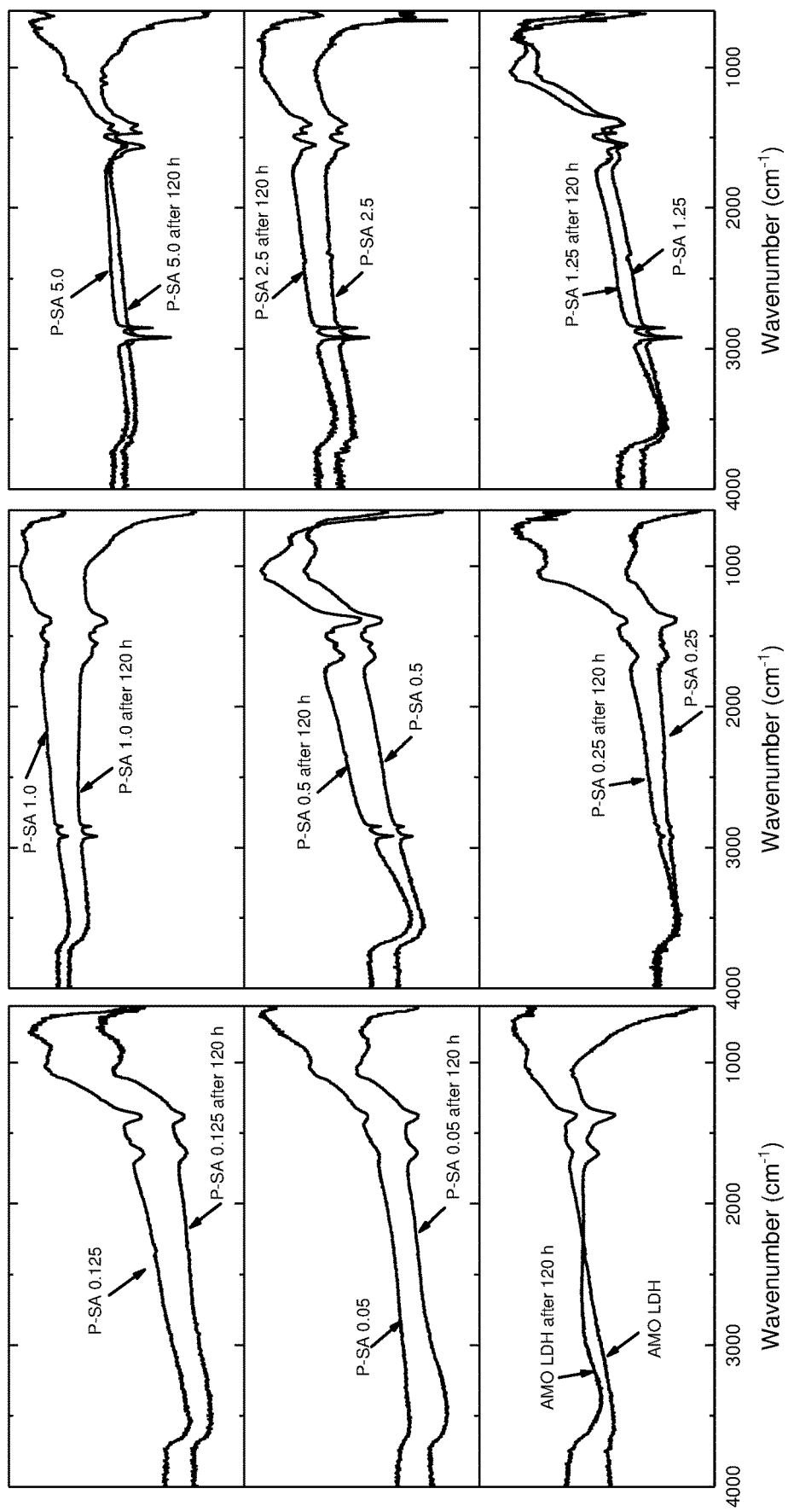
FIG. 32 shows FTIR spectra of modified Mg$_4$Al—CO$_3$ LDHs prepared according to Examples 6.1.

FIG. 32 shows FTIR spectra of modified $Mg_4Al$—$CO_3$ LDHs prepared according to Examples 6.1, as well as unmodified $Mg_4Al$—$CO_3$ LDH (AMO LDH—bottom left panel) both before and after exposure to RH99 humidity at 20° C. for 120 hours. The lower the stearic acid loading, the broader the OH peak in the region 3000-3600 $cm^{-1}$ after exposure to moisture. At low loadings of stearic acid (<0.25 mmol), the characteristic peaks of stearic acid cannot be observed.

Figure 33:
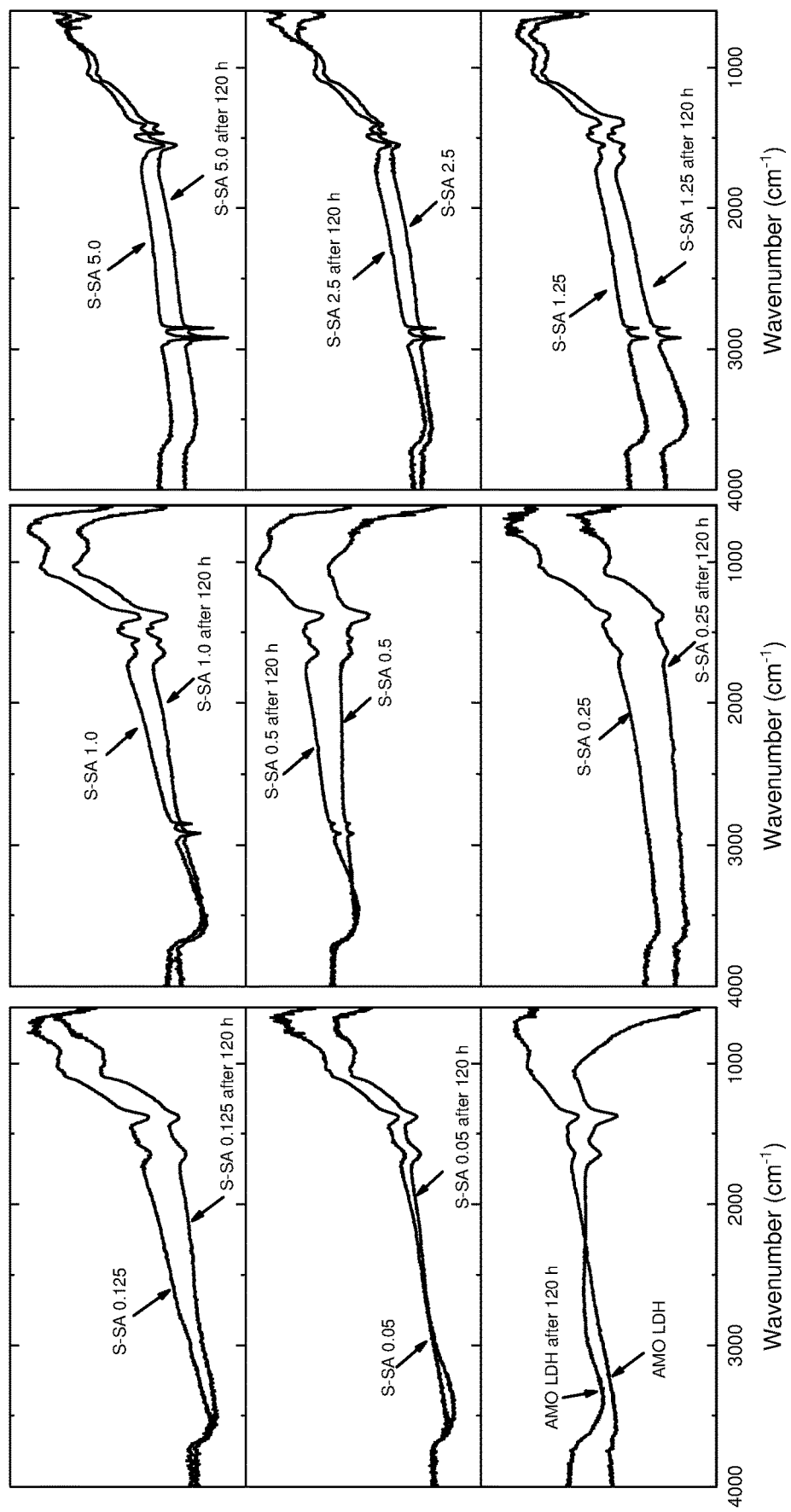
FIG. 33 shows FTIR spectra of modified Mg$_4$Al—CO$_3$ LDHs prepared according to Examples 6.2.

FIG. 33 shows FTIR spectra of modified $Mg_4Al$—$CO_3$ LDHs prepared according to Examples 6.2, as well as unmodified $Mg_4Al$—$CO_3$ LDH (AMO LDH—bottom left panel) both before and after exposure to RH99 humidity at 20° C. for 120 hours. The lower the stearic acid loading, the broader the OH peak in the region 3000-3600 $cm^{-1}$ after exposure to moisture. At low loadings of stearic acid (<0.25 mmol), the characteristic peaks of stearic acid cannot be observed.

Figure 34:
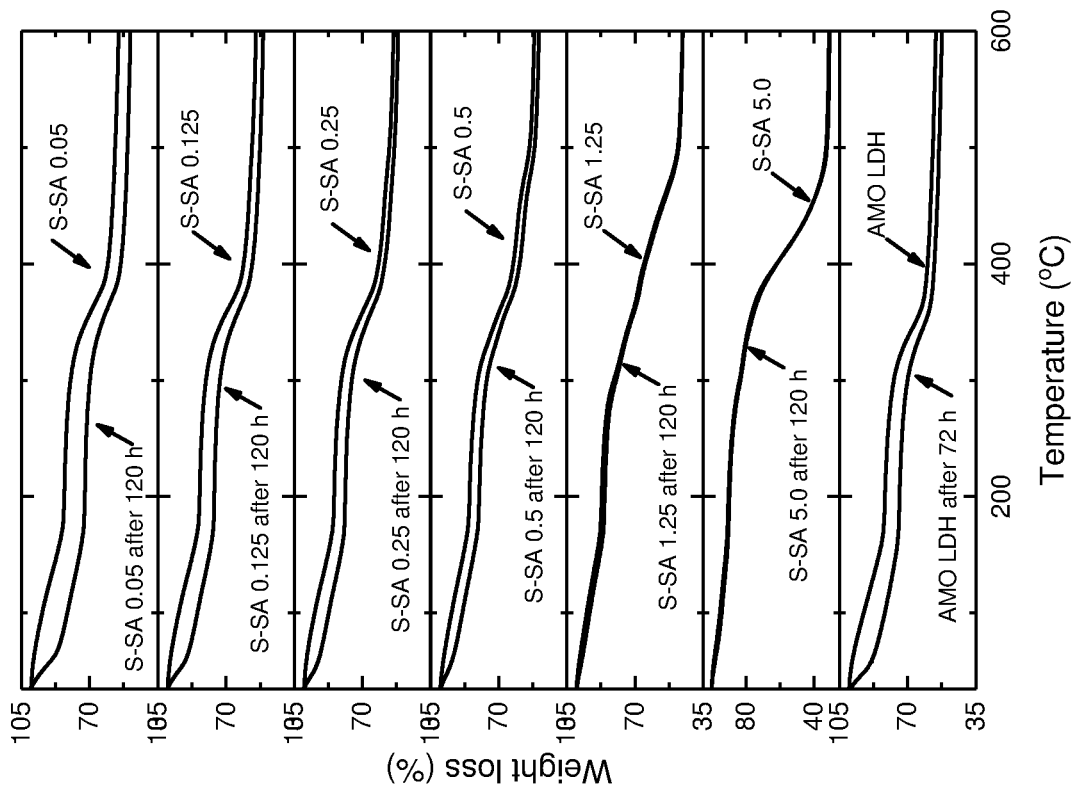
FIG. 34 shows TGA curves of modified Mg$_4$Al—CO$_3$ LDHs prepared according to Example 6.2

FIG. 34 shows TGA curves of modified $Mg_4Al$—$CO_3$ LDHs prepared according to Examples 6.2, as well as unmodified $Mg_4Al$—$CO_3$ LDH (AMO LDH) both before (top curve) and after (bottom curve) exposure to RH99 humidity at 20° C. for 120 hours. Lower weight losses were obtained for products prepared with higher stearic acid loadings.

EXAMPLE 7—STEARIC ACID-MODIFIED AMO $MG_3AL$—$CO_3$ LDHS, AMO $MG_4AL$—$CO_3$ LDHS AND AMO $MG_5AL$—$CO_3$ LDHS AT VARIOUS STEARIC ACID CONCENTRATIONS

Preparation of AMO $Mg_3Al$—$CO_3$ LDH

The mixed metal salts solution of $Mg(NO_3)_2.6H_2O$ (75 mmol) and $Al(NO_3)_3.9H_2O$ (25 mmol) in 50 mL deionised water was added dropwise into 50 mL of 25 mmol $Na_2CO_3$ solution while stirring for 1 hour. Constant pH of 10 was maintained by addition of 4 M NaOH to the reaction mixture. After stirring at room temperature for 24 hours, the product was filtered and washed with deionised water until pH 7. Then the wet cake was re-dispersed in 100 mL of deionised water and divided into four portions. Each portion was filtered and rinsed with 500 mL of ethanol then re-dispersed and stirred in 300 mL of ethanol at room temperature for 4 hours. The solvent was removed by filtration and the obtained LDH was further rinsed with 200 mL of ethanol. The product was dried at room temperature in a vacuum oven overnight.

Preparation of AMO $Mg_5Al$—$CO_3$ LDH

The mixed metal salts solution of $Mg(NO_3)_2.6H_2O$ (90 mmol) and $Al(NO_3)_3.9H_2O$ (10 mmol) in 50 mL deionised water was added dropwise into 50 mL of 25 mmol $Na_2CO_3$ solution while stirring for 1 hour. Constant pH of 10 was maintained by addition of 4 M NaOH to the reaction mixture. After stirring at room temperature for 24 hours, the product was filtered and washed with deionised water until pH 7. Then the wet cake was re-dispersed in 100 mL of deionised water and divided into four portions. Each portion was filtered and rinsed with 500 mL of ethanol then re-dispersed and stirred in 300 mL of ethanol at room temperature for 4 hours. The solvent was removed by filtration and the obtained LDH was further rinsed with 200 mL of ethanol. The product was dried at room temperature in a vacuum oven overnight.

EXAMPLE 7.1—STEARIC ACID-MODIFIED AMO $MG_3AL$—$CO_3$ LDH

Various amounts of stearic acid (1.25, 2.50 & 5.00 mmol) were dissolved in 70 mL of ethanol. 30 mL of $Mg_3Al$—$CO_3$ AMO LDH dispersed in ethanol (5% w/v; AMO LDH taken after AMO treatment process without drying; ~1.5 g dry LDH) was added to each solution and the mixtures were stirred (750 rpm) at 80° C. for 18 hours. The mixtures were filtered, washed with warm EtOH (60° C.), and dried in vacuum overnight. Products were noted as Cop3-SA-X, where X=amount of stearic acid used in mmol.

EXAMPLE 7.2—STEARIC ACID-MODIFIED AMO MG$_4$AL—CO$_3$ LDH

Various amounts of stearic acid (1.25, 2.50 & 5.00 mmol) were dissolved in 70 mL of ethanol. 30 mL of Mg$_4$Al—CO$_3$ AMO LDH dispersed in ethanol (5% w/v; AMO LDH taken after AMO treatment process without drying; ~1.5 g dry LDH) was added to each solution and the mixtures were stirred (750 rpm) at 80° C. for 18 hours. The mixtures were filtered, washed with warm EtOH (60° C.), and dried in vacuum overnight. Products were noted as Cop4-SA-X, where X=amount of stearic acid used in mmol.

EXAMPLE 7.3—STEARIC ACID-MODIFIED AMO MG$_5$AL—CO$_3$ LDH

Various amounts of stearic acid (1.25, 2.50 & 5.00 mmol) were dissolved in 70 mL of ethanol. 30 mL of Mg$_5$Al—CO$_3$ AMO LDH dispersed in ethanol (5% w/v; AMO LDH taken after AMO treatment process without drying; ~1.5 g dry LDH) was added to each solution and the mixtures were stirred (750 rpm) at 80° C. for 18 hours. The mixtures were filtered, washed with warm EtOH (60° C.), and dried in vacuum overnight. Products were noted as Cop5-SA-X, where X=amount of stearic acid used in mmol.

Figure 35:
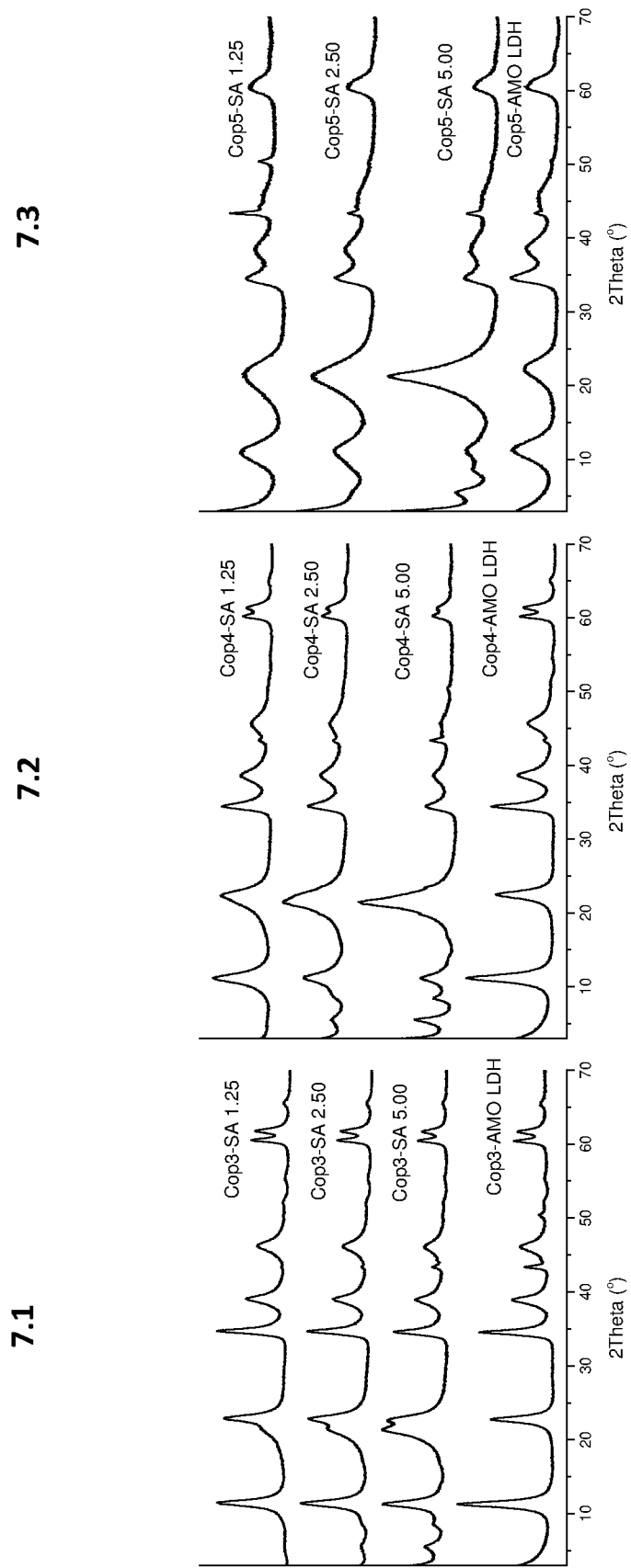
FIG. 35 shows the XRD patterns of modified LDHs prepared according to Example 7.

Analysis of Stearic Acid Modified AMO Mg$_3$Al—CO$_3$, Mg$_4$Al—CO$_3$ & Mg$_5$Al—CO$_3$ LDHs FIG. 35 shows the XRD patterns of modified LDHs prepared according to Examples 7.1, 7.2 and 7.3 as well as the unmodified LDH (AMO LDH) in each case. Impurities peaks from the excess stearic acid were observed at high loading level of stearic acid.

Figure 36:
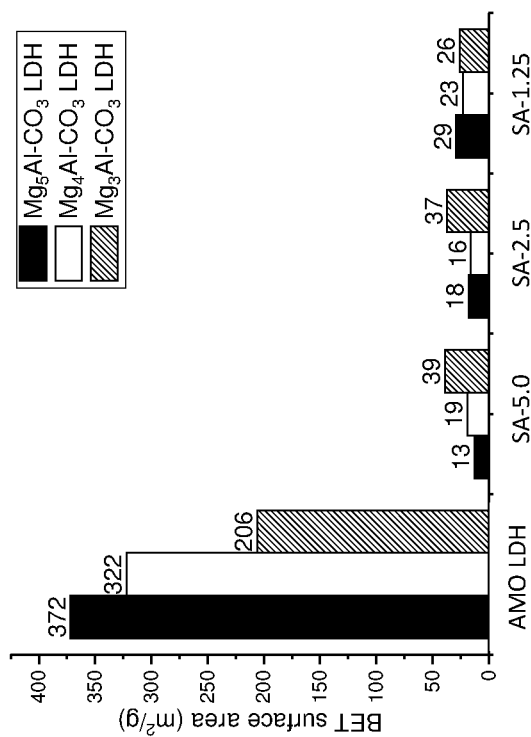
FIG. 36 shows the BET surface area of modified LDHs prepared according to Example 7.

FIG. 36 shows the BET surface area of modified LDHs prepared according to Examples 7.1 (striped bars), 7.2 (white bars) and 7.3 (black bars) as well as the unmodified LDH (AMO LDH) in each case. Surface area decreased after all the surface treatments.

Figure 37:
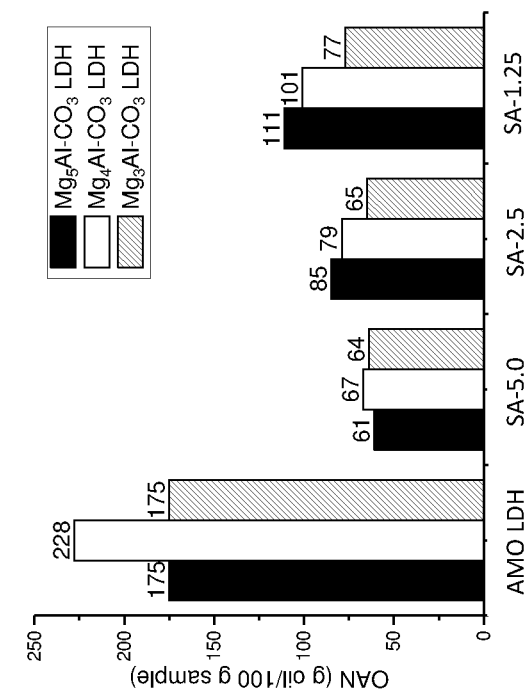
FIG. 37 shows the OAN of modified LDHs prepared according to Example 7.

FIG. 37 shows the oil absorption number (OAN) of modified LDHs prepared according to Examples 7.1 (striped bars), 7.2 (white bars) and 7.3 (black bars) as well as the unmodified LDH (AMO LDH) in each case. OAN decreased after the surface treatments and lower OAN corresponded to higher stearic acid loading.

Figure 38:
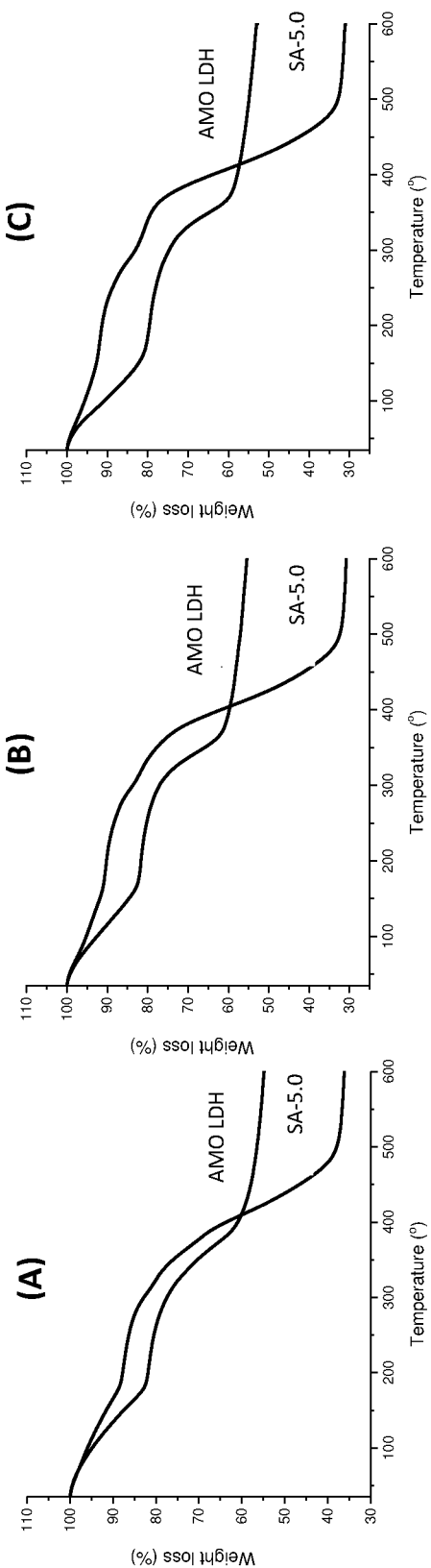
FIG. 38 shows the TGA curves of modified LDHs prepared according to Example 7.

FIG. 38 shows the TGA curves of (A) Cop3-SA-5, (B) Cop4-SA-5 and (C) Cop5-SA-5, surface-treated products plotted alongside the TGA curves for the corresponding unmodified LDH (AMO LDH) in each case.

Figure 39:
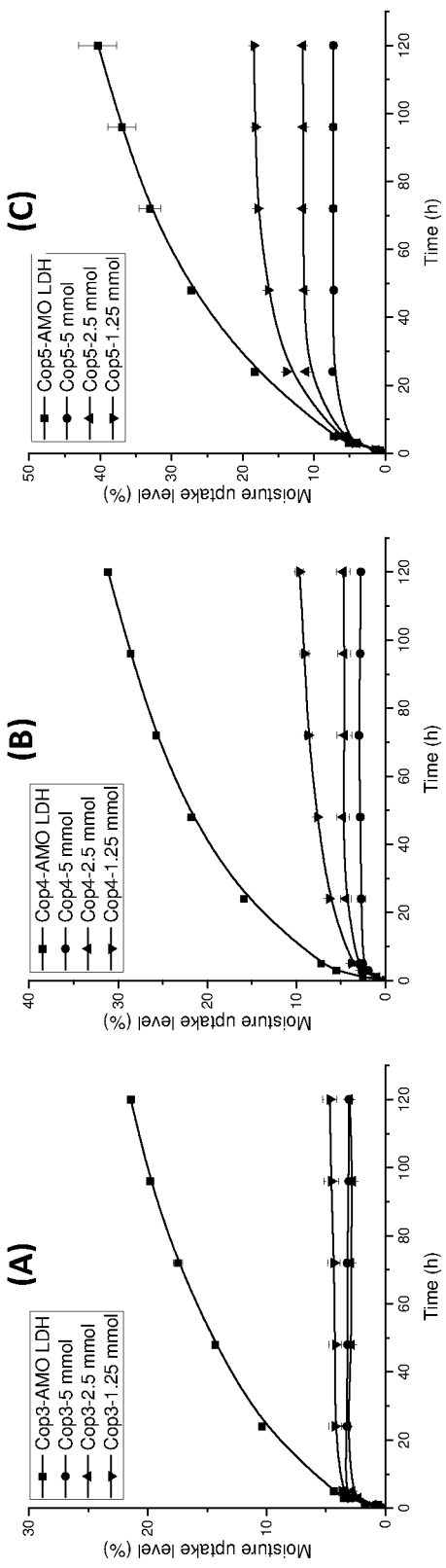
FIG. 39 shows the moisture uptake levels of modified LDHs prepared according to Example 7.

FIG. 39 shows the moisture uptake levels of the modified LDHs prepared according to Examples 7.1 (A), 7.2 (B) and 7.3 (C) as well as the unmodified LDH (AMO LDH) in each case, after exposure to RH99 humidity at 20° C. at various time points. The post treatment with stearic acid reduced the LDH uptake of moisture, especially at high loading levels of stearic acid.

EXAMPLE 8—MODIFICATION OF AMO MGZN$_2$AL—CO$_3$ LDH

Preparation of MgZn$_2$Al—CO$_3$ AMO-LDH

MgZn$_2$Al—CO$_3$ (provided by SCG Chemicals) was slurried in ethanol, filtered, washed with ethanol and dried to give MgZn$_2$Al—CO$_3$AMO-LDH.

EXAMPLE 8.1—STEARIC ACID-MODIFIED AMO MGZN$_2$AL—CO$_3$ LDH

Various amount of stearic acid (0.25, 0.5, 1.0, 2.0 mmol/g LDH) was dissolved in 300 mL of ethanol. 3 g of MgZn$_2$Al—CO$_3$AMO-LDH was introduced into stearic acid solution and mixed by homogenizer for 30 min. The mixture was then refluxed at 80° C. for 16 h. The solid was collect by filtration and washed with 600 mL of ethanol. Products were noted as MZA-SA-X, where X=amount of stearic acid used in mmol and MZA refers to MgZn$_2$Al—CO$_3$.

Figure 40:
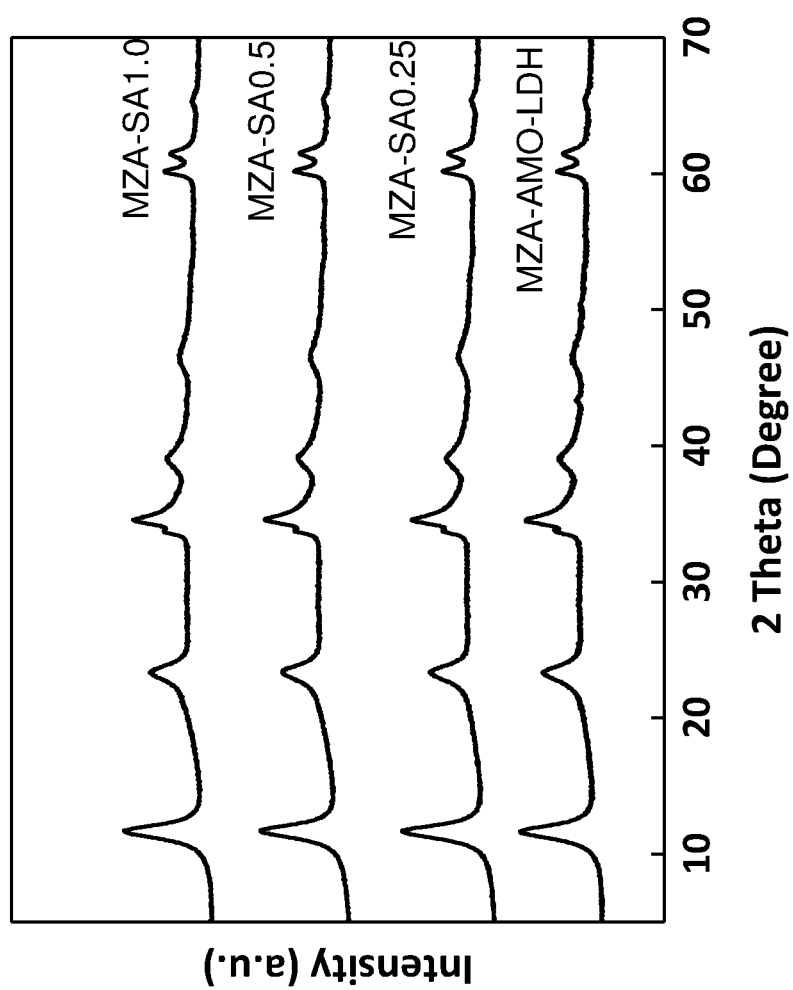
FIG. 40 shows the XRD patterns of modified MgZn$_2$Al—CO$_3$ LDHs prepared according to Example 8.1.

FIG. 40 shows the XRD patterns of modified MgZn$_2$Al—CO$_3$ LDHs prepared according to Example 8.1, as well as the unmodified LDH (MZA-AMO-LDH). No impurity phase was observed after surface modification with loadings of stearic acid up to 1.0 mmol per g of LDH.

Figure 41:
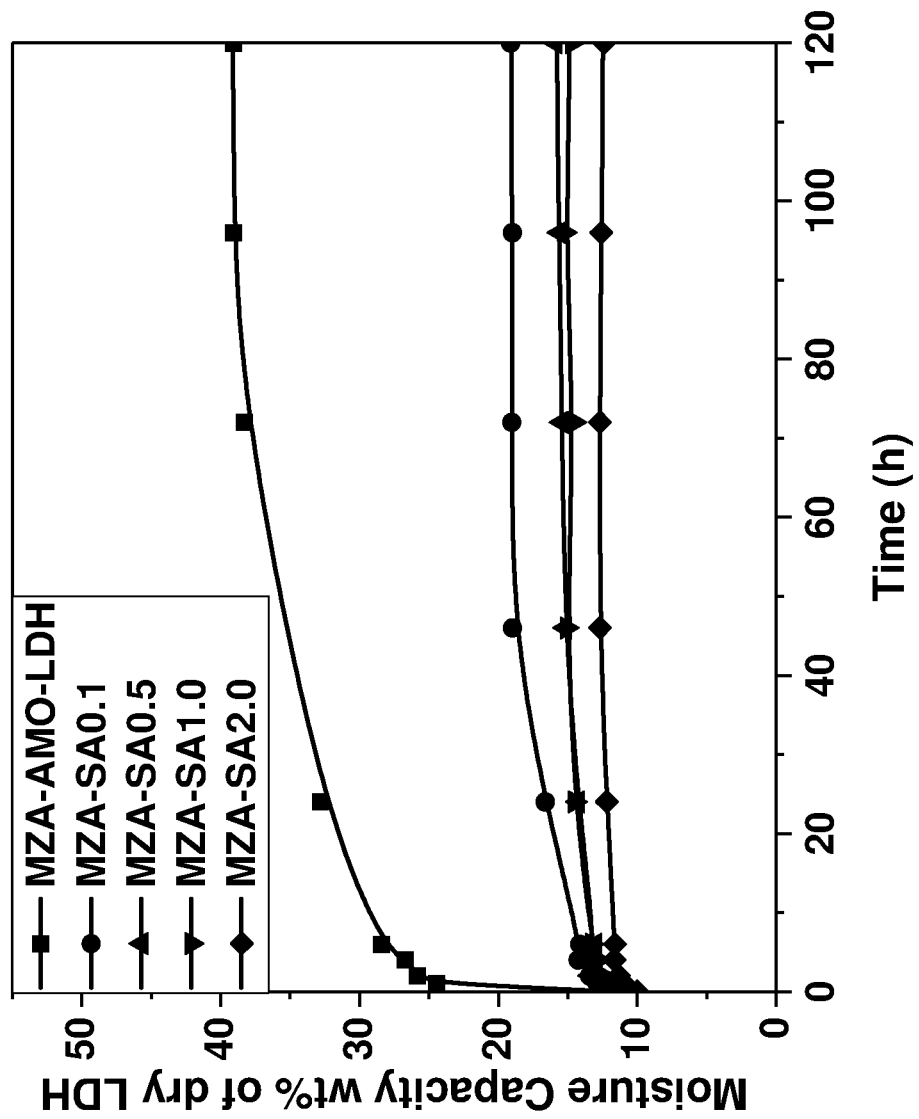
FIG. 41 shows the moisture capacity of modified MgZn$_2$Al—CO$_3$ LDHs prepared according to Example 8.1.

FIG. 41 shows the moisture capacity of modified MgZn$_2$Al—CO$_3$ LDHs prepared according to Example 8.1, as well as the unmodified LDH (MZA-AMO-LDH), after exposure to RH99 humidity at 20° C. at various time points. Unmodified MgZn$_2$Al—CO$_3$ AMO-LDH exhibited a much faster moisture adsorption rate and higher adsorption capacity than the modified samples, reaching up to 37 wt % of dry LDH. As a result of stearic acid treatment, the moisture can be kept below 19 wt % of dry LDH. The lowest moisture capacity was 13 wt %, observed with the highest stearic acid loading of 2.0 mmol/g LDH (MZA-SA-2.0).

EXAMPLE 8.2—TRIETHOXYVINYLSILANE (TEVS)-MODIFIED AMO MGZN$_2$AL—CO$_3$ LDH (METHOD 1)

2 g of MgZn$_2$Al—CO$_3$ AMO-LDH was dispersed into 40 mL of Ethanol and purged with N$_2$. TEVS with different loadings (8.5, 2.8 mmol/g LDH) was injected dropwise into the suspension followed by reflux at 80° C. for 16 h. The solvent was evaporated. Half of solid was thermally treated at 150° C. for 6 h and the rest was used for characterisation. Products were noted as MZA-TEVS-X, where X=amount of TEVS used in mmol and MZA refers to Mg$_2$ZnAl—CO$_3$.

Figure 42:
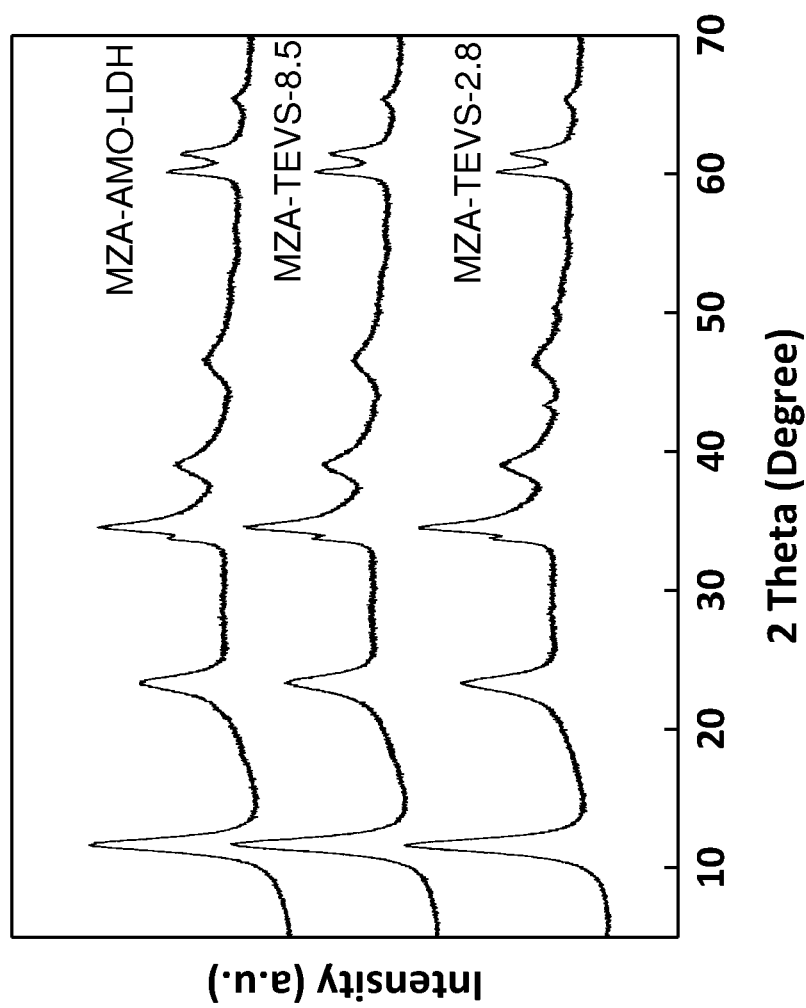
FIG. 42 shows the XRD patterns of modified MgZn$_2$Al—CO$_3$ LDHs prepared according to Example 8.2.

FIG. 42 shows the XRD patterns of modified MgZn$_2$Al—CO$_3$ LDHs prepared according to Example 8.2 (no thermal post-treatment), as well as the unmodified LDH (MZA-AMO-LDH). No impurity phase was observed after surface modification with TEVS.

Figure 43:
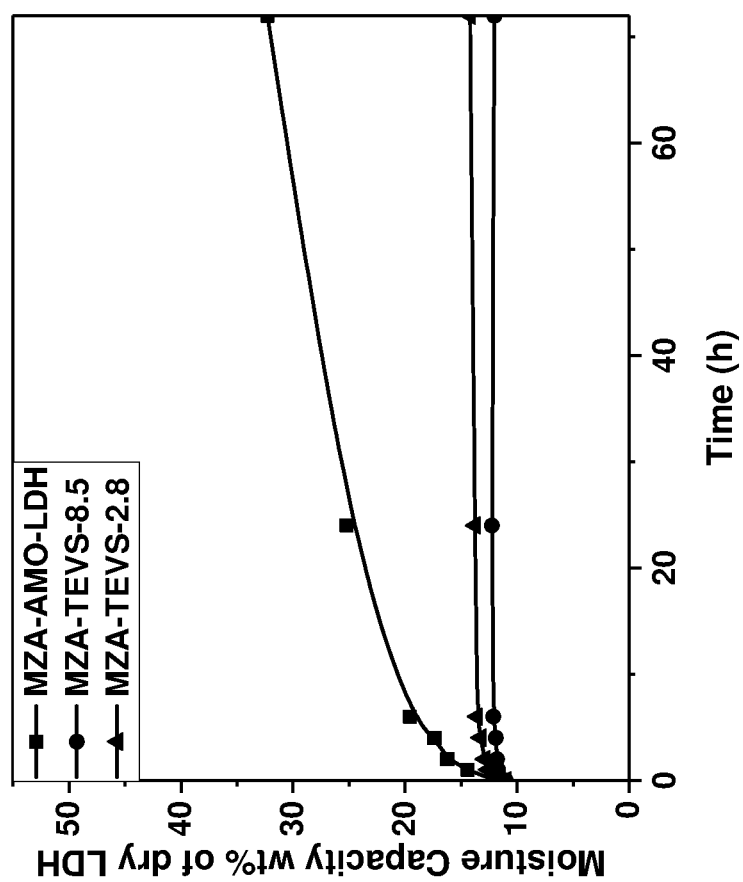
FIG. 43 shows the moisture capacity of modified MgZn$_2$Al—CO$_3$ LDHs prepared according to Example 8.2.

FIG. 43 shows the moisture capacity of modified MgZn$_2$Al—CO$_3$ LDHs prepared according to Example 8.2 (no thermal post-treatment), as well as the unmodified LDH (MZA-AMO-LDH), after exposure to RH99 humidity at 20° C. at various time points. The MgZn$_2$Al—CO$_3$ AMO-LDH after modification with TEVS can effectively prevent the moisture adsorption as shown in FIG. 43. When the silane loading reached 8.5 mmol/g LDH, it kept moisture below 12 wt % of dry LDH for more than 4 days.

Figure 44:
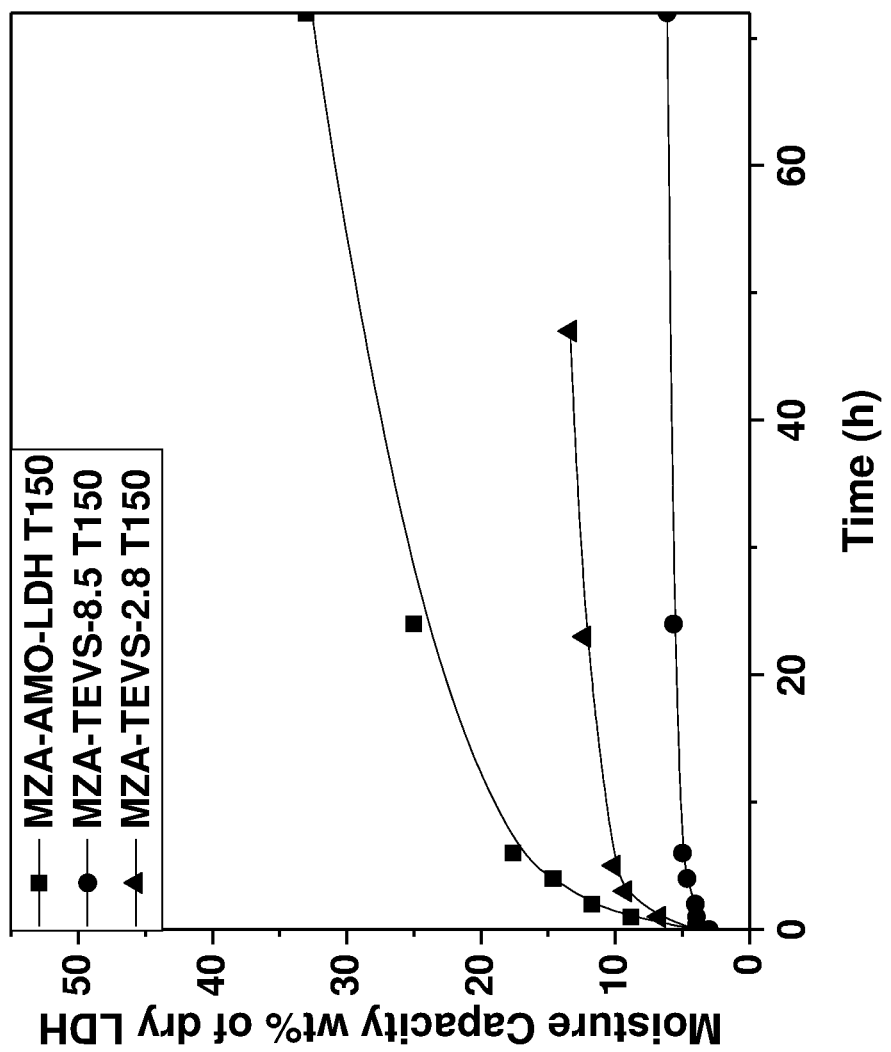
FIG. 44 shows the moisture capacity of modified MgZn$_2$Al—CO$_3$ LDHs prepared according to Example 8.2 (with 150° C. for 6 h thermal post-treatment).

FIG. 44 shows the moisture capacity of modified MgZn$_2$Al—CO$_3$ LDHs prepared according to Example 8.2 (with 150° C. for 6 h thermal post-treatment), as well as the unmodified LDH (MZA-AMO-LDH) which had also been subjected to the 150° C. for 6 h thermal post-treatment, after exposure to RH99 humidity at 20° C. at various time points. The silane-treated samples after thermal post-treatment at 150° C. for 6 h exhibited a much stronger ability to maintain moisture below 6 wt % in RH99 for more than 4 days.

Thermal post-treatment on the sample with the higher TEVS loading exhibited better performance.

EXAMPLE 8.3—TRIETHOXYVINYLSILANE (TEVS)-MODIFIED AMO MGZN$_2$AL—CO$_3$ LDH (METHOD 2)

2 g of MgZn$_2$Al—CO$_3$AMO-LDH was thermally treated at 180° C. for 6 h. The dry solid was dispersed in 100 mL acetone purged with N$_2$. TEVS (5.6 mmol/g LDH) was injected dropwise into the suspension followed by reflux at 60° C. for 16 h. The solid was collected and washed with acetone (300 mL) followed by drying in an oven at 80° C. overnight.

Figure 45:
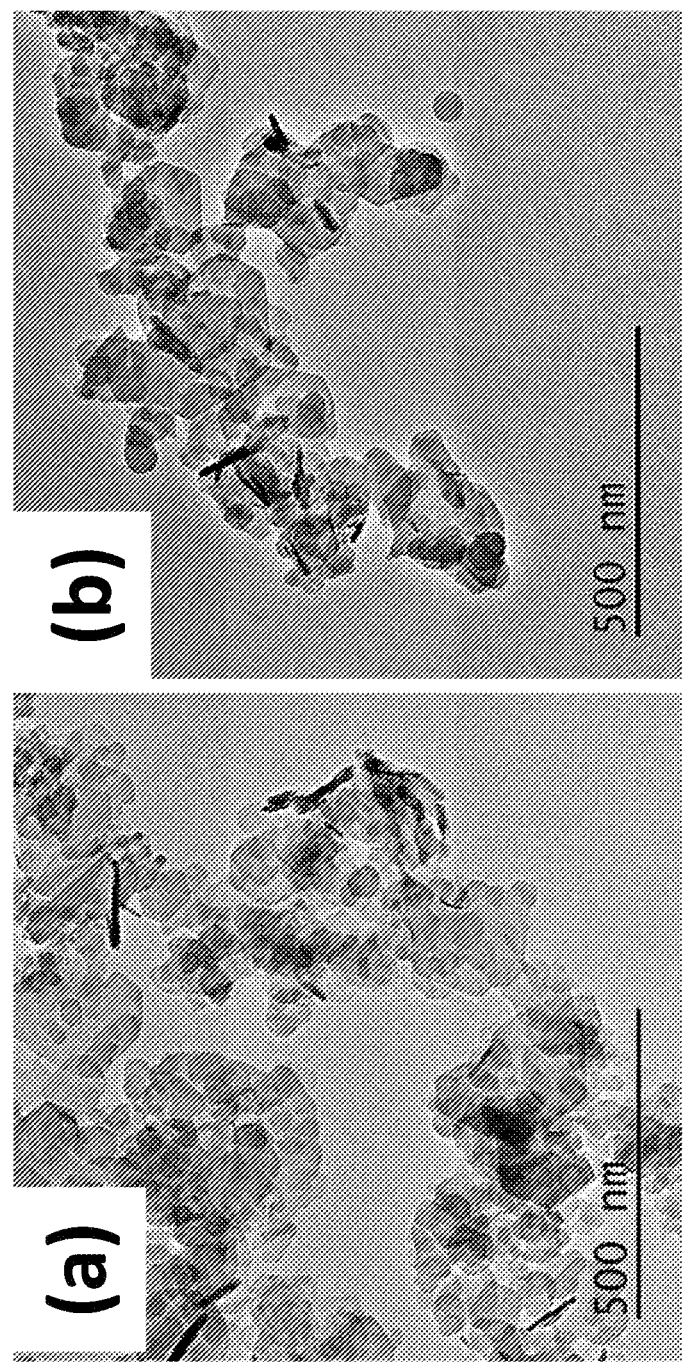
FIG. 45 shows TEM images of (a) unmodified MgZn$_2$Al—CO$_3$AMO-LDH and (b) Example 8.3.

FIG. 45 shows TEM images of (a) unmodified MgZn$_2$Al—CO$_3$ AMO-LDH and (b) Example 8.3. After silane modification, there is no much difference in the morphology and aggregation degree.

Figure 46:
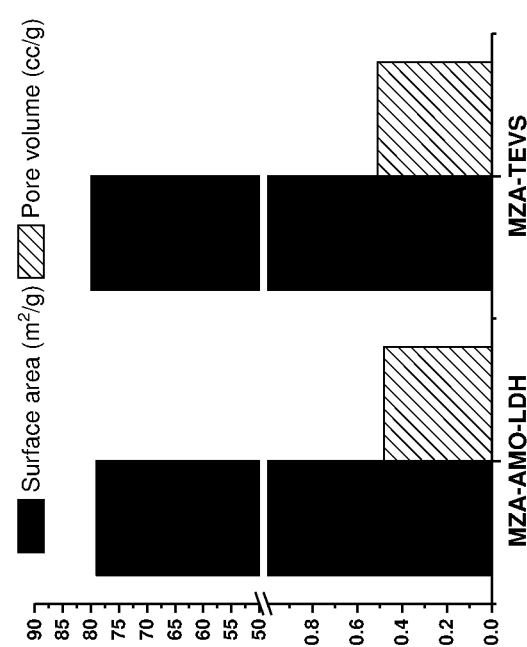
FIG. 46 shows the surface area (black bars) and pore volume (striped bars) of unmodified MgZn$_2$Al—CO$_3$AMO-LDH and Example 8.3.

FIG. 46 shows the surface area in m$^2$/g (black bars) and pore volume in cm$^3$/g (striped bars) of unmodified MgZn$_2$Al—CO$_3$ AMO-LDH and Example 8.3 (MZA-TEVS). The surface area and pore volume after silane modification were essentially unchanged.

Figure 47:
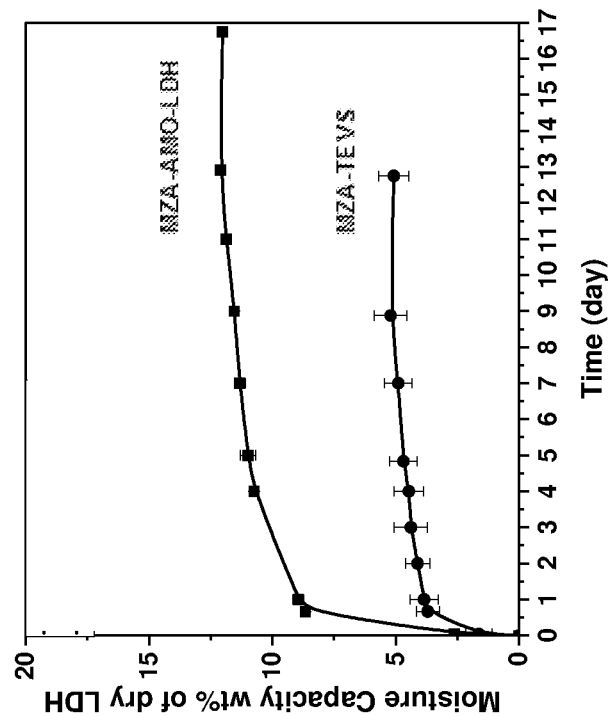
FIG. 47 shows the moisture capacity of unmodified MgZn$_2$Al—CO$_3$ AMO-LDH and Example 8.3 (MZA-TEVS).

FIG. 47 shows the moisture capacity of unmodified MgZn$_2$Al—CO$_3$ AMO-LDH and Example 8.3 (MZA-TEVS) after exposure to RH60 humidity at 20° C. at various time points. After TEVS modification, the moisture level under these conditions could be kept below 5 wt %.

EXAMPLE 8.4—TRIETHOXYOCTYLSILANE (TEOS)-MODIFIED AMO MGZN$_2$AL—CO$_3$ LDH 2 g of MgZn$_2$Al—CO$_3$AMO-LDH was thermally treated at 180° C. for 6 h. The dry solid was dispersed in 100 mL acetone purged with N$_2$. Triethoxyoctylsilane (5.6 mmol/g LDH) was injected dropwise into the suspension followed by reflux at 60° C. for 16 h. The solid was collected and washed with acetone (300 mL) followed by drying in an oven at 80° C. overnight.

Figure 48:
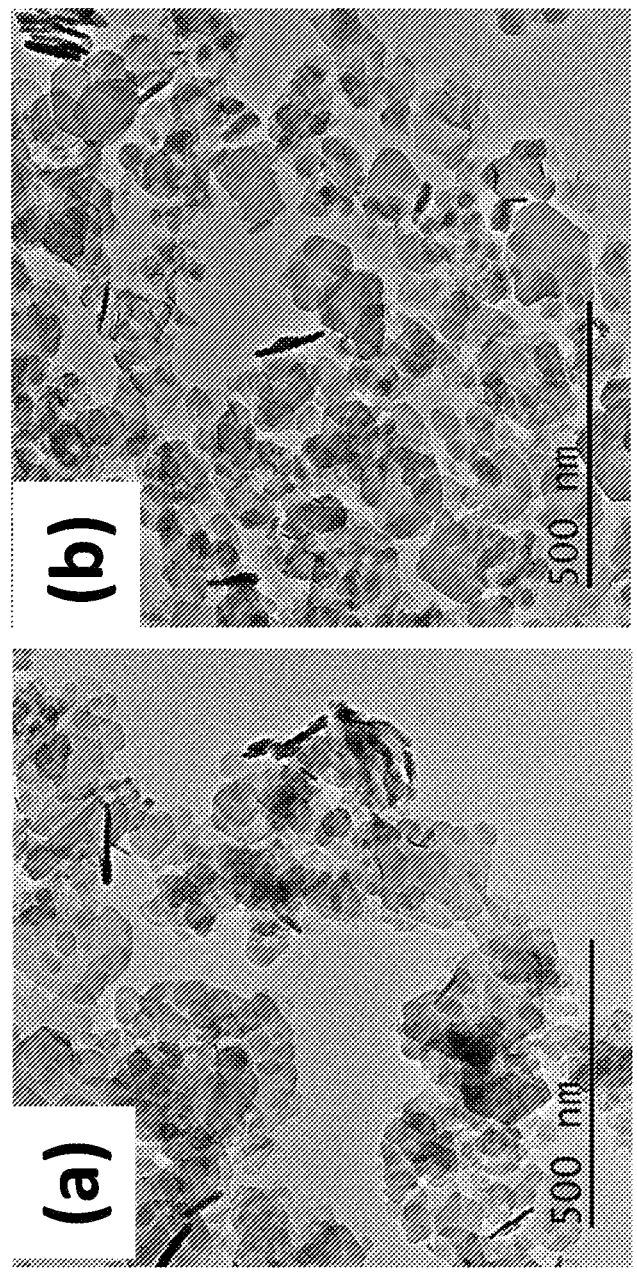
FIG. 48 shows TEM images of (a) unmodified MgZn$_2$Al—CO$_3$AMO-LDH and (b) Example 8.4.

FIG. 48 shows TEM images of (a) unmodified MgZn$_2$Al—CO$_3$ AMO-LDH and (b) Example 8.4. After silane modification, the particles are better dispersed and less aggregated.

Figure 49:
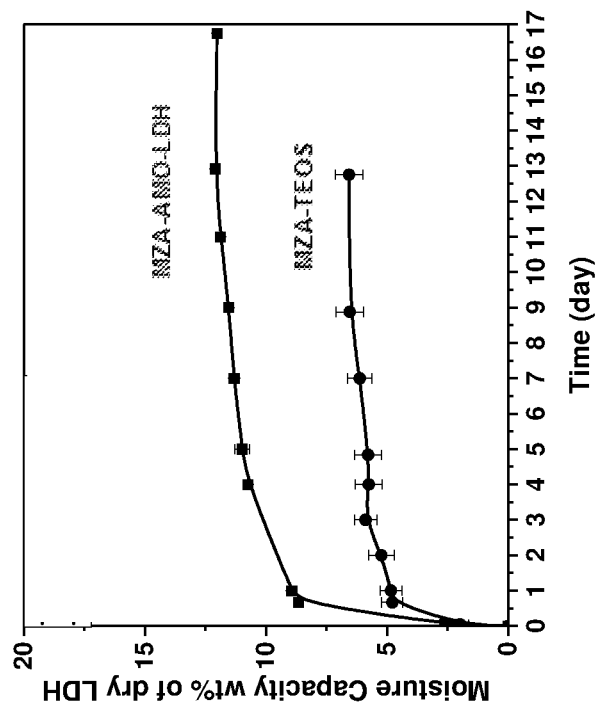
FIG. 49 shows the moisture capacity of unmodified MgZn$_2$Al—CO$_3$ AMO-LDH and Example 8.4 (MZA-TEOS).

FIG. 49 shows the moisture capacity of unmodified MgZn$_2$Al—CO$_3$ AMO-LDH and Example 8.4 (MZA-TEOS) after exposure to RH60 humidity at 20° C. at various time points. After TEOS modification, the moisture level under these conditions could be kept below 6 wt %, indicating reduced hydrophilicity compared to the unmodified LDH.

Figure 50:
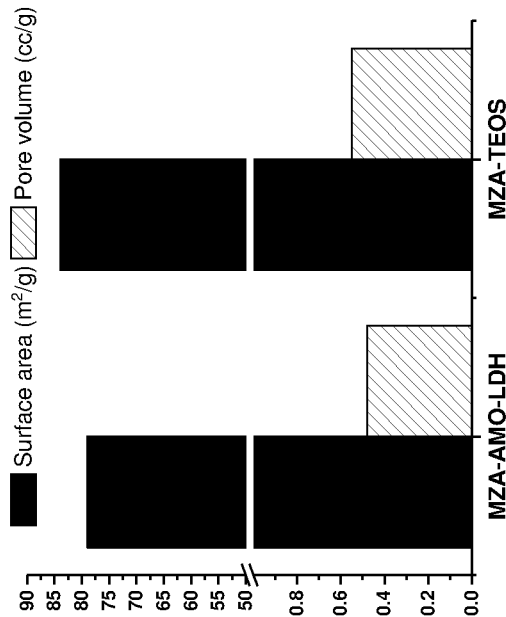
FIG. 50 shows the surface area (black bars) and pore volume (striped bars) of unmodified MgZn$_2$Al—CO$_3$AMO-LDH and Example 8.4.

FIG. 50 shows the surface area in m$^2$/g (black bars) and pore volume in cm$^3$/g (striped bars) of unmodified MgZn$_2$Al—CO$_3$ AMO-LDH and Example 8.4 (MZA-TEOS). The surface area and pore volume after silane modification were slightly higher than unmodified LDH.

EXAMPLE 8.5—(3-AMINOPROPYL)TRIETHOXYSILANE (APTES)-MODIFIED AMO MGZN$_2$AL—CO$_3$ LDH 2 g of MgZn$_2$Al—CO$_3$AMO-LDH was thermally treated at 180° C. for 6 h. The dry solid was dispersed in 100 mL acetone purged with N$_2$. (3-aminopropyl)triethoxysilane (APTES, also referred to as TEAPS) (5.6 mmol/g LDH) was injected dropwise into the suspension followed by reflux at 60° C. for 16 h. The solid was collected and washed with acetone (300 mL) followed by drying in an oven at 80° C. overnight.

Figure 51:
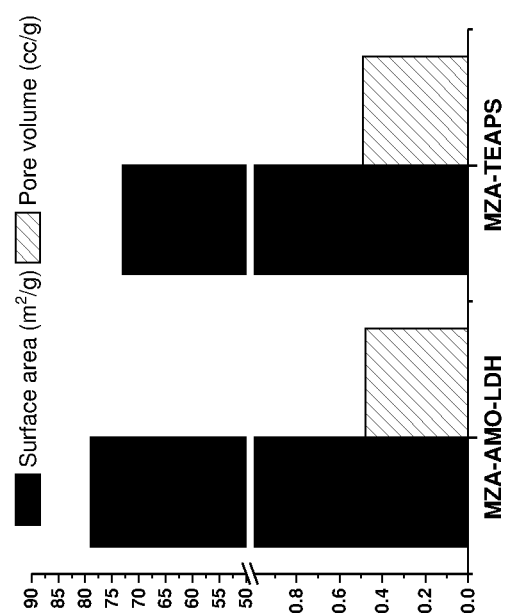
FIG. 51 shows the surface area (black bars) and pore volume (striped bars) of unmodified MgZn$_2$Al—CO$_3$AMO-LDH and Example 8.5.

FIG. 51 shows the surface area in m$^2$/g (black bars) and pore volume in cm$^3$/g (striped bars) of unmodified MgZn$_2$Al—CO$_3$AMO-LDH and Example 8.5 (MZA-TEAPS). The surface area and pore volume after silane modification were slightly lower than unmodified LDH.

Figure 52:
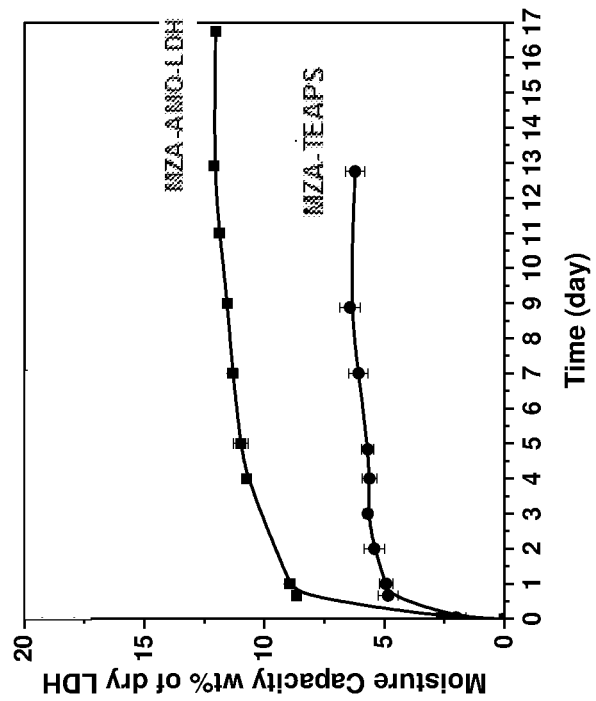
FIG. 52 shows the moisture capacity of unmodified MgZn$_2$Al—CO$_3$ AMO-LDH and Example 8.5 (MZA-TEAPS).

FIG. 52 shows the moisture capacity of unmodified MgZn$_2$Al—CO$_3$ AMO-LDH and Example 8.5 (MZA-TEAPS) after exposure to RH60 humidity at 20° C. at various time points. After APTES modification, the moisture level under these conditions could be kept below 6 wt %, indicating reduced hydrophilicity compared to the unmodified LDH.

EXAMPLE 8.6—(3-GLYCIDYLOXYPROPYL)TRIMETHOXYSILANE (GLYMO)-MODIFIED AMO MGZN$_2$AL—CO$_3$ LDH 2 g of MgZn$_2$Al—CO$_3$ AMO-LDH was thermally treated at 180° C. for 6 h. The dry solid was dispersed in 100 mL acetone purged with N$_2$. (3-glycidyloxypropyl)trimethoxysilane (GLYMO, also referred to as TMGPS) (5.6 mmol/g LDH) was injected dropwise into the suspension followed by reflux at 60° C. for 16 h. The solid was collected and washed with acetone (300 mL) followed by drying in an oven at 80° C. overnight.

Figure 53:
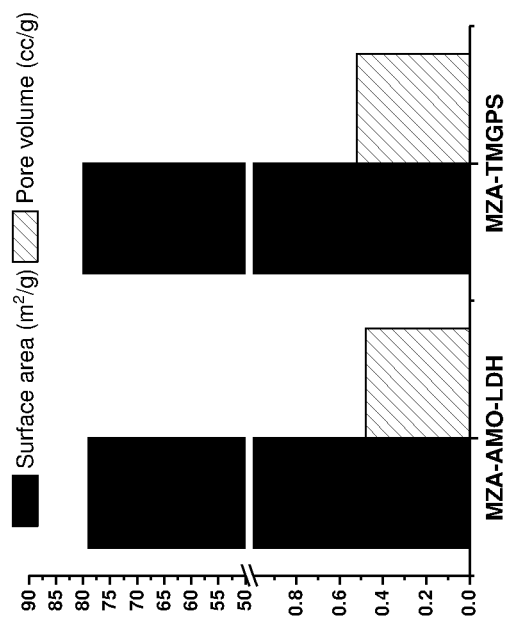
FIG. 53 shows the surface area (black bars) and pore volume (striped bars) of unmodified MgZn$_2$Al—CO$_3$AMO-LDH and Example 8.6.

FIG. 53 shows the surface area in m$^2$/g (black bars) and pore volume in cm$^3$/g (striped bars) of unmodified MgZn$_2$Al—CO$_3$ AMO-LDH and Example 8.6 (MZA-TMGPS). The surface area and pore volume after silane modification were essentially the same as unmodified LDH.

Figure 54:
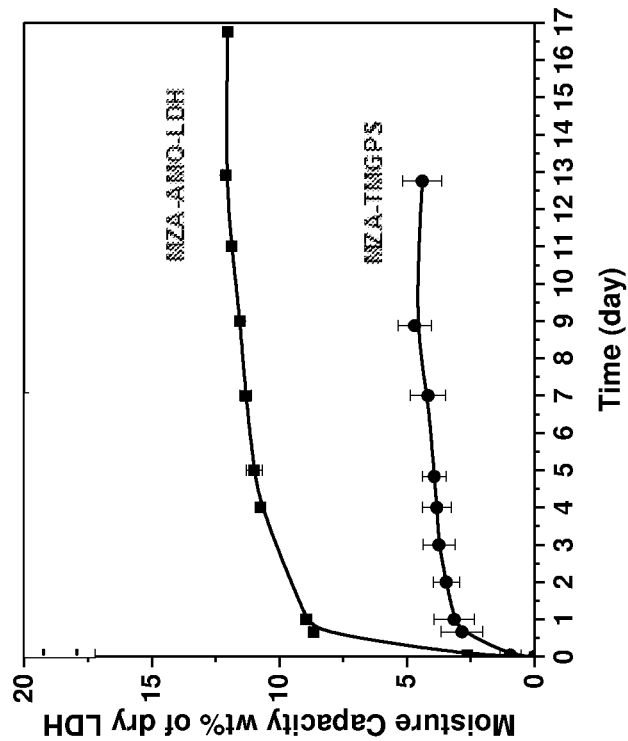
FIG. 54 shows the moisture capacity of unmodified MgZn$_2$Al—CO$_3$ AMO-LDH and Example 8.6 (MZA-TMGPS).

FIG. 54 shows the moisture capacity of unmodified MgZn$_2$Al—CO$_3$ AMO-LDH and Example 8.6 (MZA-TMGPS) after exposure to RH60 humidity at 20° C. at various time points. After GLYMO modification, the moisture level under these conditions could be kept below 6 wt %, indicating reduced hydrophilicity compared to the unmodified LDH.

Figure 55:
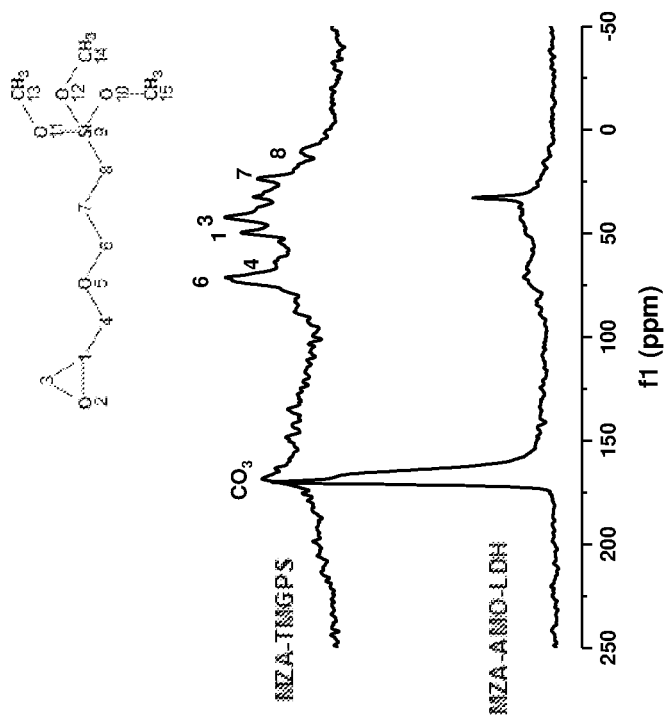
FIG. 55 shows the $^{13}$C-NMR spectra of unmodified MgZn$_2$Al—CO$_3$ AMO-LDH (bottom) and Example 8.6 (top).

FIG. 55 shows the $^{13}$C-NMR spectra of unmodified MgZn$_2$Al—CO$_3$ AMO-LDH (bottom) and Example 8.6 (top). The functional group of silane can be clearly observed from $^{13}$C NMR spectra, indicating the successful surface graft of 3-glycidoxypropylsilane on the LDH.

Figure 56:
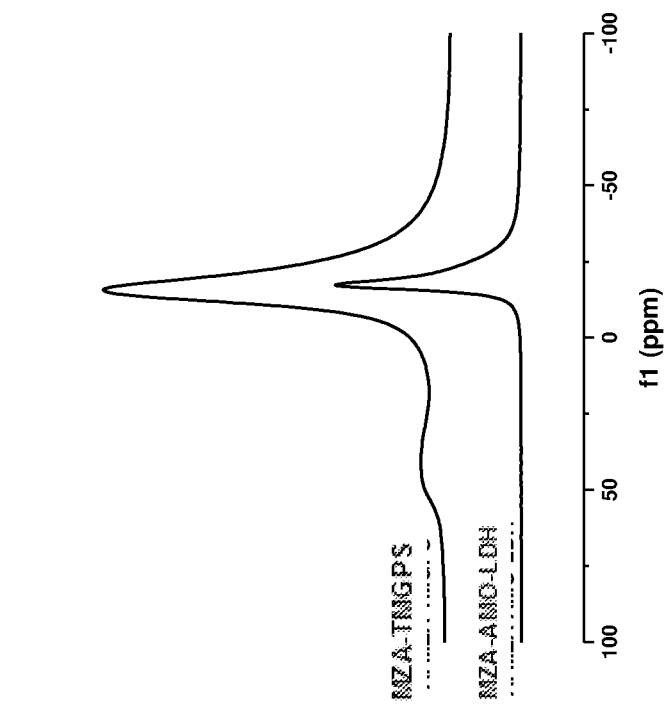
FIG. 56 shows the $^{27}$Al-NMR spectra of unmodified MgZn$_2$Al—CO$_3$ AMO-LDH (bottom) and Example 8.6 (top).

FIG. 56 shows the $^{27}$Al-NMR spectra of unmodified MgZn$_2$Al—CO$_3$ AMO-LDH (bottom) and Example 8.6 (top). The extra peak at around 50 ppm was observed, which is attributed to the migration of Al from LDH and the formation of tetrahedral Al—O—Si sites with the silane.

EXAMPLE 9—SILANE MODIFICATION OF AMO MG$_3$AL—CO$_3$ LDH

EXAMPLE 9.1—TRICHLORO(OCTADECYL)SILANE (TCODS)-MODIFIED AMO MG$_3$AL—CO$_3$ LDH 1 g of Mg$_3$Al—CO$_3$ AMO-LDH (prepared as per Example 1, AMO-LDH-2) was thermally treated at 180° C. for 6 h. The dry solid was dispersed in 20 mL acetone purged with N$_2$. Different loadings of trichloro(octadecyl)silane (0.5, 1.0 & 2.0 mmol/g LDH) were injected dropwise into the suspension followed by reflux at 60° C. for 16 h. The solid was collected by centrifugation and washed with acetone (×3) followed by drying in vacuum overnight.

Products were noted as MA-TCODS-X, where X=amount of TCODS used in mmol and MA refers to $Mg_3Al$—$CO_3$.

Figure 57:
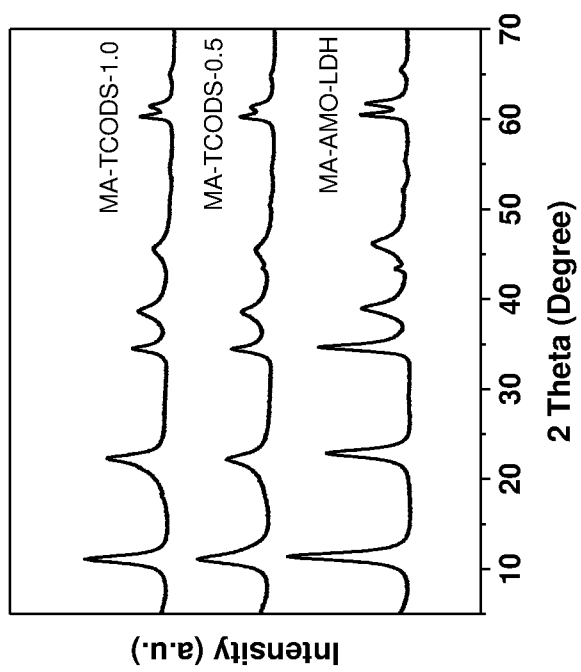
FIG. 57 shows the XRD patterns of modified Mg$_3$Al—CO$_3$ LDHs prepared according to Example 9.1.

FIG. 57 shows the XRD patterns of modified $Mg_3Al$—$CO_3$ LDHs prepared according to Example 9.1, as well as the unmodified LDH (MA-AMO-LDH). No impurity phase was observed after surface modification with loadings of TCODS up to 1.0 mmol/g of LDH.

Figure 58:
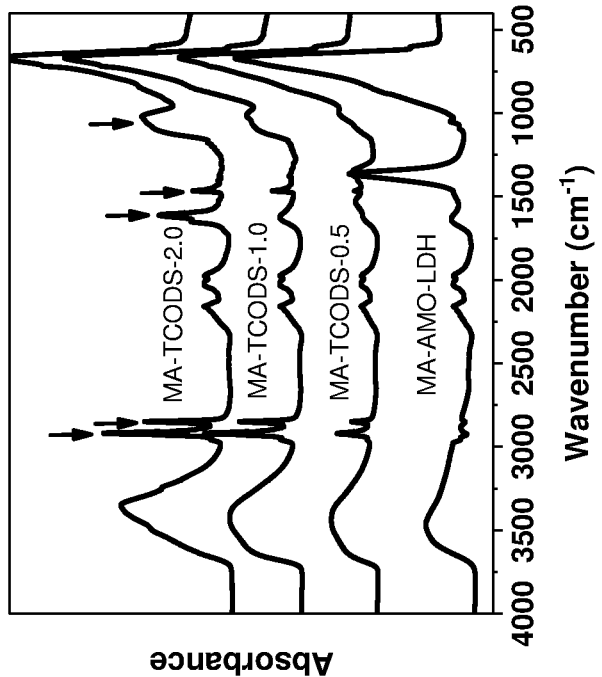
FIG. 58 shows the FTIR spectra of modified Mg$_3$Al—CO$_3$ LDHs prepared according to Example 9.1.

FIG. 58 shows the FTIR spectra of modified $Mg_3Al$—$CO_3$ LDHs prepared according to Example 9.1, as well as the unmodified LDH (MA-AMO-LDH). With increased TCODS-loading, the more obvious vibrations of $CH_2$, $CH_3$ (2919, 2850 cm$^{-1}$) and Si—O—Si (900-1100 cm$^{-1}$) can be observed (as indicated by the arrows), indicating the formation of silane on the AMO-LDH.

Figure 59:
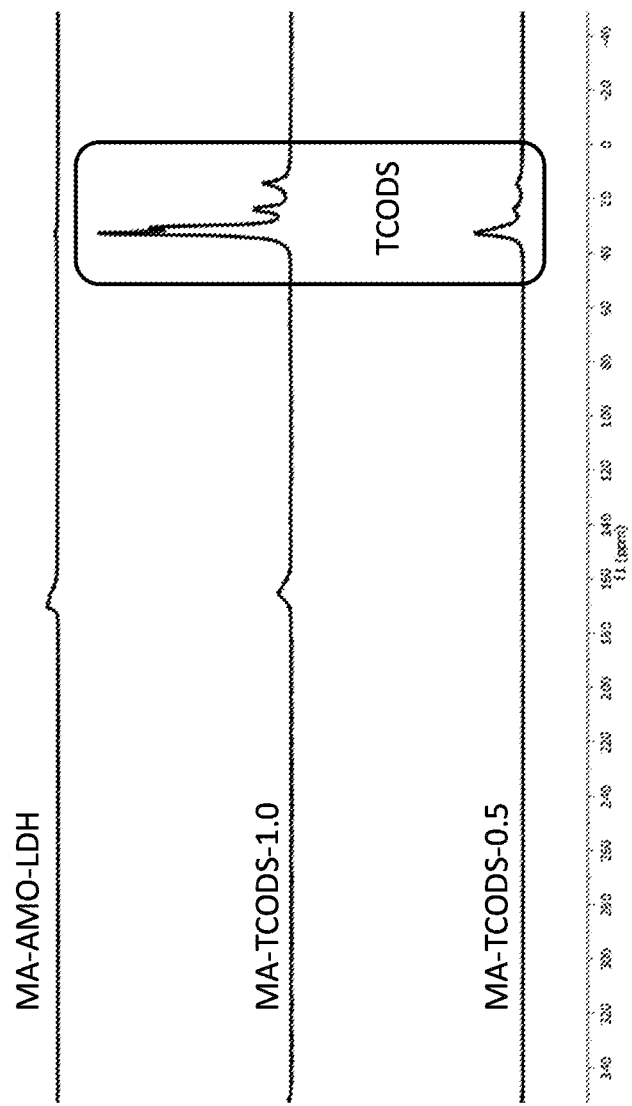
FIG. 59 shows the $^{13}$C-NMR spectra of unmodified Mg$_3$Al—CO$_3$ AMO-LDH (top) and modified Mg$_3$Al—CO$_3$ LDHs prepared according to Example 9.1 (middle and bottom).

FIG. 59 shows the $^{13}$C-NMR spectra of unmodified $Mg_3Al$—$CO_3$ AMO-LDH (top) and modified $Mg_3Al$—$CO_3$ LDHs prepared according to Example 9.1 (middle and bottom). The octadecyl group of TCODS can be clearly observed in the TCODS-treated samples, as highlighted in the rectangular box.

EXAMPLE 9.2—TRIETHOXYOCTYLSILANE (TEOS)-MODIFIED AMO $MG_3AL$—$CO_3$ LDH 1 g of $Mg_3Al$—$CO_3$ AMO-LDH was thermally treated at 180° C. for 6 h. The dry solid was dispersed in 20 mL acetone purged with $N_2$. Triethoxyoctylsilane (3.22 mmol/g LDH) was injected dropwise into the suspension followed by reflux at 60° C. for 16 h. The solid was collected by centrifugation and washed with acetone (×3) followed by drying in vacuum overnight.

Figure 60:
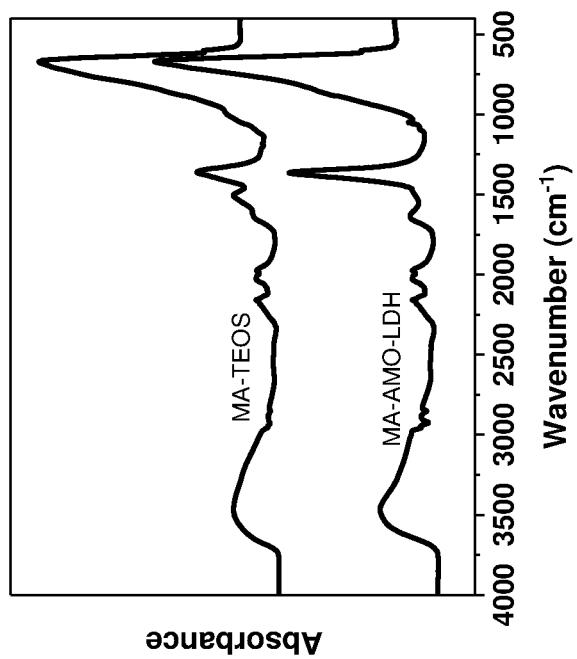
FIG. 60 shows the FTIR spectra of modified Mg$_3$Al—CO$_3$ LDH prepared according to Example 9.2.

FIG. 60 shows the FTIR spectra of modified $Mg_3Al$—$CO_3$ LDH prepared according to Example 9.2, as well as the unmodified LDH (MA-AMO-LDH). After silane modification, the obvious vibrations of Si—O—Si (900-1100 cm$^{-1}$) can be observed, indicating the formation of silane on the AMO-LDH.

Figure 61:
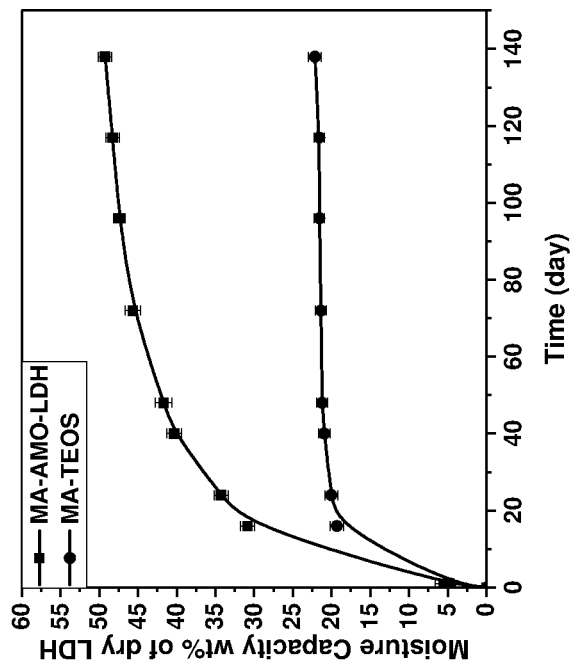
FIG. 61 shows the moisture capacity of modified Mg$_3$Al—CO$_3$ LDH prepared according to Example 9.2 (MA-TEOS).

FIG. 61 shows the moisture capacity of modified $Mg_3Al$—$CO_3$ LDH prepared according to Example 9.2 (MA-TEOS), as well as the unmodified LDH (MA-AMO-LDH), after exposure to RH99 humidity at 20° C. at various time points. After silane modification, the moisture level does not exceed 20 wt %, indicating that the TEOS-treated sample is much less hydrophilic compared with the unmodified LDH.

Figure 62:
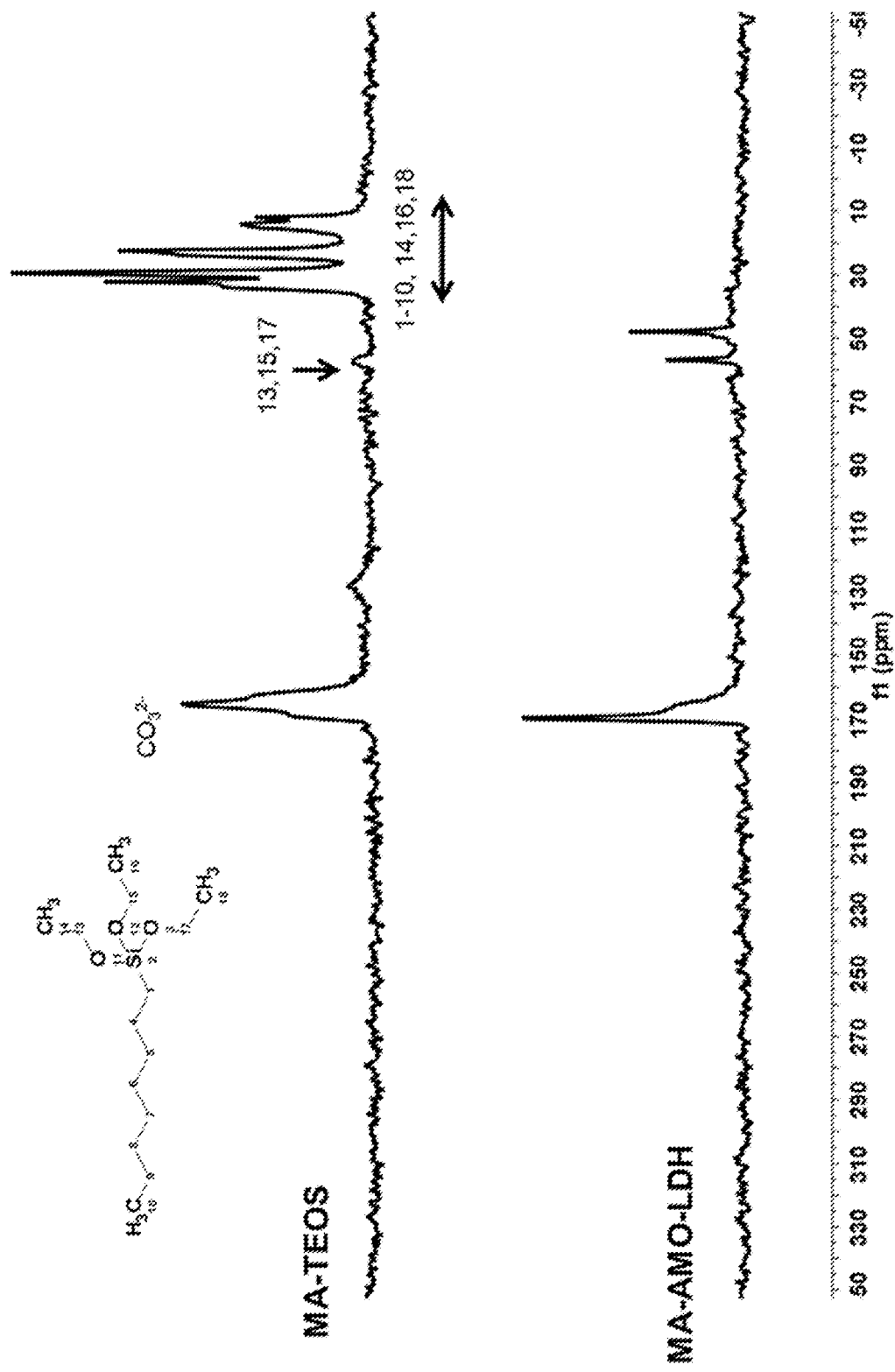
FIG. 62 shows the $^{13}$C-NMR spectra of unmodified Mg$_3$Al—CO$_3$AMO-LDH (bottom) and modified MA-TEOS prepared according to Example 9.2 (top).

FIG. 62 shows the $^{13}$C-NMR spectra of unmodified $Mg_3Al$—$CO_3$ AMO-LDH (bottom) and modified MA-TEOS prepared according to Example 9.2 (top). The NMR results show that the functional group (alkyl) of TEOS is present in the MA-TEOS sample, indicating the successful surface graft of TEOS on the LDH.

EXAMPLE 10—COMPARATIVE SILANE MODIFICATION OF AMO $MG_3AL$—$CO_3$ LDH AND $MG_3AL$—$CO_3$ LDH

EXAMPLE 10.1—TRIETHOXYVINYLSILANE-MODIFIED $MG_3AL$—$CO_3$ LDH (SLURRY METHOD)

Water-Washed LDH Formation

A mixed metal solution was prepared from 9.6 g of $Mg(NO_3)_2.6H_2O$ (37.4 mmol), 4.7 g of $Al(NO_3)_3.9H_2O$ (12.5 mmol) in 50 mL of de-carbonated water (Solution A). A second solution contained 2.65 g of $Na_2CO_3$ (25.0 mmol) in 50 mL of deionised water (Solution B). The solution A was added drop-wise (58 mL/min) to the Solution B. The system was kept at constant pH 10 by using 4 M NaOH and aged for 16 hours at room temperature. The slurry was then filtered and the filter cake was washed with de-carbonated water until the pH was close to 7. The water-washed $Mg_3Al$—$CO_3$ LDH was dispersed in water to give a 29% w/v slurry.

TEVS Modification

Water washed $Mg_3Al$—$CO_3$ LDH slurry (29% w/v in water, equal to 1 g of dry LDH) was dispersed into 100 mL of ethanol purged with $N_2$. Triethoxyvinylsilane (TEVS) (2.8 mmol/g LDH) was injected dropwise into the suspension followed by reflux at 80° C. for 18 h. The solid was collected by filtration and washed with ethanol (300 mL) followed by drying for 16 h.

EXAMPLE 10.2—TRIETHOXYVINYLSILANE-MODIFIED AMO $MG_3AL$—$CO_3$ LDH (SLURRY METHOD)

Ethanol-Treated LDH Formation

A mixed metal solution was prepared from 9.6 g of $Mg(NO_3)_2.6H_2O$ (37.4 mmol), 4.7 g of $Al(NO_3)_3.9H_2O$ (12.5 mmol) in 50 mL of de-carbonated water (Solution A). A second solution contained 2.65 g of $Na_2CO_3$ (25.0 mmol) in 50 mL of deionised water (Solution B). The solution A was added drop-wise (58 mL/min) to the Solution B. The system was kept at constant pH 10 by using 4 M NaOH and aged for 16 hours at room temperature. The slurry was then filtered and the filter cake was washed with de-carbonated water until the pH was close to 7 and followed by washing with ethanol. It was then re-dispersed in ethanol and slurried for 1 hour. The slurry was filtered and rinsed with ethanol. The ethanol-treated $Mg_3Al$—$CO_3$ LDH was dispersed in ethanol to give a 29% w/v slurry.

TEVS Modification

Ethanol-treated AMO $Mg_3Al$—$CO_3$ LDH slurry (29% w/v in ethanol, equal to 1 g of dry LDH) was dispersed into 100 mL of ethanol purged with $N_2$. Triethoxyvinylsilane (TEVS) (2.8 mmol/g LDH) was injected dropwise into the suspension followed by reflux at 80° C. for 18 h. The solid was collected by filtration and washed with ethanol (300 mL) followed by drying for 16 h.

Figure 63:
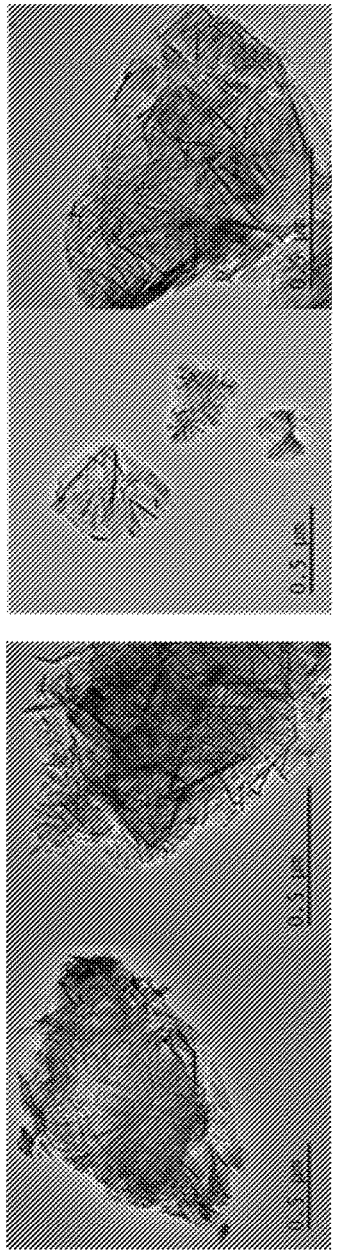
FIG. 63 shows TEM images of TEVS-modified LDH samples prepared according to Example 10.1 (left) and Example 10.2 (right).

Analysis of Comparative TEVS-Modified $Mg_3Al$—$CO_3$ LDHs Made by the Slurry Method FIG. 63 shows TEM images of TEVS-modified LDH samples prepared according to Example 10.1 (left) and Example 10.2 (right). Both samples show similar morphology. The TEVS-AMO-LDH (Example 10.2) shows slightly thinner particles.

Figure 64:
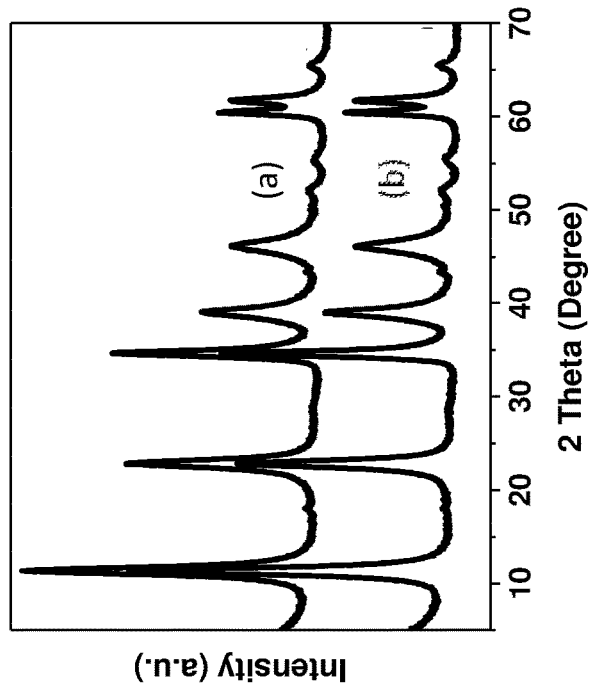
FIG. 64 shows XRD patterns of TEVS-modified LDH samples prepared according to Example 10.1 (a) and Example 10.2 (b).

FIG. 64 shows XRD patterns of TEVS-modified LDH samples prepared according to Example 10.1 (a) and Example 10.2 (b). Both samples show similar crystallinities and no impurity peaks.

Figure 65:
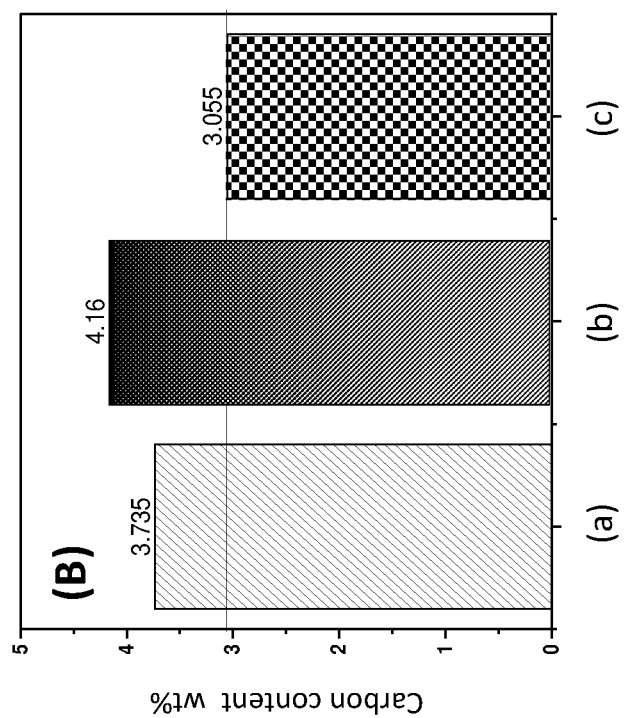
FIG. 65 shows (A) the Si/Al molar ratio and (B) the carbon content of TEVS-modified LDH samples prepared according to Example 10.1 (a) and Example 10.2 (b).
Figure 65:
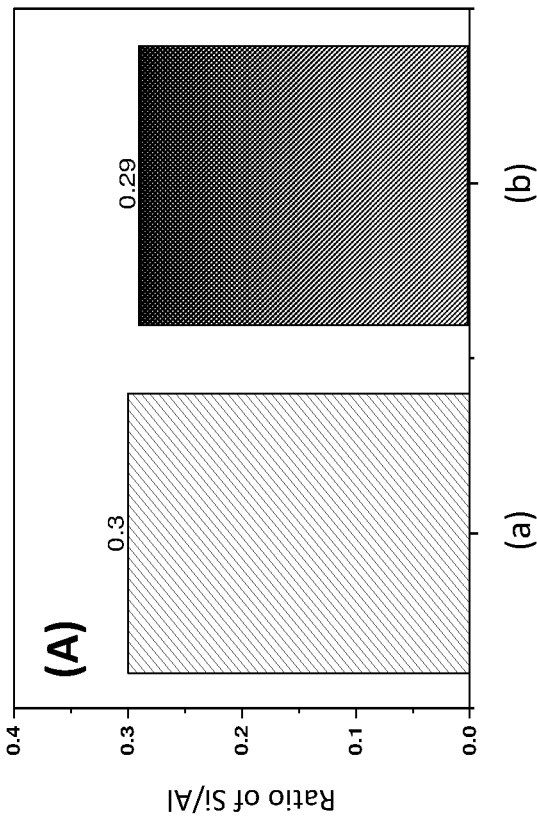

FIG. 65 shows (A) the Si/Al molar ratio and (B) the carbon content of TEVS-modified LDH samples prepared according to Example 10.1 (a) and Example 10.2 (b). In (B) the carbon content of unmodified AMO $Mg_3Al$—$CO_3$ LDH (c) is also shown. Both samples can be grafted with silane using the same slurry method and showed similar Si content. However, after silane treatment, the AMO sample (b) contained more carbon, indicating more silane-derived functional groups are present in the AMO-treated sample.

Figure 66:
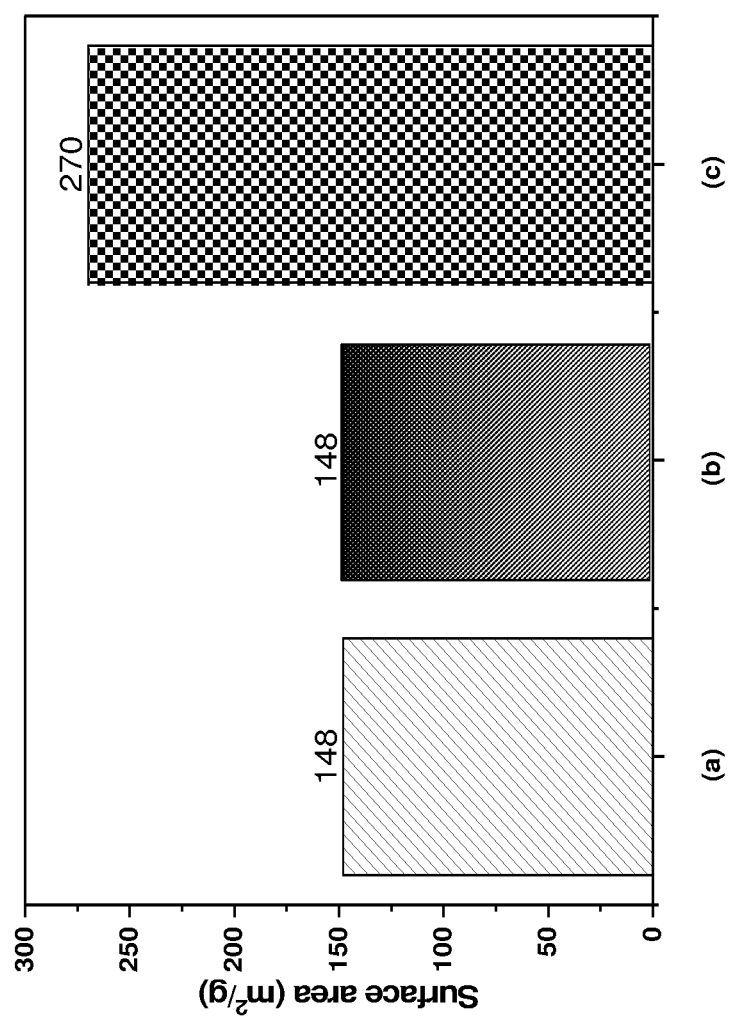
FIG. 66 shows the surface area of TEVS-modified LDH samples prepared according to Example 10.1 (a) and Example 10.2 (b).

FIG. 66 shows the surface area of TEVS-modified LDH samples prepared according to Example 10.1 (a) and Example 10.2 (b). The surface area of unmodified AMO $Mg_3Al$—$CO_3$ LDH (c) is also shown. After silane modification both water-washed LDH (a) and AMO-LDH (b) had the same surface area.

Figure 67:
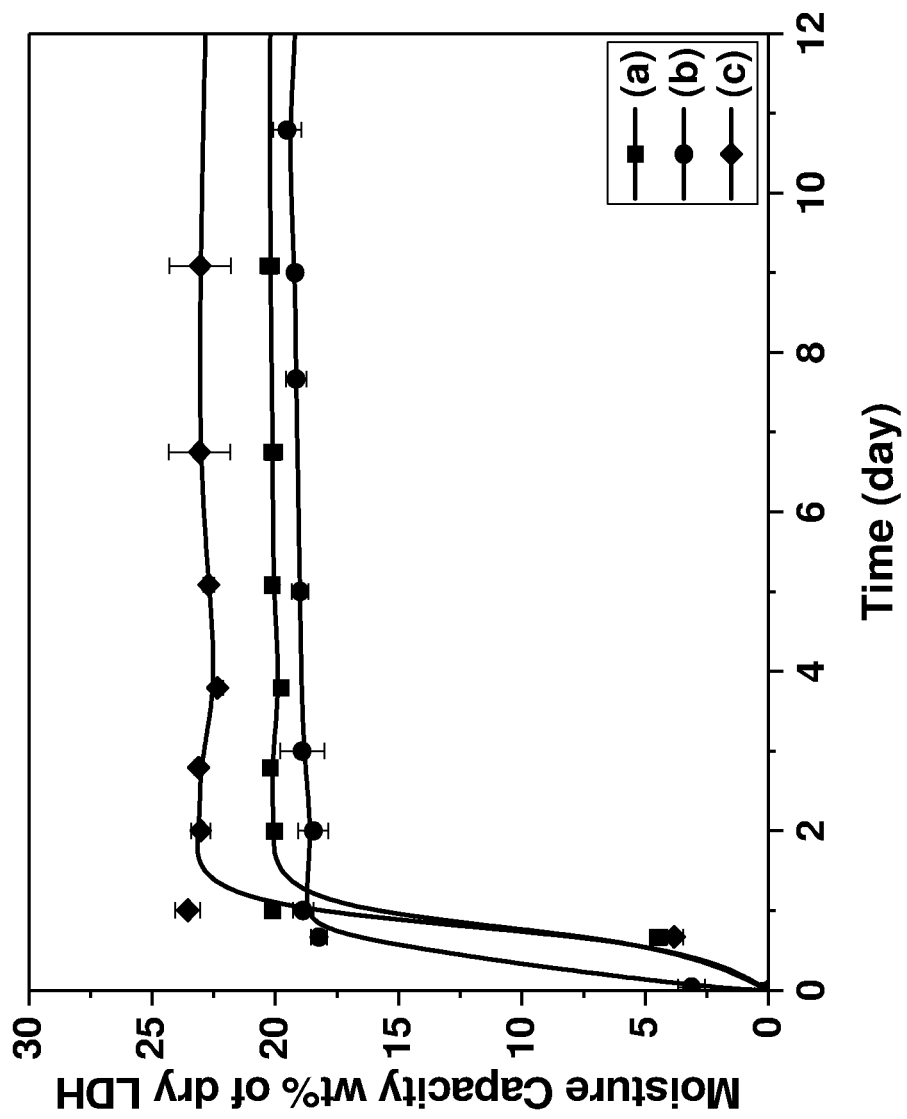
FIG. 67 shows the moisture capacity after exposure to RH60 humidity at 20° C. at various time points of TEVS-modified LDH samples prepared according to Example 10.1 (a), Example 10.2 (b) and unmodified AMO Mg$_3$Al—CO$_3$ LDH (c).

FIG. 67 shows the moisture capacity after exposure to RH60 humidity at 20° C. at various time points of TEVS-modified LDH samples prepared according to Example 10.1 (a), Example 10.2 (b) and unmodified AMO $Mg_3Al$—$CO_3$ LDH (c). AMO-LDH after TEVS-treatment (b) showed reduced moisture uptake compared to the equivalent water-washed LDH (a).

EXAMPLE 10.3—TRIETHOXYVINYLSILANE-MODIFIED $MG_3AL$—$CO_3$ LDH (DRY FORM METHOD)

Water-Washed LDH Formation

A mixed metal solution was prepared from 9.6 g of $Mg(NO_3)_2 \cdot 6H_2O$ (37.4 mmol), 4.7 g of $Al(NO_3)_3 \cdot 9H_2O$ (12.5 mmol) in 50 mL of de-carbonated water (Solution A). A second solution contained 2.65 g of $Na_2CO_3$ (25.0 mmol) in 50 mL of deionised water (Solution B). The solution A was added drop-wise (58 mL/min) to the Solution B. The system was kept at constant pH 10 by using 4 M NaOH and aged for 16 hours at room temperature. The slurry was then filtered and the filter cake was washed with de-carbonated water until the pH was close to 7. The water-washed $Mg_3Al$—$CO_3$ LDH was dried in vacuum overnight.

TEVS Modification

Water-washed $Mg_3Al$—$CO_3$ LDH powder (1 g) was thermally treated at 180° C. for 6 h and was then dispersed into 100 mL of ethanol purged with $N_2$. Triethoxyvinylsilane (TEVS) (2.8 mmol/g LDH) was injected dropwise into the suspension followed by reflux at 80° C. for 18 h. The solid was collected by filtration and washed with ethanol (300 mL) followed by drying for 16 h.

EXAMPLE 10.4—TRIETHOXYVINYLSILANE-MODIFIED AMO $MG_3AL$—$CO_3$ LDH (DRY FORM METHOD)

Ethanol-Treated LDH Formation

A mixed metal solution was prepared from 9.6 g of $Mg(NO_3)_2 \cdot 6H_2O$ (37.4 mmol), 4.7 g of $Al(NO_3)_3 \cdot 9H_2O$ (12.5 mmol) in 50 mL of de-carbonated water (Solution A). A second solution contained 2.65 g of $Na_2CO_3$ (25.0 mmol) in 50 mL of deionised water (Solution B). The solution A was added drop-wise (58 mL/min) to the Solution B. The system was kept at constant pH 10 by using 4 M NaOH and aged for 16 hours at room temperature. The slurry was then filtered and the filter cake was washed with de-carbonated water until the pH was close to 7 and followed by washing with ethanol. It was then re-dispersed in ethanol and slurried for 1 hour. The slurry was filtered, rinsed with ethanol and dried in vacuum overnight.

TEVS Modification

Ethanol-treated AMO $Mg_3Al$—$CO_3$ LDH powder (1 g) was thermally treated at 180° C. for 6 h and was then dispersed into 100 mL of ethanol purged with $N_2$. Triethoxyvinylsilane (TEVS) (2.8 mmol/g LDH) was injected dropwise into the suspension followed by reflux at 80° C. for 18 h. The solid was collected by filtration and washed with ethanol (300 mL) followed by drying for 16 h.

Figure 68:
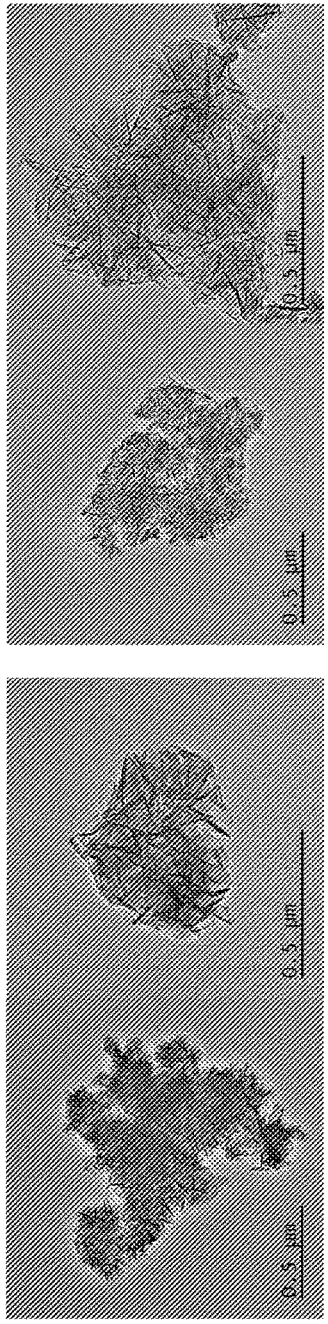
FIG. 68 shows TEM images of TEVS-modified LDH samples prepared according to Example 10.3 (left) and Example 10.4 (right).

Analysis of Comparative TEVS-Modified $Mg_3Al$—$CO_3$ LDHs Made by the Dry Form Method FIG. 68 shows TEM images of TEVS-modified LDH samples prepared according to Example 10.3 (left) and Example 10.4 (right). Both samples show similar morphology. The TEVS-AMO-LDH (Example 10.4) shows thinner particles.

Figure 69:
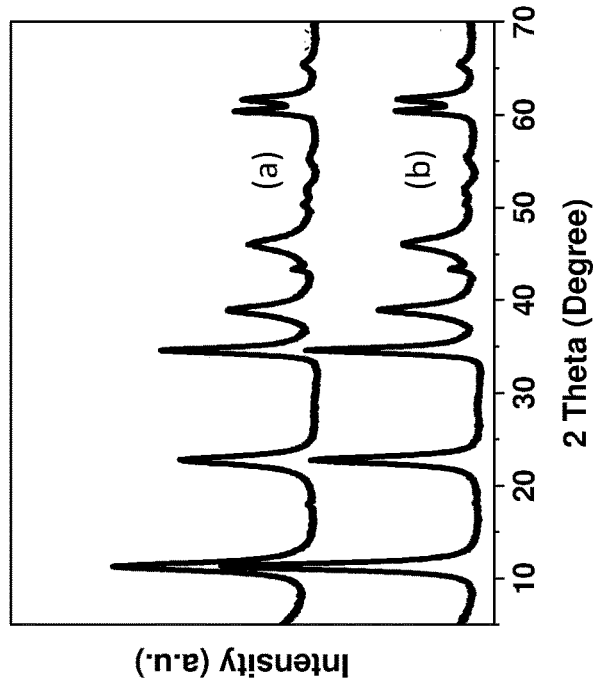
FIG. 69 shows XRD patterns of TEVS-modified LDH samples prepared according to Example 10.3 (a) and Example 10.4 (b).

FIG. 69 shows XRD patterns of TEVS-modified LDH samples prepared according to Example 10.3 (a) and Example 10.4 (b). Both samples show similar crystallinities and no impurity peaks.

Figure 70:
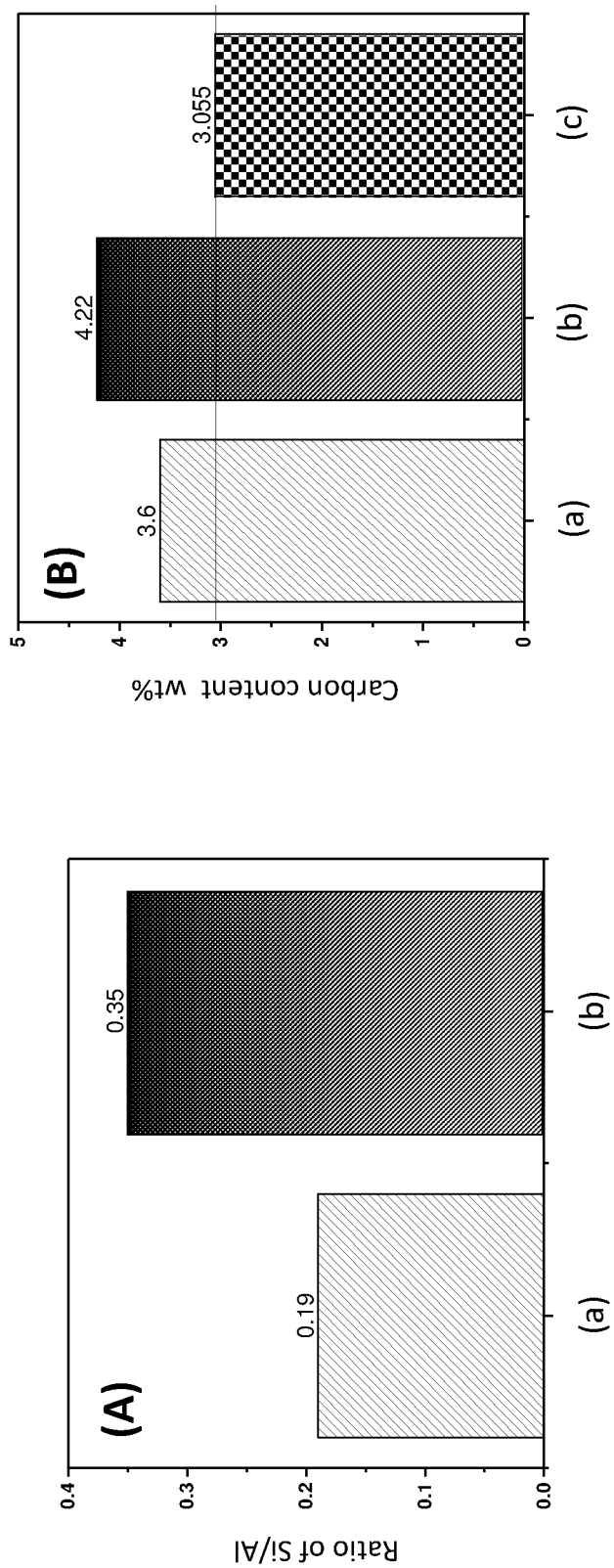
FIG. 70 shows (A) the Si/Al molar ratio and (B) the carbon content of TEVS-modified LDH samples prepared according to Example 10.3 (a) and Example 10.4 (b).

FIG. 70 shows (A) the Si/Al molar ratio and (B) the carbon content of TEVS-modified LDH samples prepared according to Example 10.3 (a) and Example 10.4 (b). In (B) the carbon content of unmodified AMO $Mg_3Al$—$CO_3$ LDH (c) is also shown. Both samples can be grafted with silane using the same dry form method. However, the AMO-treated sample (b) contained more carbon and had a higher Si/Al ratio, indicating silane modification is more effective on AMO-LDH compared with water-washed LDH.

Figure 71:
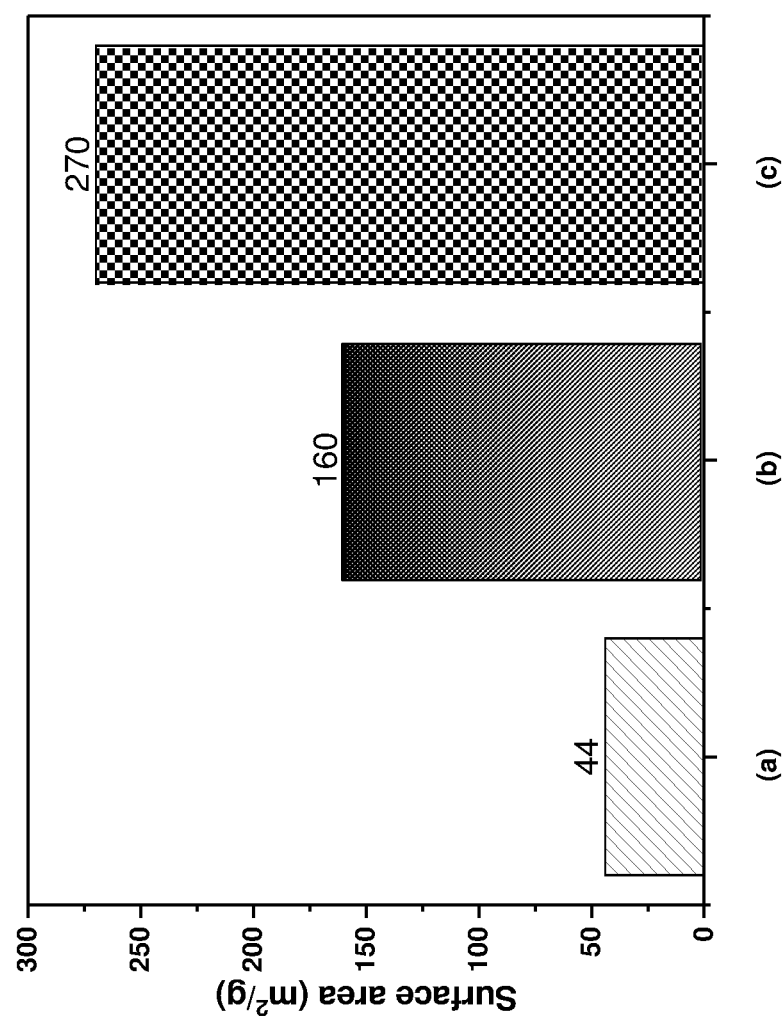
FIG. 71 shows the surface area of TEVS-modified LDH samples prepared according to Example 10.3 (a) and Example 10.4 (b).

FIG. 71 shows the surface area of TEVS-modified LDH samples prepared according to Example 10.3 (a) and Example 10.4 (b). The surface area of unmodified AMO $Mg_3Al$—$CO_3$ LDH (c) is also shown. After silane modification, the surface area of AMO-LDH (b) remained high, while the water-washed LDH (a) showed extremely low surface area.

Figure 72:
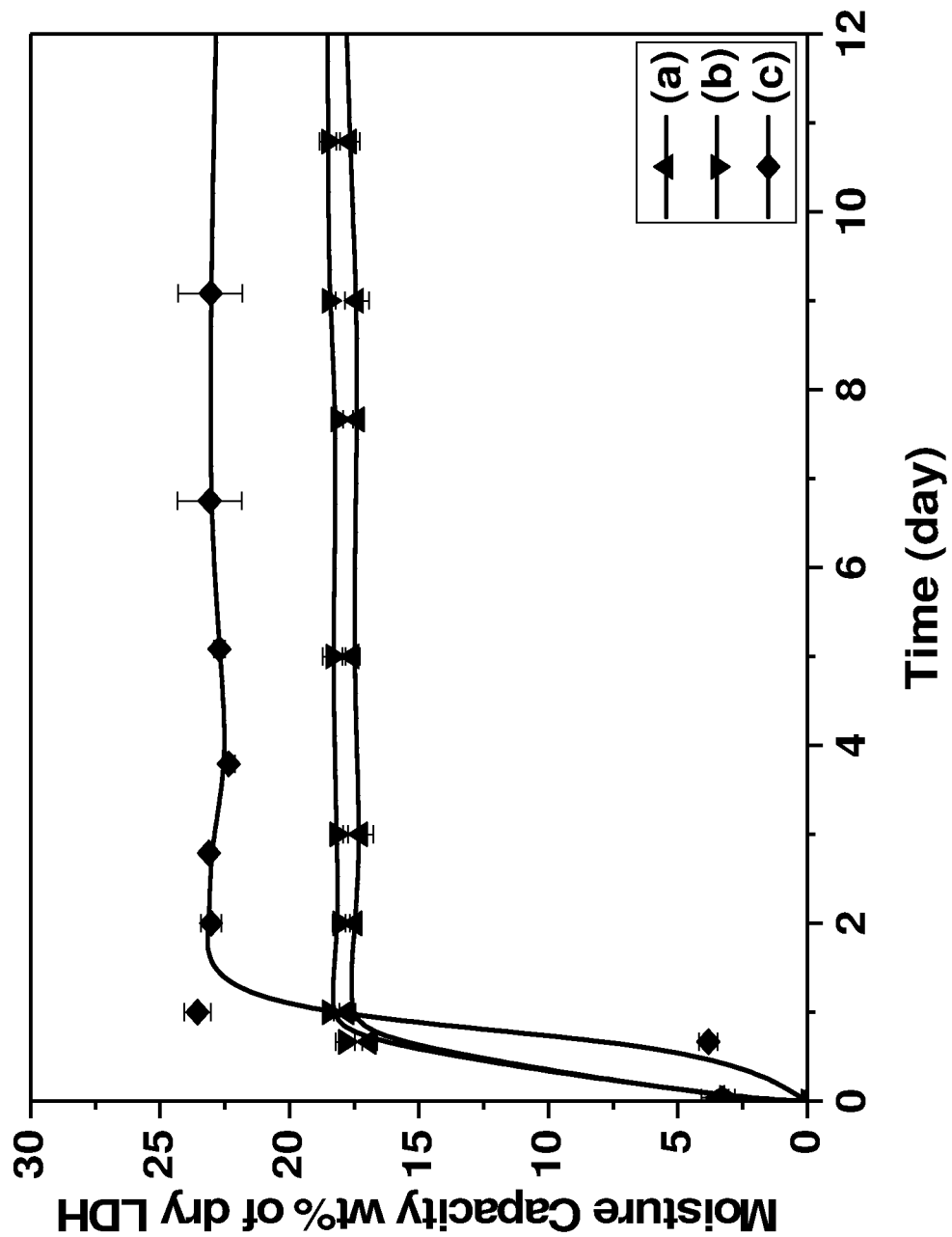
FIG. 72 shows the moisture capacity after exposure to RH60 humidity at 20° C. at various time points of TEVS-modified LDH samples prepared according to Example 10.3 (a), Example 10.4 (b) and unmodified AMO Mg$_3$Al—CO$_3$ LDH (c).

FIG. 72 shows the moisture capacity after exposure to RH60 humidity at 20° C. at various time points of TEVS-modified LDH samples prepared according to Example 10.3 (a), Example 10.4 (b) and unmodified AMO $Mg_3Al$—$CO_3$ LDH (c). After TEVS treatment, water-washed LDH (a) showed slightly better moisture resistance than that of AMO-LDH.

EXAMPLE 11—COMPARATIVE STEARIC ACID MODIFICATION OF AMO $MG_3AL$—$CO_3$ LDH AND $MG_3AL$—$CO_3$ LDH

EXAMPLE 11.1—STEARIC ACID-MODIFIED $MG_3AL$—$CO_3$ LDH (SLURRY METHOD)

Stearic acid (2 mmol) was dissolved in 200 ml of ethanol. Water washed $Mg_3Al$—$CO_3$ LDH slurry (29% w/v in water, equal to 2 g of dry LDH) was added to this solution and the mixture was stirred (750 rpm) at 80° C. for 18 h. The solid was collected by filtration and washed with warm (60° C.) ethanol (600 mL) followed by drying in vacuum oven overnight. The resultant LDH is referred to as LDH-SA1.0-S.

EXAMPLE 11.2—STEARIC ACID-MODIFIED AMO-$MG_3AL$—$CO_3$ LDH (SLURRY METHOD)

Stearic acid (2 mmol) was dissolved in 200 ml of ethanol. Ethanol-treated $Mg_3Al$—$CO_3$ LDH slurry (36% w/v in ethanol, equal to 2 g of dry LDH) was added to this solution and the mixture was stirred (750 rpm) at 80° C. for 18 h. The solid was collected by filtration and washed with warm (60° C.) ethanol (600 mL) followed by drying in vacuum oven overnight. The resultant LDH is referred to as AMO-LDH-SA1.0-S.

EXAMPLE 11.3—STEARIC ACID-MODIFIED $MG_3AL$—$CO_3$ LDH (DRY POWDER METHOD)

Water washed $Mg_3Al$—$CO_3$ LDH powder (2 g) was thermally treated at 180° C. for 2 h. It was then added to a solution of stearic acid (2 mmol) in 200 ml of ethanol. The mixture was stirred (750 rpm) at 80° C. for 18 h. The solid was collected by filtration and washed with warm (60° C.)

ethanol (600 mL) followed by drying in vacuum oven overnight. The resultant LDH is referred to as LDH-SA1.0-P.

EXAMPLE 11.4—STEARIC ACID-MODIFIED AMO-MG$_3$AL—CO$_3$ LDH (DRY POWDER METHOD)

Ethanol-treated Mg$_3$Al—CO$_3$ LDH powder (2 g) was thermally treated at 180° C. for 2 h. It was then added to a solution of stearic acid (2 mmol) in 200 ml of ethanol. The mixture was stirred (750 rpm) at 80° C. for 18 h. The solid was collected by filtration and washed with warm (60° C.) ethanol (600 mL) followed by drying in vacuum oven overnight. The resultant LDH is referred to as AMO-LDH-SA1.0-P.

Analysis of Comparative stearic acid-modified Mg$_3$Al—CO$_3$ LDHs

Figure 73:
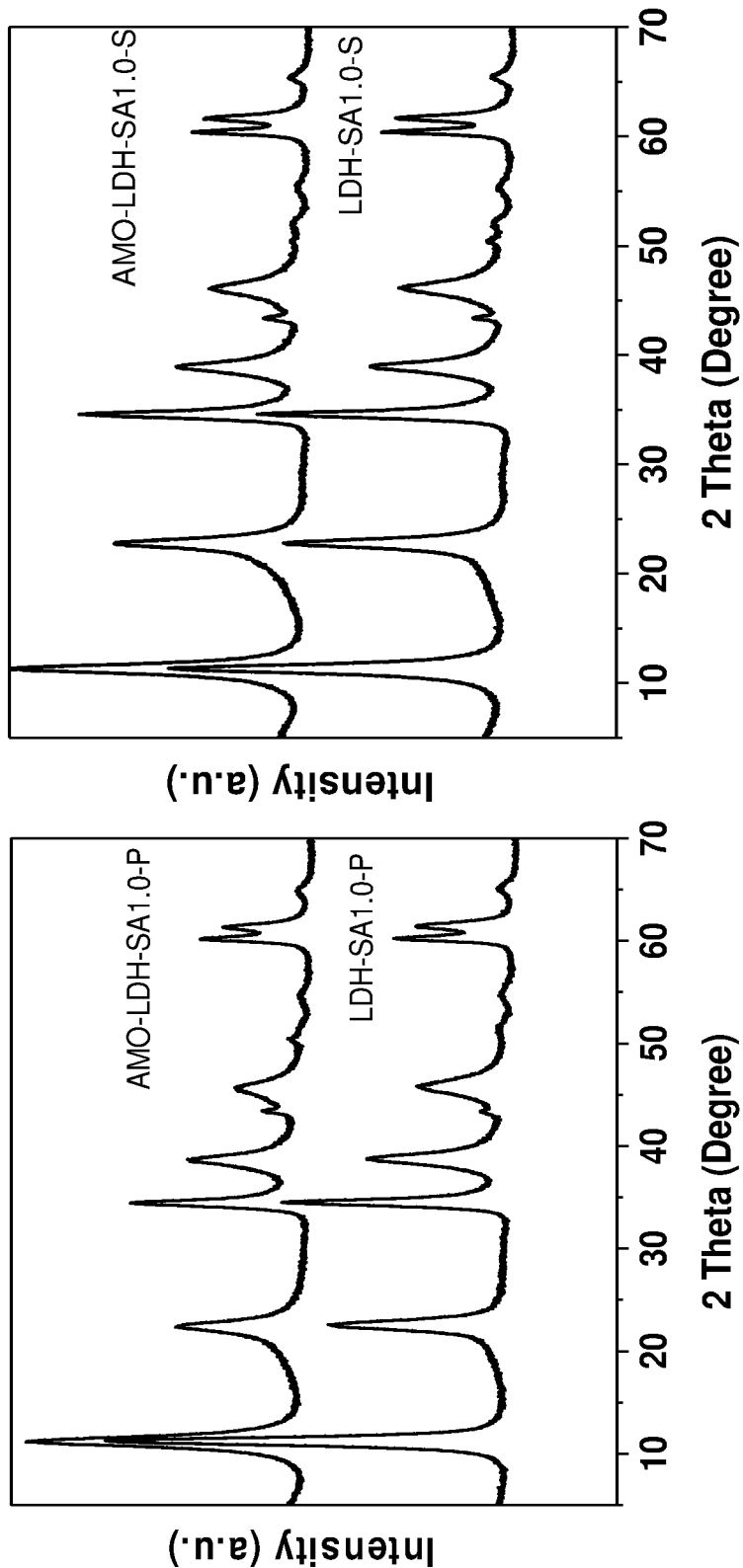
FIG. 73 shows XRD patterns of Example 11 stearic acid-modified LDH samples prepared according to the dry powder method (left) and the slurry method (right).

FIG. 73 shows XRD patterns of stearic acid-modified LDH samples prepared according to the dry powder method (left) and the slurry method (right). No impurity phase was observed after surface modification with stearic acid.

Figure 74:
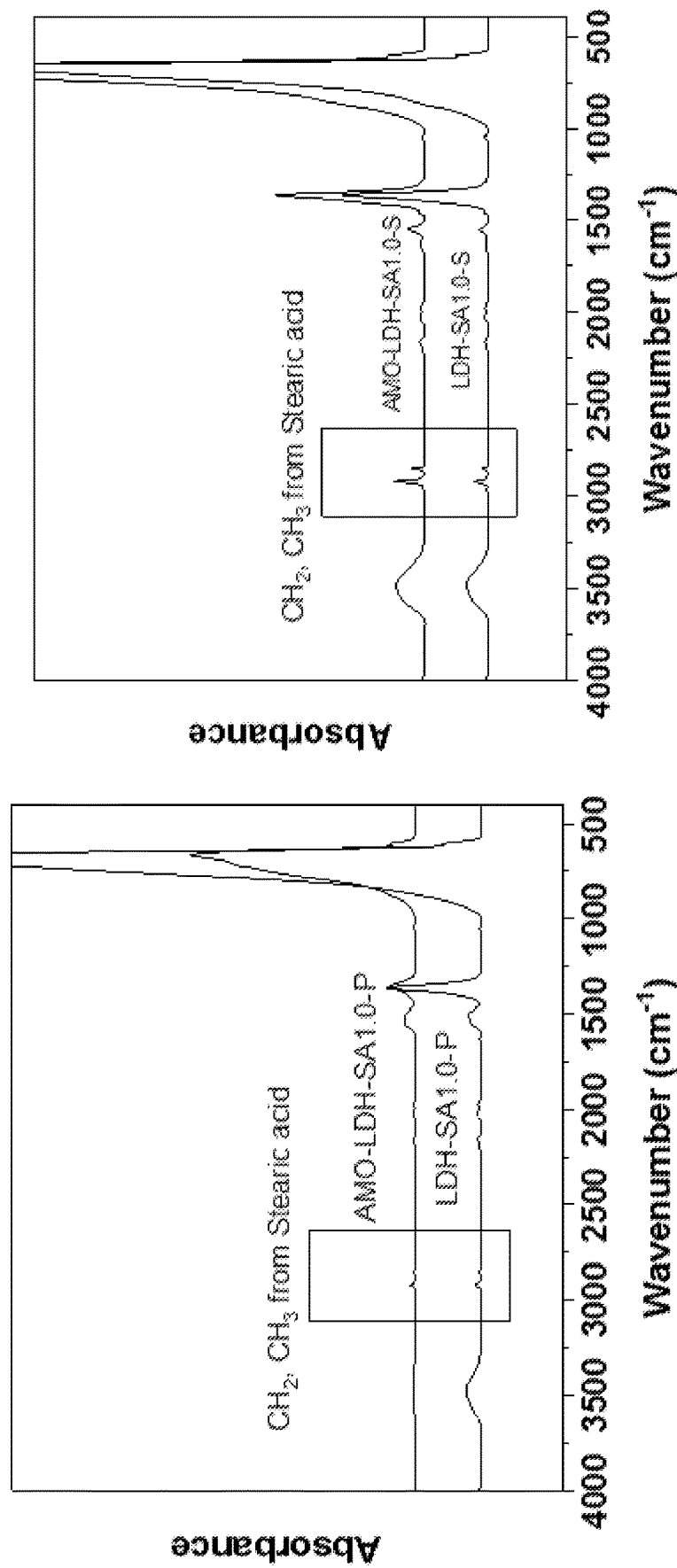
FIG. 74 shows FTIR spectra of Example 11 stearic acid-modified LDH samples prepared according to the dry powder method (left) and the slurry method (right).

FIG. 74 shows FTIR spectra of stearic acid-modified LDH samples prepared according to the dry powder method (left) and the slurry method (right). The vibrations of CH$_2$ and CH$_3$ due to the presence of stearic acid can be observed for all four samples, but are more obvious in the sample made from AMO-treated LDH by the slurry method (AMO-LDH-SA1.0-S).

Figure 75:
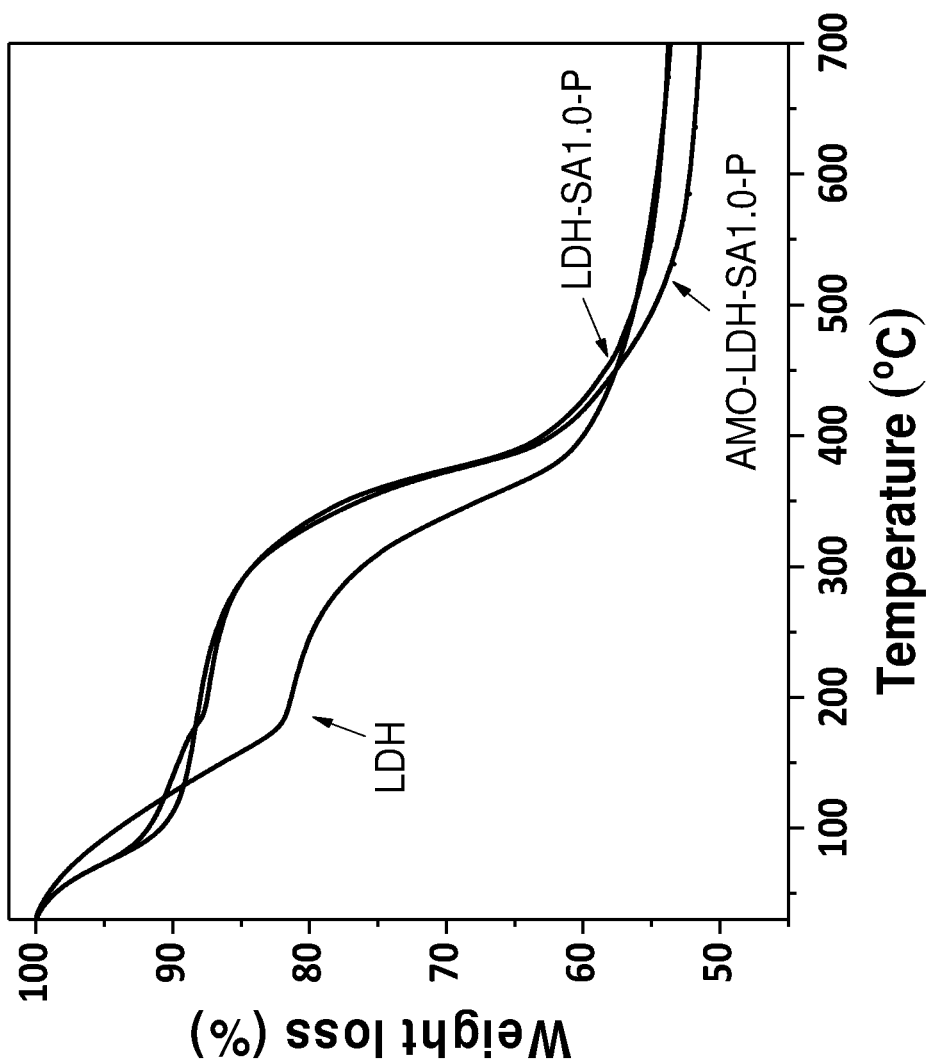
FIG. 75 shows TGA curves of Example 11 stearic acid-modified LDH samples prepared according to the dry powder method, as well as unmodified AMO-LDH (LDH).

FIG. 75 shows TGA curves of stearic acid-modified LDH samples prepared according to the dry powder method, as well as unmodified AMO-LDH (LDH). Stearic acid-modified samples showed reduced water content; LDH-SA1.0-P (13 wt %) and AMO-LDH-SA1.0-P (12 wt %) compared to the unmodified sample (19 wt %).

Figure 76:
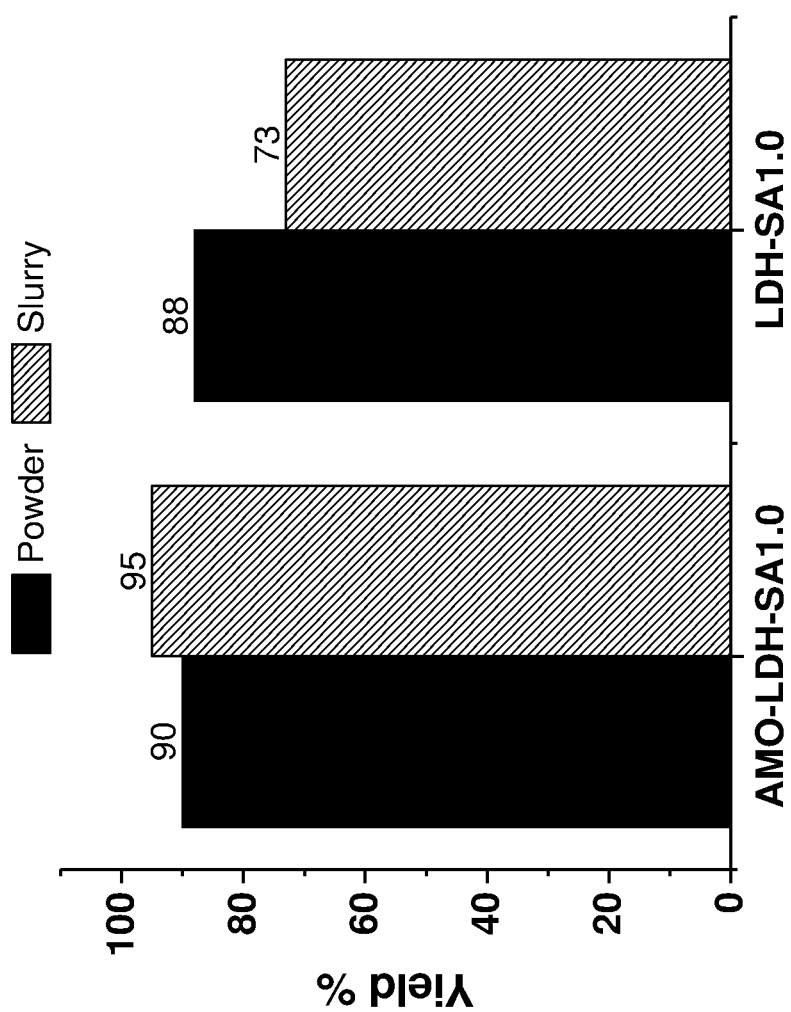
FIG. 76 shows the yields of Example 11 stearic acid-modified LDH samples prepared according to the dry powder method (black bars) and the slurry method (striped bars).

FIG. 76 shows the yields of stearic acid-modified LDH samples prepared according to the dry powder method (black bars) and the slurry method (striped bars). Yields were calculated from the residual of stearic acid by $^1$H-NMR. Modified samples prepared from AMO-LDH by both the dry powder and slurry methods resulted in higher yields than the equivalent samples prepared from the water washed LDH, indicating that the AMO-LDH can be more efficiently modified with stearic acid. The AMO-LDH modified by the slurry method exhibited the highest yield (95%).

While specific embodiments of the invention have been described herein for the purpose of reference and illustration, various modifications will be apparent to a person skilled in the art without departing from the scope of the invention as defined by the appended claims.

The invention claimed is:

1. A layered double hydroxide of formula (I) shown below:

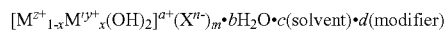
(I)

wherein
M is at least one charged metal cation;
M' is at least one charged metal cation different from M;
z is 1 or 2;
y is 3 or 4;
$0<x<0.9$;
$0<b\leq 10$;
$0<c\leq 10$;
$0<d\leq 10$
X is at least one anion;
n is the charge on anion(s) X;
a is equal to $z(1-x)+xy-2$;
m ≥ a/n; and
the solvent is an organic solvent capable of hydrogen-bonding to water; and
the modifier is an organic moiety capable of covalent or ionic association with at least one surface of the layered double hydroxide, and which modifies the surface properties of the layered double hydroxide;
and wherein the layered double hydroxide has a tap density of less than 0.35 g/mL.

2. The layered double hydroxide of claim 1, wherein the modifier is an organic moiety comprising at least 5 carbon atoms and at least one functional group that is capable of covalent or ionic association with at least one surface of the layered double hydroxide.

3. The layered double hydroxide of claim 1, wherein the modifier increases the lipophilicity of the layered double hydroxide.

4. The layered double hydroxide of claim 3, wherein the modifier is an organosilane or a surfactant.

5. The layered double hydroxide of claim 4, wherein the organosilane has a structure according to formula (II) shown below

(II)

wherein
q is 1, 2 or 3;
each R$_1$ is independently hydrogen or an organofunctional group;
each Y is independently absent, or is a straight or branched organic linker; and
each R$_2$ is independently hydrogen, halo, hydroxy, carboxy, (1-4C)alkyl or a group —OR$_3$, wherein R$_3$ is selected from (1-6C)alkyl, aryl(1-6C)alkyl, heteroaryl(1-6C)alkyl, cycloalkyl(1-6C)alkyl, heterocyclyl(1-6C)alkyl and (1-6C)alkoxy(l-4C)alkyl.

6. The layered double hydroxide of claim 5, wherein the organofunctional group is selected from acrylate, methacrylate, mercapto, aldehyde, amino, azido, carboxylate, phosphonate, sulfonate, epoxy, glycidyloxy, ester, halogen, hydroxyl, isocyanate, phosphine, phosphonate, alkenyl, aryl, cycloalkyl, heteroaryl and heterocyclyl.

7. The layered double hydroxide of claim 4, wherein the surfactant is a non-ionic, cationic, anionic or amphoteric surfactant.

8. The layered double hydroxide of claim 4, wherein the surfactant is a (4-22C)fatty acid or a salt thereof.

9. The layered double hydroxide of claim 1, wherein d has a value according to the expression $1\leq d\leq 2$.

10. The layered double hydroxide of claim 1, wherein z is 2, M is Mg, Zn, Fe, Ca, Sn, Ni, Cu, Co, Mn or Cd or a mixture of two or more of these, or when z is 1, M is Li.

11. The layered double hydroxide of claim 1, wherein y is 3, M' is Al, Ga, Y, In, Fe, Co, Ni, Mn, Cr, Ti, V, La or a mixture thereof, or when y is 4, M' is Sn, Ti or Zr or a mixture thereof.

12. The layered double hydroxide of claim 1, wherein M' is Al.

13. The layered double hydroxide of claim 1, wherein the layered double hydroxide of formula (I) is a Zn/Al, Mg/Al, Mg,Zn/Al, Mg/Al,Sn, Ca/Al, Ni/Ti or Cu/Al layered double hydroxide.

14. The layered double hydroxide of claim 1, wherein X is an anion selected from at least one of halide, inorganic oxyanion, or an organic anion.

15. The layered double hydroxide of claim 14, wherein the inorganic oxyanion is carbonate, bicarbonate, hydrogenphosphate, dihydrogenphosphate, nitrite, borate, nitrate, sulphate or phosphate or a mixture of two or more thereof.

16. The layered double hydroxide of claim 1, wherein X is carbonate.

17. The layered double hydroxide of claim 1, wherein M is Mg, M' is Al and X is carbonate.

18. The layered double hydroxide of claim 1, wherein the solvent is selected from the group consisting of acetone, acetonitrile, dimethylformamide, dimethyl sulphoxide, dioxane, ethanol, methanol, n-propanol, isopropanol, tetrahydrofuran, ethyl acetate, n-butanol, sec-butanol, n-pentanol, n-hexanol, cyclohexanol, diethyl ether, diisopropyl ether, di-n-butyl ether, methyl tert-butyl ether (MTBE), tert-amyl methyl ether, cyclopentyl methyl ether, cyclohexanone, methyl ethyl ketone (MEK), methyl isobutyl ketone (MIBK), methyl isoamyl ketone, methyl n-amyl ketone, furfural, methyl formate, methyl acetate, isopropyl acetate, n-propyl acetate, isobutyl acetate, n-butyl acetate, n-amyl acetate, n-hexyl acetate, methyl amyl acetate, methoxypropyl acetate, 2-ethoxyethyl acetate, nitromethane, and a mixture of two or more thereof.

19. The layered double hydroxide of claim 1, wherein the solvent is selected from the group consisting of acetone, ethanol, ethyl acetate, and a mixture of two or more thereof.

20. The layered double hydroxide of claim 1, wherein the layered double hydroxide also has a loose bulk density of less than 0.35 g/mL.

21. The layered double hydroxide of claim 1, wherein the layered double hydroxide also has a BET pore volume of at least 0.3 cc/g.

22. A process for the preparation of a layered double hydroxide of formula (I), the process comprising the steps of:

a) providing a layered double hydroxide of formula (Ia):

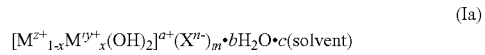

$$[M^{z+}_{1-x}M'^{y+}_{x}(OH)_2]^{a+}(X^{n-})_m \cdot bH_2O \cdot c(\text{solvent}) \quad (Ia)$$

where M, M', z, y, x, b, c, X, m, and the solvent are as specified in claim 1;

b) providing a modifier being an organic moiety of covalent or ionic association with at least one surface of the layered double hydroxide, and which is capable of modifying the surface properties of the layered double hydroxide; and c) contacting the layered double hydroxide of formula (Ia) provided in step a) with the modifier provided in step b), wherein the layered double hydroxide has a tap density of less than 3.5 g/mL.

23. A composite material comprising the layered double hydroxide as claimed in claim 1 dispersed throughout a polymer.

* * * * *

UNITED STATES PATENT AND TRADEMARK OFFICE
CERTIFICATE OF CORRECTION

PATENT NO. : 11,242,460 B2
APPLICATION NO. : 16/461246
DATED : February 8, 2022
INVENTOR(S) : O'Hare et al.

It is certified that error appears in the above-identified patent and that said Letters Patent is hereby corrected as shown below:

In the Claims

In Column 38, Lines 25-28:
"c) contacting the layered double hydroxide of formula (Ia) provided in step a) with the modifier provided in step b), wherein the layered double hydroxide has a tap density of less than 3.5 g/mL."

Should read:
-- c) contacting the layered double hydroxide of formula (Ia) provided in step a) with the modifier provided in step b), wherein the layered double hydroxide has a tap density of less than 0.35 g/mL. --

Signed and Sealed this
Nineteenth Day of April, 2022

Katherine Kelly Vidal
*Director of the United States Patent and Trademark Office*